(12) United States Patent
Sadeghi et al.

(10) Patent No.: US 11,403,776 B2
(45) Date of Patent: Aug. 2, 2022

(54) DEPTH EXTRACTION

(71) Applicant: Five AI Limited, Bristol (GB)

(72) Inventors: Jonathan Sadeghi, Bristol (GB); Torran Elson, Bristol (GB)

(73) Assignee: Five AI Limited, Bristol (GB)

( * ) Notice: Subject to any disclaimer, the term of this patent is extended or adjusted under 35 U.S.C. 154(b) by 0 days.

(21) Appl. No.: 17/441,281

(22) PCT Filed: Mar. 23, 2020

(86) PCT No.: PCT/EP2020/058036
§ 371 (c)(1),
(2) Date: Sep. 20, 2021

(87) PCT Pub. No.: WO2020/188120
PCT Pub. Date: Sep. 24, 2020

(65) Prior Publication Data
US 2022/0101549 A1    Mar. 31, 2022

(30) Foreign Application Priority Data

Mar. 21, 2019 (GB) .................................. 1903916
Mar. 21, 2019 (GB) .................................. 1903917
(Continued)

(51) Int. Cl.
*G06K 9/00* (2022.01)
*G06T 7/593* (2017.01)
*G06V 20/58* (2022.01)

(52) U.S. Cl.
CPC .............. *G06T 7/593* (2017.01); *G06V 20/58* (2022.01); *G06T 2207/10012* (2013.01);
(Continued)

(58) Field of Classification Search
CPC .......... G06T 7/593; G06T 2207/10012; G06T 2207/20076; G06T 2207/20081; G06T 2207/20084; G06V 20/58
(Continued)

(56) References Cited

U.S. PATENT DOCUMENTS

2015/0049915 A1    2/2015 Ciurea et al.
2019/0244380 A1*   8/2019 Op Het Veld ............ G06T 7/97
(Continued)

OTHER PUBLICATIONS

Mostegel, Christian, et al. "Using self-contradiction to learn confidence measures in stereo vision." Proceedings of the IEEE Conference on Computer Vision and Pattern Recognition. 2016. (Year: 2016).*

(Continued)

*Primary Examiner* — Jonathan S Lee
(74) *Attorney, Agent, or Firm* — Andrew J. Tibbetts; Greenberg Traurig, LLP

(57) ABSTRACT

A computer-implemented method of training a depth uncertainty estimator comprises receiving, at a training computer system, a set of training examples, each training example comprising (i) a stereo image pair and (ii) an estimated disparity map computed from at least one image of the stereo image pair by a depth estimator. The training computer system executes a training process to learn one or more uncertainty estimation parameters of a perturbation function, the uncertainty estimation parameters for estimating uncertainty in disparity maps computed by the depth estimator. The training process is performed by sampling a likelihood function based on the training examples and the perturbation function, thereby obtaining a set of sampled values for learning the one or more uncertainty estimation parameters. The likelihood function measures similarity between one image of each training example and a reconstructed image computed by transforming the other image of that training (Continued)

example based on a possible true disparity map derived from the estimated disparity map of that training example and the perturbation function.

20 Claims, 22 Drawing Sheets

(30) Foreign Application Priority Data

Mar. 22, 2019 (GB) ...................................... 1903960
Mar. 22, 2019 (GB) ...................................... 1903964

(52) U.S. Cl.
CPC ............... *G06T 2207/20076* (2013.01); *G06T 2207/20081* (2013.01); *G06T 2207/20084* (2013.01)

(58) Field of Classification Search
USPC ........................................................ 382/154
See application file for complete search history.

(56) References Cited

U.S. PATENT DOCUMENTS

| | | | |
|---|---|---|---|
| 2019/0387209 A1* | 12/2019 | Yang | G06T 9/002 |
| 2021/0150278 A1* | 5/2021 | Dudzik | G01S 17/86 |
| 2021/0150279 A1* | 5/2021 | Dudzik | G06V 20/58 |

OTHER PUBLICATIONS

International Search Report and Written Opinion for International Application No. PCT/EP2020/058036 dated Jul. 9, 2020.
Blake et al., Estimating uncertainty in dense stereo disparity maps. Microsoft Research Report MSR-TR-2003-2093, 2003:17 pages.
Blundell et al., Weight uncertainty in neural networks, arXiv:1505.05424. May 2015: 10 pages.
Chen et al., Encoder-decoder with atrous separable convolution for semantic image segmentation. Proceedings of the European conference on computer vision (ECCV LNCS). 2018:18 pages.
Choi et al., Learning descriptor, confidence, and depth estimation in multi-view stereo. Proceedings of the IEEE Conference on Computer Vision and Pattern Recognition Workshops 2018:276-82.
Dillon et al., TensorFlow distributions, arXiv:1711.10604. Nov. 2017:13 pages.
Drory et al., Semi-global matching: a principled derivation in terms of message passing. German Conference on Pattern Recognition Sep. 2, 2014:12 pages.
Eigen et al., Depth map prediction from a single image using a multi-scale deep network. In Advances in neural information processing systems. arXiv:1406.2283v1. Jun. 2014: 9 pages.
Feng et al., Towards safe autonomous driving: Capture uncertainty in the deep neural network for lidar 3d vehicle detection. IEEE 2018 21st International Conference on Intelligent Transportation Systems (ITSC) Nov. 4, 2018:3266-73.
Friedman et al., The elements of statistical learning. New York: Springer series in statistics; 2001:764 pages.
Gal et al., Dropout as a bayesian approximation: Representing model uncertainty in deep learning. International conference on machine learning. Jun. 11, 2016:10 pages.
Garg et al., Unsupervised CNN for single view depth estimation: Geometry to the rescue. European conference on computer vision Oct. 8, 2016:16 pages.
Gehrig et al., Exploiting traffic scene disparity statistics for stereo vision. Proceedings of the IEEE International Conference on Computer Vision and Pattern Recognition Workshops, 2014:674-81.
Gehrig et al., Priors for stereo vision under adverse weather conditions. Proceedings of the IEEE International Conference on Computer Vision Workshops 2013:238-45.
Geiger et al., Efficient large-scale stereo matching. Computer Vision-ACCV Dec. 2010:15 pages.
Geiger et al., Vision meets robotics: The kitti dataset. The International Journal of Robotics Research. Sep. 2013;32(11):1231-7.
Geiger et al., Automatic camera and range sensor calibration using a single shot. IEEE international conference on robotics and automation May 14, 2012:8 pages.
Godard et al., Unsupervised Monocular Depth Estimation with Left-Right Consistency. IEEE Conference on Computer Vision and Pattern Recognition (CVPR) Jul. 21, 2017:6602-11.
Green et al., Estimating the parameters of dynamical systems from Big Data using Sequential Monte Carlo samplers. Mechanical Systems and Signal Processing, Preprint 2017:24 pages.
Groenendijk et al., On the benefit of adversarial training for monocular depth estimation. Computer Vision and Image Understanding. arXiv:1910.13340v1 Oct. 2019:11 pages.
Haeusler et al., Ensemble learning for confidence measures in stereo vision. Proceedings of the IEEE International Conference on Computer Vision and Pattern Recognition Workshops, 2013:305-12.
Hirschmüller et al., Evaluation of stereo matching costs on images with radiometric differences. IEEE transactions on pattern analysis and machine intelligence. Oct. 2009;18 pages.
Hirschmüller, Stereo processing by semiglobal matching and mutual information. IEEE Transactions on pattern analysis and machine intelligence. Dec. 2007:14 pages.
Humenberger et al., A census-based stereo vision algorithm using modified semi-global matching and plane fitting to improve matching quality. IEEE Computer Society Conference on Computer Vision and Pattern Recognition-Workshops 2010:8 pages.
Jaynes, Probability theory: The logic of science. Cambridge university press; Apr. 10, 2003:95 pages.
Kendall et al., What uncertainties do we need in Bayesian deep learning for computer vision?. Proceedings of the 31st International Conference on Neural Information Processing Systems Dec. 4, 2017:11 pages.
Kingma et al., Adam: A method for stochastic optimization. arXiv preprint arXiv:1412.6980. Dec. 22, 2014;9 pages.
Kondermann et al., Stereo ground truth with error bars. Asian conference on computer vision. Springer. Nov. 1, 2014:16 pages.
Leo et al., Covariance propagation for the uncertainty estimation in stereo vision. IEEE Transactions on Instrumentation and Measurement. Mar. 17, 2011;60(5):1664-73.
Liu et al., Neural rgb (r) d sensing: Depth and uncertainty from a video camera. Proceedings of the IEEE/CVF Conference on Computer Vision and Pattern Recognition 2019:10986-995.
Maskell, A Bayesian approach to fusing uncertain, imprecise and conflicting information. Information Fusion. Apr. 1, 2008;9(2):259-77.
Mayer et al., A large dataset to train convolutional networks for disparity, optical flow, and scene flow estimation. Proceedings of the IEEE conference on computer vision and pattern recognition. Jun. 2016:4040-48.
Patelli et al., OpenCossan 2.0: an efficient computational toolbox for risk, reliability and resilience analysis. Joint Icvram Isuma Uncertainties conference, Apr. 8, 2018:12 pages.
Perrollaz et al., Probabilistic representation of the uncertainty of stereo-vision and application to obstacle detection. 2010 IEEE Intelligent Vehicles Symposium Jun. 2010:6 pages.
Pfeiffer et al., Exploiting the power of stereo confidences. In Proceedings of the IEEE International Conference on Computer Vision and Pattern Recognition, Jun. 2013:4321-28.
Quinonero-Candela et al., Evaluating predictive uncertainty challenge. Machine Learning Challenges Workshop. Springer. Apr. 11, 2005:1-27.
Ross, Introduction to Probability and Statistics for Engineers and Scientists. Academic Press; Aug. 14, 2014;730 pages.
Sandler et al., Mobilenetv2: Inverted residuals and linear bottlenecks. Proceedings of the IEEE conference on computer vision and pattern recognition 2018:4510-20.
Scharstein et al., Semi-Global Stereo Matching with Surface Orientation Priors. arXiv preprint arXiv: 1712.00818. Dec. 3, 2017:12 pages.

(56) References Cited

OTHER PUBLICATIONS

Seki et al., Patch based confidence prediction for dense disparity map. Proceedings of the British Machine Vision Conference Sep. 2016:1-13.
Shaked et al., Improved stereo matching with constant highway networks and reflective confidence learning. Proceedings of the IEEE conference on computer vision and pattern recognition 2017:4641-50.
Spyropoulos et al., Ensemble classifier for combining stereo matching algorithms. IEEE International Conference on 3D Vision, Oct. 19, 2015:73-81.
Thrun et al., Probabilistic Robotics. MIT press, 2005:492 pages.
Tran et al., Deep probabilistic programming. arXiv preprint arXiv:1701.03757. Mar. 7, 2017:18 pages.
Uhrig et al., Sparsity invariant cnns. IEEE International conference on 3D Vision (3DV). Oct. 2017:10 pages.
Wang et al., Image quality assessment: from error visibility to structural similarity. IEEE transactions on image processing. Apr. 13, 2004;13(4):600-12.
Weber et al., A very fast census-based stereo matching implementation on a graphics processing unit. IEEE 12th International Conference on Computer Vision Workshops, ICCV Workshops Nov. 2009:9 pages.
Wei et al., A Monte Carlo implementation of the EM algorithm and the poor man's data augmentation algorithms. Journal of the American statistical Association. Sep. 1, 1990;85(411):699-704.
Zabih et al., Non-parametric local transforms for computing visual correspondence. European conference on computer vision May 1994:8 pages.
PCT/EP2020/058036, Jul. 9, 2020, International Search Report and Written Opinion.

\* cited by examiner (a) Left Rectified Image (b) Right Rectified Image (c) SGM Depth Map Mean Squared Euclidian Distance per disparity for Stereo SGM.

Mean Squared Euclidian Distance per disparity for Mono CNN.

(a) Standard deviation map for Model 2.

(b) Standard deviation map for Model 3.

DEPTH EXTRACTION

RELATED APPLICATIONS

This application is a national stage filing under 35 U.S.C. § 371 of International Patent Application Serial No. PCT/EP2020/058036, filed Mar. 23, 2020, which claims priority to: United Kingdom patent application number GB 1903960.1, filed Mar. 22, 2019; United Kingdom patent application number GB 1903964.3, filed Mar. 22, 2019; United Kingdom patent application number 1903916.3, filed Mar. 21, 2019; and United Kingdom patent application number 1903917.1, filed Mar. 21, 2019. Each of the foregoing applications is incorporated by reference herein in its entirety.

TECHNICAL FIELD

The present disclosure relates to stereo image processing, and depth extraction from images more generally. Stereo image processing may be equivalently referred to herein as "stereo vision". Stereo vision and other depth extraction can be usefully applied in many contexts such as (but not limited to) autonomous vehicles.

BACKGROUND

Various sensor systems are available to estimate depth. The most common are optical sensors, LiDAR, and RADAR. Stereo vision is the estimation of depth from a pair of optical cameras (by contrast, monocular vision requires only one camera).

Stereo vision has many useful applications, one example being robotics. For example, mobile robotic systems that can autonomously plan their paths in complex environments are becoming increasingly more prevalent. An example of such a rapidly emerging technology is autonomous vehicles that can navigate by themselves on urban roads. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

Other mobile robots are being developed, for example for carrying freight supplies in internal and external industrial zones. Such mobile robots would have no people on board. Autonomous air mobile robots (drones) are also being developed. The sensory input available to such a mobile robot can often be noisy. Typically, the environment is perceived through sensors such as based on stereo vision or LiDAR, requiring not only signal processing for smoothing or noise removal, but also more complex "object finding" algorithms, such as for the drivable surface or other agents in the environment.

For example, in an autonomous vehicle (AV) or other robotic system, stereo vision can be the mechanism (or one of the mechanisms) by which the robotic system observes its surroundings in 3D. In the context of autonomous vehicles, this allows a planner of the AV to make safe and appropriate driving decisions in a given driving context. The AV may be equipped with one or multiple stereo camera pairs for this purpose.

In stereo vision, depth is estimated as an offset (disparity) of features on corresponding epipolar lines between left and right images produced by an optical sensor (camera) pair. The depth estimate for a stereo image pair is generally in the form of a disparity map. The extracted depth information, together with the original image data, provide a three-dimensional (3D) description of a scene captured in the stereo images.

Stereo vision is analogous to human vision, so it is intuitive to work with compared to other sensors. It is also relatively inexpensive and can provide dense depth measurement across a whole scene. By contrast, depth estimates from RADAR are often only available for single objects rather than a whole scene, and LiDAR can be expensive and produces sparse measurements.

A stereo image pair consists of left and right images captured simultaneously by left and right image capture units in a stereoscopic arrangement, in which the image capture units are offset from each other with overlapping fields of views. This mirrors the geometry of human eyes which allows humans to perceive structure in three-dimensions (3D). By identifying corresponding pixels in the left and right images of a stereo image pair, the depth of those pixels can be determined as a relative disparity they exhibit. In order to do this, one of the images of a stereoscopic image pair is taken as a target image and the other as a reference image. For each pixel in the target image under consideration, a search is performed for a matching pixel in the reference image. Matching can be evaluated based on relative intensities, local features etc. This search can be simplified by an inherent geometric constraint, namely that, given a pixel in the target image, the corresponding pixel will be appear in the reference image on a known "epipolar line", at a location on that line that depends on the depth (distance from the image capture units) of the corresponding real-world scene point.

For an ideal stereoscopic system with vertically-aligned image capture units, the epipolar lines are all horizontal such that, given any pixel in the target image, the corresponding pixel (assuming it exists) will be located in the reference image on a horizontal line (x-axis) at the same height (y) as the pixel in the target image. That is, for perfectly aligned image capture units, corresponding pixels in the left and right images will always have the same vertical coordinate (y) in both images, and the only variation will be in their respective horizontal (x) coordinates. This may not be the case in practice because perfect alignment of the stereo cameras is unlikely. However, image rectification may be applied to the images to account for any misalignment and thereby ensure that corresponding pixels are always vertically aligned in the images. Hence, by applying image rectification/pre-processing as necessary, the search for a matching pixel in the reference image can conveniently be restricted to a search in the reference image along the horizontal axis at a height defined by the current pixel in the target image. Hence, for rectified image pairs, the disparity exhibited by a pixel in the target image and a corresponding pixel in the reference image respectively can be expressed as a horizontal offset (disparity) between the locations of those pixels in their respective images.

For the avoidance of doubt, unless otherwise indicated, the terms "horizontal" and "vertical" are defined in the frame of reference of the image capture units: the horizontal plane is the plane in which the image capture units substantially lie, and the vertical direction is perpendicular to this plane. By this definition, the image capture units always have a vertical offset of zero, irrespective of their orientation relative to the direction of gravity etc.

SUMMARY

The present invention allows a robust assessment to be made of the uncertainty associated with a depth estimate computed from a stereo image pair. This, in turn, can (for example) feed into higher-level processing, such as robotic planning and decision making; for example, in an autonomous vehicle or other mobile robot. In the context of autonomous vehicles, providing a robust assessment of the level of uncertainty associated with an observed depth estimate—which translates to the level of uncertainty the AV has about its 3D surroundings—allows critical driving decisions to be made in a way that properly accounts for the level of uncertainty associated with the observations on which those decisions are based.

As another example, by tracking, over time, changes in the level of uncertainty associated with stereo depth estimates obtained using a particular stereo camera pair, it is possible to determine the point at which recalibration of the stereo camera pair is needed; for example when the average depth uncertainty reaches a certain threshold. The recalibration can be part of a scheduled maintenance operation (automated or manual) that is performed on an autonomous vehicle.

A first aspect of the present invention computer-implemented method of training a depth uncertainty estimator, the method comprising:

receiving, at a training computer system, a set of training examples, each training example comprising (i) a stereo image pair and (ii) an estimated disparity map computed from at least one image of the stereo image pair by a depth estimator;

wherein the training computer system executes a training process to learn one or more uncertainty estimation parameters of a perturbation function, the uncertainty estimation parameters for estimating uncertainty in disparity maps computed by the depth estimator;

wherein the training process is performed by sampling a likelihood function based on the training examples and the perturbation function, thereby obtaining a set of sampled values for learning the one or more uncertainty estimation parameters;

wherein the likelihood function measures similarity between one image of each training example and a reconstructed image computed by transforming the other image of that training example based on a possible true disparity map derived from the estimated disparity map of that training example and the perturbation function.

This approach to depth uncertainty learning is "unsupervised" (or self-supervised) in the sense that "ground truth" depth data is not required to assess the performance of the depth estimator during the training process. Rather, this assessment is built into the likelihood function, which measures the similarity between one image of each pair and the corresponding reconstructed image.

An alternative would be a supervised learning approach, in which the performance of the depth estimator is evaluated by comparing the depth estimates to corresponding ground truth depth data, such as simultaneously captured LiDAR data. For example, at least in theory, a neural network could be trained using depth estimates as training inputs and corresponding LiDAR data training labels. However, in contrast to the present invention, this would require a large volume of ground truth depth data (such as LiDAR) to be effective, and such data may not be available in practice. In any event, such a system is expected to require significantly more computer resources to train.

Moreover, the present unsupervised approach using stereo images allows access a greater range of training data (which is relatively cheap and easy to collect, as compared with LiDAR). Both volume and variety of training data is important, as these reduce the risk of overfitting to particular conditions. Also, LiDAR data is sparse, so a greater volume of data would need to be collected to cover the same number of pixels.

References are made in the following description to the use of ground-truth LiDAR data. However, this is not used for the purpose of training, but rather to validate the performance of the stereo depth uncertainty estimator after it has been trained using the unsupervised learning method. Validation is an optional step, and in any event the amount of ground truth depth data required for validation (testing) is significantly less than the amount that would be required for supervised learning.

It is generally expected that the above training process would be implemented "offline" and not in real time (although that assessment is made on the basis of current hardware constraints and these may of course change in the future). In an AV context or other mobile robot context, the training process can be performed on board the AV (or other form of mobile robot) itself or at an external training system. Either way, the training process may be applied to training examples comprising stereo image pairs captured using an on-board optical camera pair of the AV in order to determine one or more uncertainty estimation parameters that are specific to that AV camera pair at that particular time. The training process may be re-executed at scheduled intervals in order to update the uncertainty estimation parameters using the most recent available training examples. In particular, this means that any changes in the misalignment of those optical sensors can be detected as changes in the uncertainty estimation parameters (it is generally expected that, the greater the extent of misalignment between the optical sensors, the greater the level of uncertainty associated with the depth estimates). As well as providing up-to-date uncertainty estimates for the purpose of AV planning, if overall (e.g. average) depth uncertainty increases above a certain threshold, this can trigger a recalibration of the optical camera pair (automatic or manual).

That is, in embodiments, changes in depth uncertainty over time can be tracked for a given optical sensor pair by repeating the training process using recently captured training examples and analysing resultant changes in the value(s) of the one or more uncertainty estimation parameters.

In the following description, a perturbation weight is treated as a random variable which can take different values. This is represented in mathematical notation as w, where w can be a scalar (rank 0 tensor) or a tensor of higher rank (such that w corresponds to multiple scalar perturbation weights, each of which is treated as an unknown random variable), and the likelihood function is sampled for different values of w.

In use ("online"), the trained stereo depth estimator can use the one or more uncertainty estimation parameters to provide depth uncertainty estimates for (new) depth estimates computed by the depth estimator. Advantageously, the stereo depth estimator may be implemented as a lookup table containing the one or more uncertainty estimation parameters. A lookup table has the benefit of being fast, operating with O(1) time complexity.

In embodiments, the likelihood function may measure structural similarity between said one image and the reconstructed image.

The structural similarity may be quantified using the structural similarity index (SSIM).

The likelihood function may measure both the structural similarity and pixel-level similarity by directly comparing pixels of the images.

In a first (class of) implementation(s), a true disparity distribution may be determined based on the perturbation function and the estimated disparity map for each training example, wherein the sampling of the likelihood function may comprise sampling the possible true disparity map from the true disparity distribution and evaluating the likelihood function for the sampled possible true disparity map.

The one or more uncertainty estimation parameters may be one or more perturbation weights that at least partially define the perturbation function, wherein:
initial value(s) are may be to the one or more perturbation weights, and
in each of multiple training iterations, the likelihood function may be initially sampled using value(s) of the weights determined in the previous iteration or, in the case of the first iteration, the initial value(s), the value(s) of the perturbation weights being determined in each iteration based on an objective function determined by the sampling of the likelihood function in that iteration, the iterations continuing until a termination condition is satisfied.

Determining the objective function may comprise determining or estimating an expectation of the sampled values, as a function of the one or more perturbation weights.

The training iterations may be performed using Expectation Maximization.

The perturbation function may define a variance of the true disparity distribution for each pixel of the estimated disparity map.

Further or alternatively, the perturbation function may define a mean of the true disparity function for learning bias of the stereo depth estimator.

Alternatively or additionally, the value of the pixel of the estimated display map may define a mean of the true disparity function for that pixel.

The true disparity function may be a pixelwise univariate normal distribution.

The perturbation function may be at least partially defined by the perturbation weights and at least one of the images of training example.

Alternatively or additionally, the perturbation function may be at least partially defined by the perturbation weights and the estimated disparity map of the training example.

At least some of the perturbation weights may define image and/or disparity map features recognized by the perturbation function, such that those features are learned by learning the perturbation weights.

In a second (class of) implementation(s) perturbation function may be at least partially defined by one or more perturbation weights, and the perturbation function may transform the estimated disparity map to obtain the possible true disparity map; wherein the training process may learn one or more parameters of a posterior distribution defined over one or more perturbation weights, the one or more uncertainty estimation parameters comprising or being derived from the one or more parameters of the posterior distribution; wherein the training process may be performed by sampling the likelihood function based on the training examples for different values of the perturbation weights, thereby obtaining a set of sampled values for learning the one or more parameters of the posterior distribution.

Different example forms of the perturbation function (uncertainty models) are set out below—these apply to both the first and the second implementation (classes).

The one or more perturbation weights may be multiple perturbation weights, wherein each pixel of the reconstructed image is computed based a corresponding pixel of the estimated disparity map and one of the perturbation weights which is associated with that pixel of the disparity map.

Said one of the perturbation weights is associated with the value of the corresponding pixel of the disparity map.

Alternatively or additionally, said one of the perturbation weights may be associated with the location of the corresponding pixel of the disparity map.

For example, said one of the perturbation weights may be associated with the location and the value of the corresponding pixel of the disparity map (e.g. as in model 4 described below).

Alternatively or additionally, said one of the perturbation weights may be associated with at least one of: a structure recognition output pertaining to at least that pixel of the disparity map, an environmental condition pertaining to at least that pixel of the disparity map and a motion detection output pertaining to at least that pixel of the disparity map.

Alternatively, the one or more perturbation weights may consist of a single perturbation weight (e.g. as in described model 1 below).

The reconstructed image may be computed for each training example by determining the possible true disparity map based on the disparity estimate of that training example and the one or more perturbation weights, and transforming said one image of that training example based on the modified disparity map.

In the second implementation (class), the one or more parameters of the posterior distribution may be one or more parameters which at least approximately optimize a loss function, the loss function indicating a difference between the posterior distribution and the set of sampled values.

The loss function may indicate a difference between the posterior distribution, $q(w|\sigma)$, as defined over the one or more perturbation weights w and an log likelihood expectation, $\mathbb{E}_{q(w|\sigma)}[\log P(\mathcal{D}_{train}|w)]$, as determined by sampling the likelihood function with respect to the posterior distribution, $q(w|\sigma)$, wherein the loss function is at least approximately optimized so as to determine the one or more parameters, $\sigma=\sigma^*$, of the posterior distribution which at least approximately optimize the loss function.

The loss function may indicate a measure of difference between a divergence term and the set of sampled values, the divergence term denoting a divergence between the posterior distribution and a prior distribution defined with respect to the perturbation weights.

The divergence may be a Kullback-Liebler (KL) divergence.

The loss function may be defined as:

$$KL[q(w|\sigma)\|P(w)] - \mathbb{E}_{q(w|\sigma)}[\log P(\mathcal{D}_{train}|w)],$$

P(w) being the prior distribution, wherein $$\sigma^* = \mathrm{argmin}_\sigma \quad KL[q(w|\sigma)\|P(w)] - \mathbb{E}_{q(w|\sigma)}[\log P(\mathcal{D}_{train}|w)].$$

The prior distribution may be a spike and slab prior.
The loss function may be optimized using gradient descent.

In either implementation (class), the training examples may be evaluated in separate minibatches, and minibatch gradient descent or ascent may be applied to the minibatches to optimize the loss function or objective function.

In a variant of the first implementation, the sampled values may be obtained by directly sampling a distribution of the form:

$$P(w) \prod_i \frac{P(I_{R_i}, I_{L_i}, I_{d_i}|w)}{P(I_{R_i}, I_{L_i}, I_{d_i})}$$

the likelihood function $P(I_{R_i},I_{L_i},I_{d_i}|w)$ being sampled in sampling that distribution.

In any of the above, the depth estimator may be a stereo depth estimator, the disparity maps having been computed from the stereo image pairs by the stereo depth estimator.

In any of the above, the depth uncertainty estimator may be implemented as a lookup table in which the one or more uncertainty estimation parameters are stored for obtaining real-time uncertainty estimates for estimates computed in an online processing phase.

The lookup table may be embodied in electronic storage of a robotic system for use by the robotic system in the online processing phase.

A further aspect herein provides a computer-implemented method of training a depth uncertainty estimator, the method comprising: receiving, at a training computer system, a set of training examples, each training example comprising (i) a stereo image pair and (ii) a depth estimate computed from at least one image of the stereo image pair by a depth estimator; wherein the training computer system executes a training process to learn one or more parameters of a posterior distribution defined over one or more perturbation weights, and thereby learn one or more uncertainty estimation parameters for estimating uncertainty in depth estimates computed by the depth estimator, the one or more uncertainty estimation parameters comprising or being derived from the one or more parameters of the posterior distribution; wherein the training process is performed by sampling a likelihood function based on the training examples for different values of the perturbation weights, thereby obtaining a set of sampled values for learning the one or more parameters of the posterior distribution; wherein the likelihood function measures similarity between one image of each training example and a reconstructed image computed by transforming the other image of that training example based on the depth estimate of that training example and the one or more perturbation weights.

In embodiments, the likelihood function may measure structural similarity between said one image and the reconstructed image.

The structural similarity may be quantified using the structural similarity index (SSIM).

The likelihood function may measure both the structural similarity and pixel-level similarity by directly comparing pixels of the images.

Each depth estimate may be in the form of a depth map.

The depth map may be a disparity map.

The posterior distribution may be defined over a set of multiple perturbation weights.

Each pixel of the reconstructed image may be computed based a corresponding pixel of the depth map and one of the perturbation weights which is associated with that pixel of the depth map. For example, said one of the perturbation weights may be associated with the value of the corresponding pixel of the depth map and/or with the location of the corresponding pixel of the depth map.

Said one of the perturbation weights may be associated with the location and the value of the corresponding pixel of the depth map.

Said one of the perturbation weights may be associated with at least one of: a structure recognition output pertaining to at least that pixel of the depth map, an environmental condition pertaining to at least that pixel of the depth map and a motion detection output pertaining to at least that pixel of the depth map.

Alternatively, the posterior distribution may be defined over a single perturbation weight.

The reconstructed image may be computed for each training example by determining a modified depth estimate based on the depth estimate of that training example and the one or more perturbation weights, and transforming said one image of that training example based on the modified depth map.

The one or more parameters of the posterior distribution may be one or more parameters which at least approximately optimize a loss function, the loss function indicating a difference between the posterior distribution and the set of sampled values.

The loss function may indicate a difference between the posterior distribution, $q(w|\sigma)$, as defined over the one or more perturbation weights w and an log likelihood expectation, $\mathbb{E}_{q(w|\sigma)}[\log P(\mathcal{D}_{train}|w)]$, as determined by sampling the likelihood function with respect to the posterior distribution, $q(w|\sigma)$, wherein the loss function is at least approximately optimized so as to determine the one or more parameters, $\sigma=\sigma^*$, of the posterior distribution which at least approximately optimize the loss function.

The loss function may indicate a measure of difference between a divergence term and the set of sampled values, the divergence term denoting a divergence between the posterior distribution and a prior distribution defined with respect to the perturbation weights.

The divergence may be a Kullback-Liebler (KL) divergence.

The loss function may be defined as:

$KL[q(w|\sigma)\|P(w)] - \mathbb{E}_{q(w|\sigma)}[\log P(\mathcal{D}_{train}|w)]$, P(w) being the prior distribution, wherein $\sigma^* = \text{argmin}_\sigma \quad KL[q(w|\sigma)\|P(w)] - \mathbb{E}_{q(w|\sigma)} [\log P(\mathcal{D}_{train}|w)]$.

The prior distribution may be a spike and slab prior.

The loss function may be optimized using gradient descent.

The training examples may be evaluated in separate minibatches, and minibatch gradient descent may be applied to the minibatches to optimize the loss function.

Alternatively, the sampled values may be obtained by directly sampling a distribution of the form:

$$P(w) \prod_i \frac{P(I_{R_i}, I_{L_i}, I_{d_i}|w)}{P(I_{R_i}, I_{L_i}, I_{d_i})}$$

the likelihood function $P(I_{R_i},I_{L_i},I_{d_i}w)$ being sampled in sampling that distribution.

The sampled values may be obtained by applying Monte Carlo simulation to the likelihood function.

The depth estimator may be a stereo depth estimator, the depth estimates having been computed from the stereo image pairs by the stereo depth estimator. Alternatively, the depth estimate may be computed from a single image of the image pair by a mono depth estimator.

Multiple parameters of the posterior distribution may be determined, which are components of a covariance matrix of the posterior distribution.

Alternatively, a single parameter of the posterior distribution is determined, which is a variance of the posterior distribution.

The depth uncertainty estimator may be implemented as a lookup table in which the one or more uncertainty estimation parameters are stored for obtaining real-time uncertainty estimates for estimates computed in an online processing phase.

The lookup table may be embodied in electronic storage of a robotic system for use by the robotic system in the online processing phase.

In order to sample the likelihood function, the likelihood function may be evaluated for each training example based on that training example and the at least one perturbation weight value.

Subsets of the sampled values may be obtained using different selected sets of one or more candidate perturbation weight values, and in order to obtain each subset of sampled values, the likelihood function may be evaluated, for each of at least some of the training examples, with respect to the set of candidate perturbation weight values selected for the purpose of obtaining that subset of sampled values.

Each perturbation weight value in each set of candidate perturbation weight values may be associated with a possible depth map pixel value. In evaluating the likelihood function to obtain each subset of sampled values, each pixel of each reconstructed image may be computed based on the perturbation weight value which is: (i) part of the candidate set of perturbation weights selected for the purpose of obtaining that subset of sampled values, and (ii) associated with the value of the corresponding pixel of the depth map.

Alternatively or additionally, each perturbation weight value in each set of candidate perturbation weight values may be associated with a predetermined image region, and in evaluating the likelihood function to obtain each subset of sampled values, each pixel of each reconstructed image may be computed based on the selected value of the perturbation weight value which is: (ii) part of the candidate set of perturbation weights selected for obtaining that subset of sampled values, and (ii) associated with that image region.

Alternatively, each set of candidate perturbation weight values may consist of a single perturbation weight value, and in evaluating the likelihood function to obtain each subset of sampled values, each reconstructed image may be computed based on the single perturbation weight value selected for the purpose of obtaining that subset of sampled values.

A second aspect of the invention provides a processing system comprising: electronic storage configured to store one or more uncertainty estimation parameters as determined in accordance with any of the above aspects or embodiments; and one or more processors coupled to the electronic storage and configured to process at least one captured image to determine a depth or disparity estimate therefrom, and use the one or more uncertainty parameters to provide a depth or disparity uncertainty estimate for the depth or disparity estimate.

The one or more uncertainty estimation parameters may be stored in a lookup table embodied in the electronic storage.

The one or more processors may be configured to use the depth or disparity uncertainty estimate and an uncertainty associated with at least one additional perception input to determine a perception output based on the depth or disparity estimate and the additional perception input.

The perception output may be determined using Bayesian fusion.

The additional perception input may be a 2D object detection input and/or the perception output may be a 3D object localization output.

The one or more processors may be configured to execute a decision-making process in dependence on the depth or disparity estimate and the uncertainty estimate.

The decision-making process may be a path planning process for planning a mobile robot path.

The decision-making process may be executed in dependence on the perception output, and thus in dependence on the depth or disparity uncertainty estimate.

The one or more processors may be configured to process a stereo image pair to compute the depth or disparity estimate therefrom.

The processing system may be embodied in a mobile robot, or in a simulator (for example)

The one or more processors embodied in the mobile robot may be configured to carry out the method of the first aspect or any embodiment thereof to determine the one or more uncertainty estimation parameters for storing in the electronic storage.

A third aspect of the invention provides a training computer system comprising one or more processors; and memory configured to hold executable instructions which cause the one or more processors, when executed thereon, to carry out the method of the first aspect or any embodiment thereof.

The training computer system may be embodied in a mobile robot, e.g. in the form of an autonomous vehicle.

Another aspect provides a computer program product comprising executable code which is configured, when executed on one or more processors, to implement the method of the first aspect or any embodiment thereof.

BRIEF DESCRIPTION OF FIGURES

For a better understanding of the present invention, and to show how embodiments of the same may be carried into effect, reference is made to the following figures in which.

DETAILED DESCRIPTION

Figure 1:
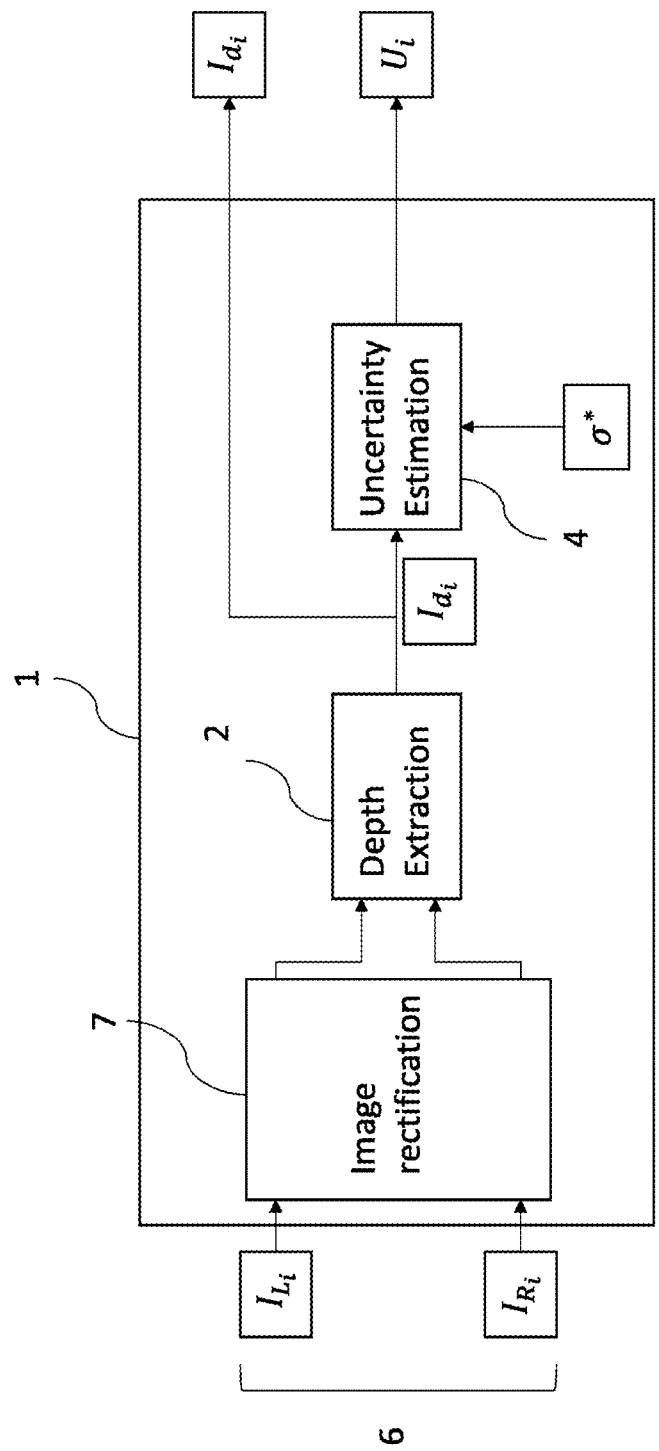
FIG. 1 shows a schematic function block diagram of a stereo image processing system.

A robotic system, such as an autonomous vehicle or other mobile robot, relies on sensor inputs to perceive its environment and thus make informed decisions. For autonomous vehicles, the decisions they take are safety critical. However, sensors measure a physical system and thus are inherently imperfect, they have uncertainty. As a consequence, the robotic system's perception is uncertain. Decisions should therefore be made by taking the uncertainty into account. This paradigm can be described as probabilistic robotics or, in a more general sense, decision making under uncertainty.

Stereo depth estimation allows the locations of objects in 3D space to be determined. However, many methods do not provide uncertainty in their depth estimates. This prevents the application of Bayesian techniques, such as Bayesian Sequential Tracking, data fusion and calibration checks, to algorithms using stereo depth as input. Other methods do provide uncertainty in their depth estimates, but they are too slow for real-time applications.

By contrast, the described embodiments of the invention provide a method for quantifying the uncertainty in disparity estimates from stereo cameras in real-time.

An unsupervised Bayesian algorithm is used to predict the uncertainty in depth predictions. Training uses a pair of rectified stereo images and a disparity image, and is generally performed offline.

A probability density is learned over a "true" disparity map (an unknown latent variable) given a set of perturbation weights to be learned. An Uncertainty Model (UM) defines the relationship between the perturbation weights and an uncertainty map associated with a given depth image and various example UMs are described below. In a first example implementation described below, the probability density is constrained to a Dirac delta function. For certain forms of UM, variational inference can be applied to make the training of the UM computationally tractable on large datasets. The resulting trained UM is simple and can be evaluated with minimal computational overhead online, in real-time. In a second described example implementation, the probability density has less constrained form, and specifically takes a normal (Gaussian) form. In the second implementation, the UM is trained via Expectation Maximum (EM). Both implementations are viable, however, the second implementation has the additional benefit that it can accommodate a broader range of UMs whilst still being particularly efficient to train. In particular, the second implementation can accommodate "feature-based" UMs that take into account image features (i.e. the actual content of the images) in estimating depth uncertainty. For example, it has been observed that depth uncertainty might sometimes increase near the edge of an object, or at or near an occlusion boundary (where one object partially occludes another object). A feature-based UM can take such factors into account based on the content of the image. Note that edges and occlusions boundaries are merely illustrative examples. In the described examples, the image features are nor pre-specified but are learned autonomously using a deep neural network architecture (and it will be appreciated that such learned features are not necessarily conducive to straightforward human interpretation). In general, feature-based UMs can use pre-specified features, learned features or a combination of both.

For the avoidance of doubt, the first implementation is a viable implementation, and can also accommodate feature-based UMs. However, when a feature-based UM is introduced into the first implementation, this may incur a training efficiency penalty (i.e. require more computer resourced for training) because it may be that an optimisation-based sampling algorithm (such as Variational Inference) can no longer be applied in the same way; in that case, training may instead be performed based e.g. on direct sampling (see below), which is generally less efficient. With the second implementation, the training efficiency penalty for feature-dependent UMs is reduced because the more general form of the probability density admits the use of high-efficiency training methods (such as Expectation Maximum) even with feature-based UMs.

The method can also be applied to mono-depth detection from a single image as explained below.

The described method is agnostic to the depth estimation used, which is treated as a "black box".

Moreover, the uncertainty can be computed as a covariance, which allows it to be propagated with Bayesian methods; in turn, allowing it to be used in a probabilistic robotics setting (see below for further details).

The approach fills a gap in the prior art, since no previous uncertainty quantification methods have been presented that run in real-time, allow a Bayesian interpretation and are agnostic to the stereo method used.

Moreover, the training process is unsupervised (i.e. it does not require ground-truth depth data, such as LiDAR), which allows a large, dense and diverse dataset to be cheaply collected (although sparse LiDAR data can be used for verification in the present context, as described later). An alternative would be to use LiDAR data as ground truth for supervised depth uncertainty training. However, a disadvantage of that approach is that LiDAR data is sparse; and whilst interpolation schemes and model fitting can be used to improve the density of LiDAR ground truth, this introduces artefacts which cause the uncertainty measure to be distorted. Hence, the present method has significant benefits over the use of supervised depth estimation training based on ground-truth LiDAR data.

The method can also perform effectively where the noise may be unevenly distributed. This may be due to various reasons, e.g. objects close-by may have a different appearance from the ones far away and reflections may introduce large noise within confined regions.

In an autonomous vehicle (AV) context, real-time depth uncertainty estimation, in turn, can feed into real-time planning and decision making, to allow safe decision making under uncertainty. Autonomous vehicles are presented as an example context in the description below, however it will be appreciated that the same benefits apply more generally in the context of probabilistic robotics based on stereo depth estimation.

In addition, reliable depth uncertainty estimates can be usefully applied in other practice contexts.

A second important application is "sensor fusion", where multiple noisy sensor measurements are fused in a way that respects their relative levels of uncertainty. A Kalman filter or other Bayesian function component may be used to fuse sensor measurements in real-time, but in order to do so effectively, it requires robust, real-time estimates of uncertainty to be provided for each sensor signal to be fused.

For example, distance estimates may be necessary to perceive the static environment and dynamic objects moving in the scene. Distances can be determined from active sensors, such as LiDAR and RADAR, or passive sensors such as monocular or stereo cameras. A robotic system, such as an autonomous vehicle, typically has numerous sensor modes. Quantifying the uncertainty in each of these modes allows the Bayesian fusion of different sensor modalities, which can reduce the overall uncertainty in estimated distances.

Bayesian fusion may require uncertainty estimates in the form of covariances. The present method allows for direct computation of a stereo depth covariance directly, hence a benefit of the method is that is provides a depth uncertainty estimate in a form that can be directly input (without conversion) to a Kalman filter or other Bayesian fusion component (in contrast to existing confidence-based methods, as outlined below). In other words, the method directly provides the uncertainty estimate in the form that is needed for Bayesian sensor fusion in order to be able to fuse it effectively with other measurements in a way that respects uncertainty.

As a third example application, real-time depth estimates may be used to facilitate optical sensor calibration scheduling, as describe later.

By way of testing and validation, the described method has been benchmarked on data collected from the KITTI dataset. The method has been compared to an approach using a CNN to estimate depth and variational drop out to determine the uncertainty. In each case the uncertainty estimate is validated against ground truth. The results are provided at the end of this description. As described in further detail bellow. the method predicts left-right pixel disparity between a stereo camera pair, which is directly related to distance through an inverse mapping and parameterised by the intrinsic camera calibration. The depth uncertainty is quantified in disparity rather than depth space, since the target methods directly operate on pixels (e.g. Semi-global Matching or monocular disparity from CNNs) and thus its errors are naturally quantified in pixel space. Depth errors in disparity space can be straightforwardly converted to distance errors, as needed, based on the inverse mapping between disparity and distance (see below).

Different approaches exist to estimate uncertainty in the outputs of algorithms. If the algorithm is understood well then one can estimate uncertainty in the inputs and propagate these through the algorithm. Alternatively, in a supervised learning approach, ground truth data can be used to find a function which represents the average empirical error (deviation of the algorithm's predictions from the data). In some circumstances this function can be estimated by unsupervised approaches. Bayesian theory offers a computationally tractable and logically consistent approach to understanding uncertainty.

However, disparity uncertainty is deceptively difficult to calculate as the ground truth data available is often insufficient for supervised learning. Sampling based uncertainty algorithms (e.g. MCMC (Markov Chain Monte Carlo) simulation) perform poorly for stereo depth estimates as the disparity images have high dimensionality, and independence assumptions are incorrect since the pixel correlations enforced by the cost functions contribute strongly to the performance of the algorithms. Furthermore, the full cost function of stereo algorithms is expensive to calculate and thus uncertainty in-formation is not available in real-time.

Alternatively, disparity can be estimated from monocular images using a CNN. Variational drop-out is one of the standard methods to obtain predictive uncertainty and thus can be used to quantify the depth uncertainty. However, the process is computationally intensive since it involves multiple passes through the CNN, and thus is not suitable for real-time applications.

Methods exist for determining the confidence in a stereo disparity estimate exist—see [17]. These provide a confidence measure, denoting the probability of a given pixel being correct. However, these provide confidence measures cannot be directly transformed into co-variance matrices, so cannot be used with Bayesian fusion methods. These methods can be adapted to create a covariance matrix, e.g. with the application of the Chebyshev inequality, but this requires resampling, which makes the method insufficiently fast.

The approach to estimating the stereo depth uncertainty described herein provides a system that can be used in real time settings, outputs measures that can be readily transformed into a covariance matrix useful for fusion methods, and is agnostic to the stereo method used.

Figure 15:
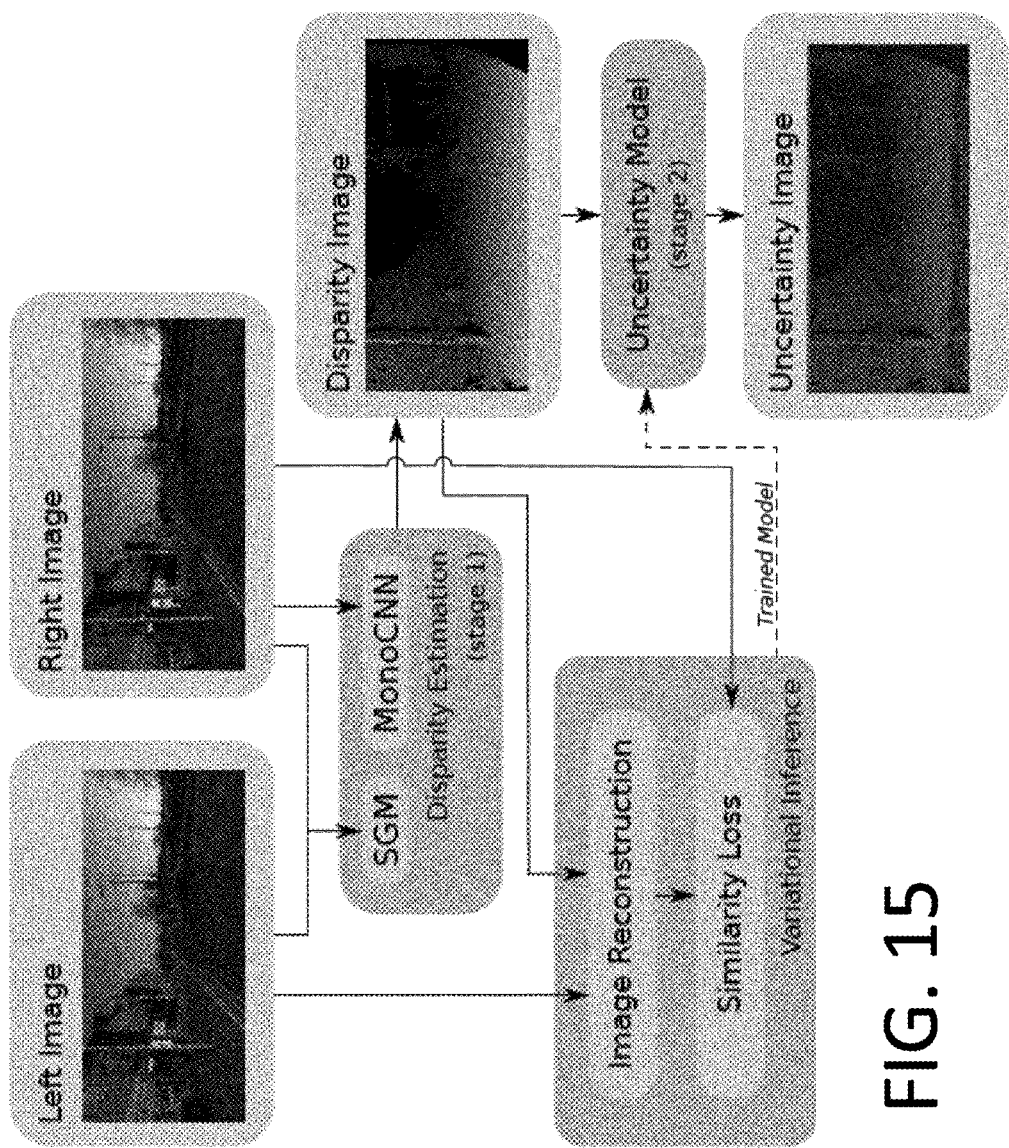
FIG. 15 is a schematic overview illustrating how an uncertainty model may be trained and used in practice.

FIG. 15 is a schematic showing how an uncertainty model is trained and used in practice, in accordance with the described embodiments. At a first stage, a standard disparity estimation technology, such as SGM or CNN, is applied to produces point estimates. At a second stage, an uncertainty model (UM) receives the point estimates as input and predicts the uncertainties—encoded as variances-per pixel. At run-time the UM is implemented as a look-up table detailing the variance. The lookup can be dependent on pixel location and disparity value. The UM can be stored as an array, meaning the result can be looked up in O(1) time.

The UM uses an unsupervised training scheme. Three inputs are given: the left and right rectified stereo images and a disparity map. Importantly for real world applications the unsupervised approach allows a large variety of data, in different environ-mental conditions, to be cheaply collected and processed.

Using the left and disparity images, the right image is reconstructed. The reconstruction is compared with the original right image and structural similarity is used to infer the error in the disparity. With a large corpus of data, the errors can be combined into a variance. The UM training is explained in detail below.

It is noted that, although stereo images are needed in this context to allow the reconstruction and comparisons, the depth estimate itself need not be stereo. Rather, it can be a monocular depth estimate extracted from only one of the images—as shown in FIG. 15, which shows how a depth image may be computed from only the right image. A reconstruction of the right image can be computed, for comparison with the original, in the same way, based on the left image and the mono depth estimate.

The unsupervised training scheme is a form of Bayesian unsupervised machine learning. Depth uncertainty training is performed offline (generally not in real-time) with no requirement for ground truth depth data. Once the training has been completed, depth uncertainty estimation can be performed in real-time at inference, using one or more uncertainty estimation parameters $\sigma^*$ learned in training.

This harnesses the principles of Bayesian theory to provide a computationally tractable and logically consistent approach to understanding depth uncertainty. Uncertainty is represented by probability distributions and inference is performed by applying a probability calculus, in which a prior belief is represented by a prior probability distribution and an understanding of the world is represented by a likelihood function. In most cases, the inference cannot be performed analytically so a sampling-based algorithm is used to perform it approximately. In the first of the described embodiments, the sampling algorithm is an optimisation-based algorithm such as "variational inference". In the second, sampling is performed as part of Expectation Maximization training.

An unsupervised Bayesian reconstruction strategy is used to calibrate several models of the standard deviation of pixels in an SGM (semi-global matching) or other estimated disparity image. Specifically, a search is performed for a standard deviation (scalar or non-scalar) which maximises the log likelihood of a reconstructed image (reconstructed from one image of a rectified stereo image pair), using the structural similarity loss (SSIM) between the reconstructed image and the other image from the rectified pair. This is performed across a set of training data.

The approach may be validated by applying Bayesian Model Selection and posterior checks using ground truth from a validation dataset (containing LiDAR scans collected simultaneously with the training data).

FIG. 1 shows a schematic function block diagram of a stereo image processing system 1. The stereo image processing system 1 is shown to comprise an image rectifier 7, a stereo depth estimator 2 and a stereo depth uncertainty estimator 4. The latter may be referred to simply as the depth estimator 2 and the uncertainty estimator 4 respectively.

The image rectifier 7, depth estimator 2 and the uncertainty estimator 4 are functional components of the stereo image processing system 1 which can be implemented at the hardware level in different ways. For example, the functionality of the stereo image processing system 1 can be implemented in software, i.e. by computer code executed on a processor or processors such as a CPU, accelerator (e.g. GPU) etc., or in hardware (e.g. in an FPGA fabric and/or application specific integrated circuit (ASIC)), or using a combination of hardware and software.

The depth estimator 2 receives rectified stereo image pairs and processes each stereo image pair 6 to compute a depth estimate therefrom, in the form of a depth image. Each stereo image pair 6 consists of a left and right image represented in mathematical notation as $I_{L_j}$ and $I_{R_j}$ respectively. The depth estimate extracted from that pair is in the form of a disparity map represented by $I_{d_j}$.

The image rectifier 7 applies image rectification to the images before the depth estimation is performed to account for any misalignment of the image capture units 8L, 8R. The image rectifier 7 may be re-calibrated intermittently as needed to account for changes in the misalignment, as described later.

There are various known algorithms for stereo image processing. State of the art performance in stereo depth estimation is mainly achieved by the application of Deep Neural Networks, however these neural networks can be time consuming to run online and require power-heavy hardware. Alternative approaches, which do not make use of machine learning, are possible such as Global Matching and Local Matching. Global Matching is too computationally expensive to be used online using current hardware (although that may change as hardware performance increases) and the accuracy of Local Matching is too poor to be used in an industrial context. At the time of writing, a satisfactory balance between accuracy and evaluation time can be achieved by using the known Semi-Global Matching algorithm (SGM). Power efficient real-time hardware implementations of SGM have recently been demonstrated in an industrial context—see United Kingdom Patent Application Nos. 1807392.4 and 1817390.6, each of which is incorporated herein by reference in its entirety. This details a variation of SGM which can be entirely implemented on a low-power FPGA (field programmable gate array) fabric without requiring the use of a CPU (central processing unit) or GPU (graphics processing unit) to compute the disparity map.

When choosing a suitable stereo vision algorithm, there will inevitably be some trade-off between accuracy and speed. For an AV, real-time processing is critical: typically, stereo images need to be processed at a rate of at least 30 frames per second (fps), and potentially higher, e.g. 50 fps (a frame in this context refers to a stereo image pair in a stream of stereo image pairs captures by the AV's optical sensors). It may therefore be necessary to make certain compromises on accuracy in order to achieve the required throughput. In the event that the compromises do need to be made on accuracy in order to achieve sufficiently fast performance, having a robust assessment of the uncertainty associated with the resulting depth estimates is particularly important.

The uncertainty estimator 4 determines an uncertainty estimate $U_j$ for the depth estimate $I_{d_j}$. That is, an estimate of the uncertainty associated with the depth estimate $I_{d_j}$, in the form of an uncertainty image.

Figure 2:
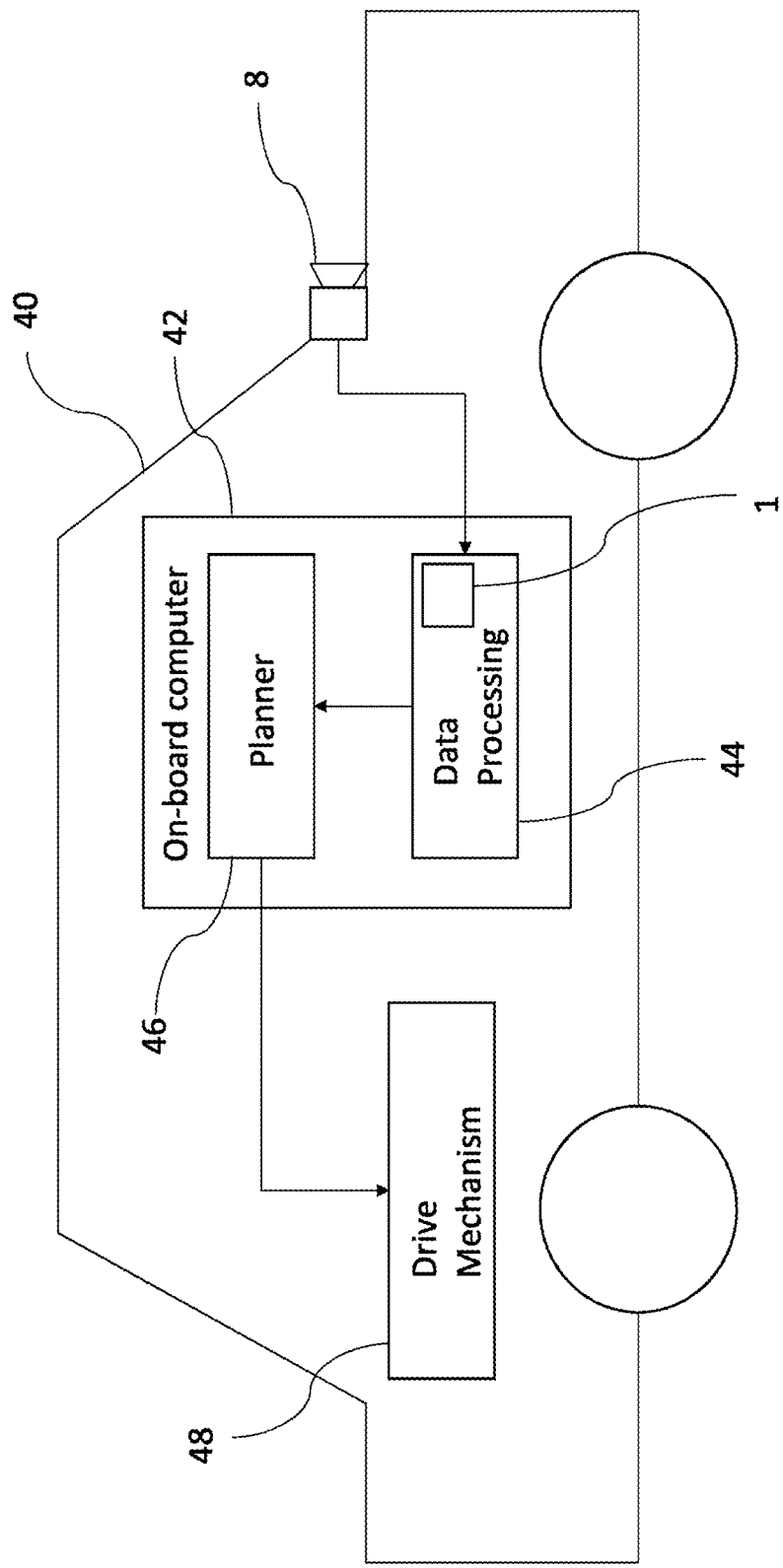
FIG. 2 shows a highly schematic block diagram of an autonomous vehicle.

FIG. 2 shows a highly schematic block diagram of an AV 40. The AV 40 is shown to be equipped with at least one stereo image capture device (apparatus) 8 of the kind referred to above. For example, the AV 40 may be equipped with multiple such stereo image capture devices, i.e. multiple pairs of stereo cameras, to capture a full 3D view of the AV's surroundings. An on-board computer system 42 is shown coupled to the at least one stereo image capture device 8 for receiving captured stereo image pairs from the stereo image capture device 8.

As will be appreciated, at the hardware level, there are numerous ways in which the on-board computer system 42 may be implemented. It is generally expected that it will comprise one or more processors, such as at least one central processing unit (CPU) and at least one accelerator such as a GPU or similar which operates under the control of the CPU. It is also quite feasible that the on-board computer system 42 will include dedicated hardware, i.e. hardware specifically configured to perform certain operations, such as a field programmable gate array (FPGA), application specific integrated circuit (ASIC) or similar. For instance, as noted above, there exist highly efficient variations of SGM depth estimation that may be implemented on a FPGA fabric configured for that purpose. Such dedicated hardware may form part of the on-board computer system 42 along with more general-purpose processors such as CPUs, accelerators etc. which carry out functions encoded in executable computer code (software).

FIG. 2 shows, implemented within the on-board computer system 42, a data processing (sub)system 44 and an AV planner 46. The data processing system 44 and planner 46 are functional components of the on-board computer system 42, that is, these represent particular functions implemented by the on-board computer system 42. These functions can be implemented in software, i.e. response to computer code executed on one or more processors of the on-board computer system 42 and/or by any dedicated hardware of the on-board computer system 42.

The stereo image processing system 1 of FIG. 1 forms part of the data processing system 44. The general function of the data processing system 44 is the processing of sensor data, including images captured by the stereo image capture device 8. This may include low-level sensor data processing such as image rectification, depth extraction etc., as well as somewhat higher-level interpretation, for example, computer vision processing (object detection in 2D and 3D, image segmentation, object tracking etc.). The output of the data processing system 44, which may be complex and highly sophisticated, serves as a basis on which the AV planner 46 makes driving decisions autonomously. This includes immediate low-level decisions to be taken by the vehicle such as rotating the steering by a certain number of degrees, accelerating/decelerating by a certain amount through braking, acceleration etc. as well as more long-term high-level planning decisions on which those low-level action decisions are based. Ultimately it is the output of the planner 46 that controls a drive mechanism 48 of the AV 40, which is coupled to the necessary components of the AV in order to be able to implement those decisions (such as the engine, transmission, braking/acceleration systems, steering etc.).

Moreover, the functions described in relation to FIG. 2 can be implemented off-board, that is in a computer system such as a simulator which is to execute those functions for modelling or experimental purposes. In that case, stereo image pairs may be taken from computer programs running as part of a simulation stack.

Figure 3:
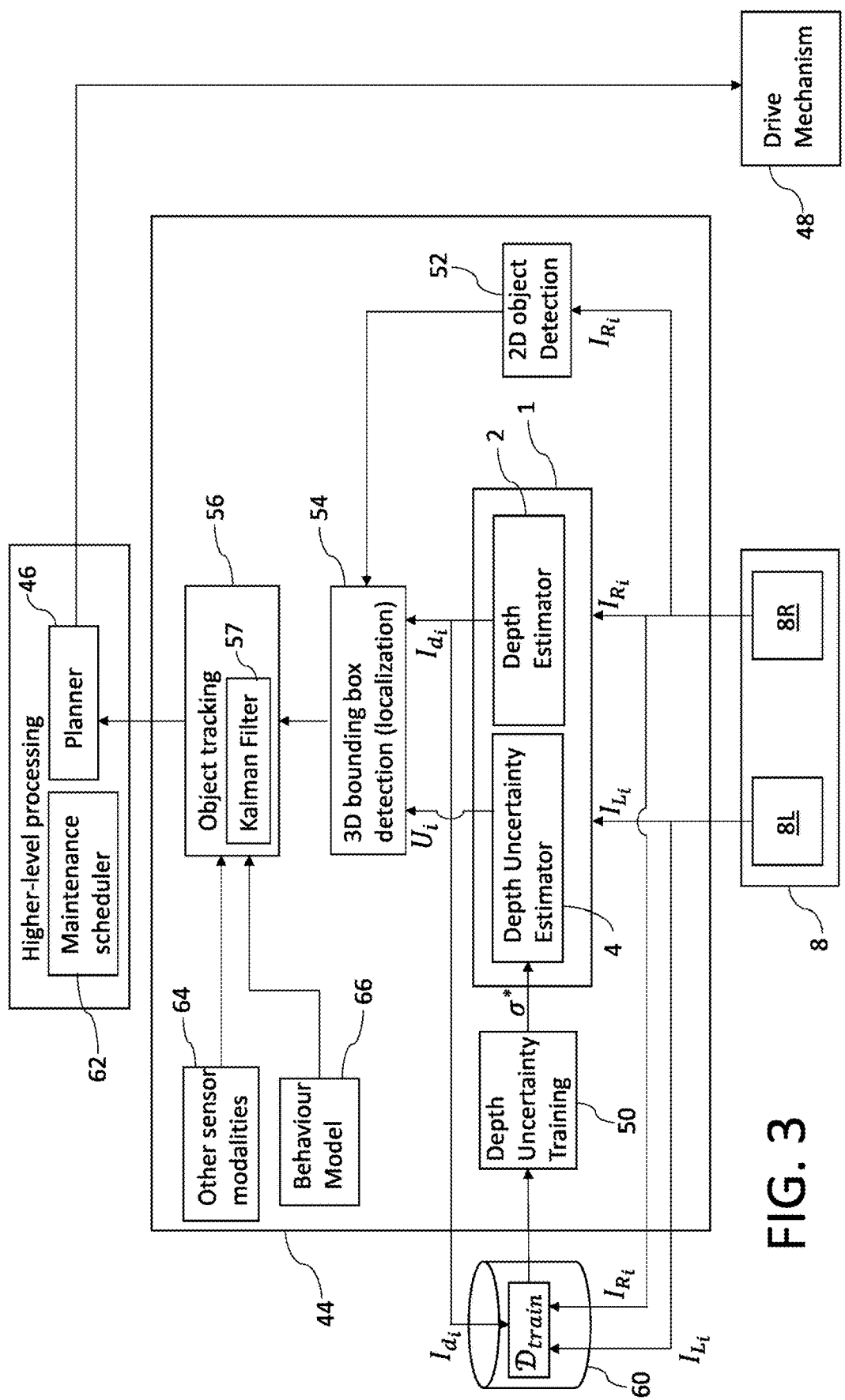
FIG. 3 shows a function block diagram of an AV processing pipeline.

FIG. 3 shows a schematic functional block diagram of a processing pipeline representing functions implemented within the on-board computer system 42 in further detail. In addition to the stereo image processing system 1, the data processing system 44 is shown to comprise a depth uncertainty training component 50, a two-dimensional (2D) object detector 52, a 3D object localisation component in the form of a 3D bounding box detector 54 and an object tracker 56. The stereo image processing system 1 is shown coupled to both left and right image capture units 8L, 8R of the stereo image capture device 8 to receive left and right images therefrom. The stereo image processing system 1 processes such image pairs as described above in order to provide a depth estimate for each stereo pair (from the depth estimator 2) and an uncertainty estimate for each such depth estimate (from the depth uncertainty estimator 4).

In addition, left and right stereo images captured by the stereo image capture device 8 are stored in a data store of the autonomous vehicle 40. That is, in on-board persistent electronic storage 60 of the AV 40 which is not shown in FIG. 2 but is shown in FIG. 3.

Such stereo image pairs are stored in the persistent electronic storage 60 as training data ($\mathcal{D}_{train}$) for use by the depth uncertainty training component 50.

Although not indicated in FIG. 3, the images may be stored after rectification has been applied by the image rectifier 7, i.e. the training data may comprise the rectified versions of the stereo images.

This stored training data additionally comprises, for each stereo image pair of the training data $I_{L_i}, I_{R_i}$, a corresponding depth estimate $I_{d_i}$ which has been estimated from that stereo image pair by the depth estimator 2. Hence, the output of the depth estimator 2 is shown in FIG. 3 as providing part of the training data. Note that not every stereo image pair and corresponding depth estimate needs to be stored as training data. As explained below, the stereo image pairs used for training are captured sufficiently far apart in time that they can be assumed to be independent hence it may be appropriate to store only a relatively small fraction of captured stereo images in the persistent electronic storage 60 for the purpose of depth uncertainty training.

The depth uncertainty training component 50 uses the stored training data $\mathcal{D}_{train}$ to compute value(s) of the one or more uncertainty estimation parameters σ*. The training process that is executed by the depth uncertainty training component 50 to learn these parameters is described in detail below.

The training process is executed on an intermittent basis according to a schedule that is determined by a diagnostics and maintenance scheduler 62 of the AV 40. For example, the training process may be repeated on a daily or weekly basis or in any other way specified by the schedule in order to regularly update the uncertainty estimation parameters se. Each instance (repetition) of the training process is executed based on training data which has been collected since the previous most-recent iteration of the training process in order to provide up-to-date uncertainty estimation parameters. It is generally expected that each iteration of the training process will be executed during an interval of "downtime" when the AV 40 is stationary and operating in a diagnostics mode, and therefore has available computing resources which can be used to execute the training process.

Although the depth uncertainty training component 50 is shown to be implemented within the on-board computer system 42, the collected training data could instead be uploaded to an external training computer system for executing the training process at the external training computer system. In that event, once the training process has been executed externally, the depth uncertainty estimation parameters σ* obtained as a result can be downloaded from the external training system to the AV 40. Once downloaded, those parameters can be used in exactly the same way. It will thus be appreciated that all references herein to a training computer system can, depending on the context, refer to the on-board computer system 42 of the AV 40 itself or to an external training computer system to which the relevant training data D train is provided.

Stereo depth uncertainty estimates from the uncertainty estimator 4 are propagated through the pipeline of the data processing system 44 such that they ultimately feed into driving decisions that are taken by the AV planner 46. An example of the manner in which stereo depth uncertainty estimates can propagate through the pipeline in this manner up to the planner 46 will now be described with reference to FIG. 3.

FIG. 3 shows the 3D bounding box detector 54 receiving, from the stereo depth processing system 1, both depth estimates computed from stereo image pairs and the corresponding depth uncertainty estimates.

In addition, the 3D bounding box detector 54 is shown coupled to an output of the 2D object detector 52. The 2D object detector 52 applies 2D object detection to images captured by the right image capture unit 8R. The 2D object detector 52 applies 2D object detection to images captured by the right image capture unit 8R in order to determine 2D object bounding boxes within those images and an uncertainty estimate for each detected 2D bounding box. 2D object detection methods and methods for estimating the uncertainty associated therewith are well known and are therefore not described in any further detail herein.

Although not shown in FIG. 3, 2D object detection is performed on rectified right images. More generally, depth estimates and 2D object detection are provided in a common frame of reference, so their outputs can be meaningfully combined. In the present context, each depth estimate $I_{d_i}$ produced by the depth estimator 2 is a disparity map for the corresponding right image (i.e. the image captured by the right image capture unit 8R). In the terminology of stereo vision, the right images are target images and the left images serve as reference images. It is generally most appropriate to use the right images as target images for left-hand drive vehicles in which the right image capture unit 8R will be positioned closest to the centre line of the road i.e. closest to where a human driver would be seated in a regular vehicle. For right-hand vehicles it will generally be more appropriate to use the left images as the target images and to apply 2D object detection etc. to the left images instead of the right images. In general, 2D object detection is applied to whichever images serve as the target images within the depth estimation process.

The 3D bounding box detector 54 uses the depth estimates and 2D bounding boxes to determine 3D bounding boxes for each detected 2D bounding box. That is, a bounding box in three-dimensional space which provides an approximation of the location, orientation and size of each corresponding object in 3D space. This is quantified as a 3D location, pose and dimensions (height, length, width) that define each 3D bounding box. In addition, the 3D bounding box detector 54 uses the estimated depth uncertainty and the uncertainty associated with each 2D bounding box to compute an estimated uncertainty for each 3D bounding box.

3D bounding box estimates and their associated uncertainties serve as inputs to the object tracker 56. The primary function of the object tracker 56 is to determine correspondence between objects captured at different times. That is to say, the object tracker 56 is the component that determines that a particular object captured in a stereo image pair at time t1 is the same as an object captured and detected in a stereo image pair at time t2. In the case of moving objects, this allows a trajectory of particular objects to be tracked in space over time. In addition to the 3D bounding boxes, the object tracker 56 also receives inputs from other sources which it uses for this purpose. For example, it may receive data corresponding to other sensor modalities such as LiDAR, RADAR etc. denoted by reference numeral 64. The object tracker 56 is also shown to receive inputs from an object behaviour model 66 which provides information about the expected behaviour of certain types of objects such as other vehicles. If a reasonable assumption can be made about how a certain type of object (e.g. vehicle) does and does not behave, then the object tracker 56 can leverage that knowledge to ensure that the conclusions it is making about object correspondence are generally consistent with the expected behaviour of that type of object. The inputs received from the other sensor modality/modalities 64 and the behaviour model 66 also have associated uncertainty estimates. The object tracker uses a Kalman filter 57 to combine the various inputs it receives in a manner that gives appropriate weight to their relative uncertainty. Generally, this means giving greater weight to inputs with a relatively lower level of uncertainty. In the present context, the uncertainty associated with the 3D bounding box detection depends on the lower-level depth uncertainty estimates provided by the depth uncertainty estimator 4 as well as the 2D object detection uncertainty. Hence the depth uncertainty estimates are at least partially determinative as to the weight given by the object tracker 56 to 3D bounding box detection versus the other inputs it receives (other sensor modalities and modelled behaviour in this example). Hence it can be seen that, in order to effectively combine measurements and information from multiple sources for the purpose of object tracking, robust estimates of the respective uncertainties associated with those inputs are needed.

Object tracking results are provided by the object tracker 56 as an output which serves as a basis for driving decisions made by the planner 46.

As well as allowing the object tracker 56 to combine such inputs in a way that respects their relative uncertainties, the object tracker 56 may also use these uncertainty estimates to provide an uncertainty estimate for its own object tracking output. This object tracking uncertainty estimate can then in turn, be taken into account in the driving decisions taken by the planner 46.

It can thus be seen that estimated depth uncertainty influences critical driving decisions taken by the AV planner 46, because the depth uncertainty may influence both the object tracking output and the uncertainty associated with the object tracking output at any given time.

Object tracking in the present context generally refers to the tracking of external objects such as other vehicles and pedestrians relative to the autonomous vehicle 40. This allows the behaviour of other such actors to be taken into account.

Figure 3A:
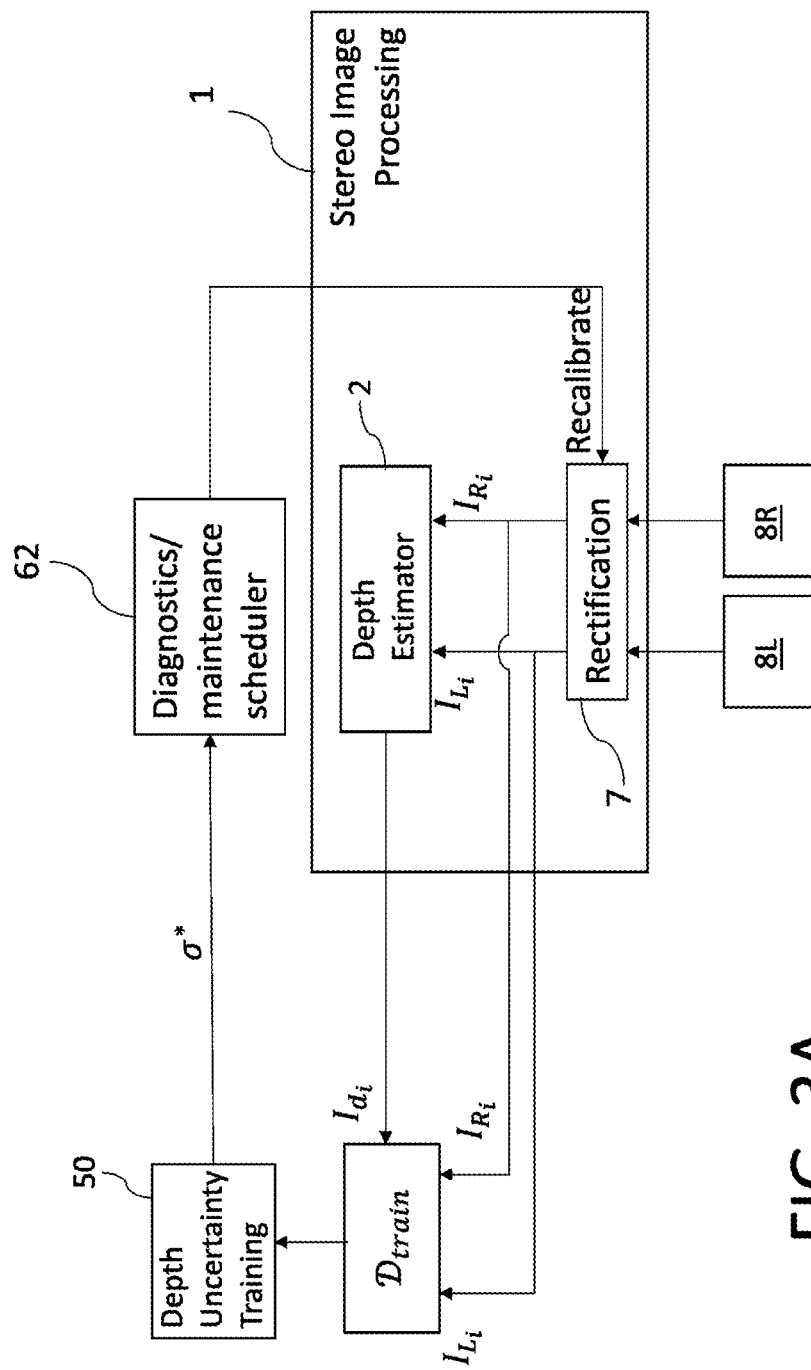
FIGS. 3A and 3B show further details of an AV processing pipeline.

FIG. 3A shows further details of the processing pipeline which are omitted from FIG. 3, and which are relevant to optical sensor calibration. FIG. 3A shows how changes observed in the uncertainty estimation parameters σ* can cause the diagnostics and maintenance scheduler 62 to instigate a (manual or automatic) re-calibration of the image rectification applied by the image rectifier 7 of the stereo image processing system 1.

By executing the training process repeatedly, changes in the uncertainty associated with stereo depth estimates can be tracked, and in particular any general trends of increasing depth uncertainty can be detected. Such changes made for example result from physical disruption to the stereo image capture device 8. For example, even slight shifts in the relative orientation of the stereo image capture unit 8L, 8R (i.e. changes in their misalignment) can mean that any rectification that is applied to the captured stereo image pairs within the stereo image processing system 1 no longer fully compensates for the misalignment of the image capture units 8L, 8R. Such changes in the extent of misalignment between the left and right image capture units 8L and 8R can be detected as an increase in the average uncertainty associated with depth estimates produced by the depth estimator 2. For this reason, the uncertainty estimation parameters σ* are shown to be provided as an input to the diagnostics and maintenance scheduler 62 for the purpose of detecting general increases in the average depth uncertainty. If the new value(s) of the uncertainty estimation parameters σ* meet a calibration trigger condition (e.g. if the average uncertainty increases above a certain threshold), then the diagnostics and maintenance scheduler 62 can schedule an appropriate calibration action such as a recalibration of the image rectifier 7 for the stereo image capture units 8L, 8R. This can be an automatic calibration process performed by the AV 40 or it can be a manual calibration that is instigated in response to an alert or other notification instigated by the diagnostics and maintenance scheduler 62 when the calibration trigger condition is met.

This is another example of practical context in which robust stereo uncertainty estimates can drive important decisions that are taken by or in relation to an autonomous vehicle 40.

Figure 3B:
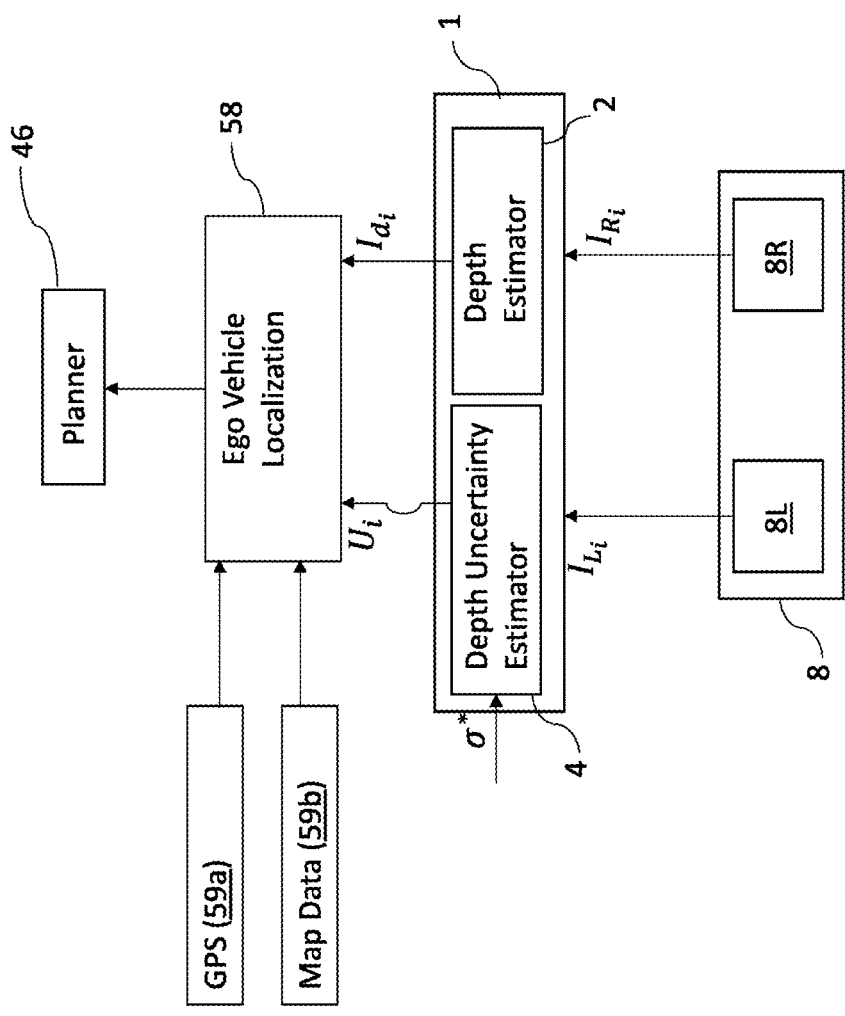

FIG. 3B shows additional details of the processing pipeline, which are omitted from FIG. 3, and which relate depth uncertainty in the context of vision-based ego-vehicle localization.

In addition to external object tracking, the AV 40 also needs to have some understanding of its own location relative to its surroundings. For example, the autonomous vehicle 40 needs to understand where it is currently located relative to surrounding road structure etc.

The function of an ego vehicle localisation component 58 is to determine a location of the autonomous vehicle 40 (the ego vehicle) relative to its surroundings, and in particular its location on the road. It can use a variety of information sources to do this including, for example, satellite positioning data 59*a* (e.g. GPS) and road map data 59*b*. In addition, in the present example, the ego vehicle localisation component 58 also uses image data as a basis for localisation. By applying image segmentation to images captured by (in this example) the right image capture unit 8R, it can detect and identify surrounding road structure at various levels of granularity. This detected road structure can then be matched to the predetermined map data 59*b* in order to determine the location of the AV 40 on a road map encoded in the road map data 59*b*. For further details of this kind of "vision-based localisation" see International Patent Application No. PCT/EP2019/056355, which is incorporated herein by reference in its entirety. In brief, this discloses the use of vision-based localisation together with other forms of localisation which are combined using a particle filter, Kalman filter or similar in a way that respects their relative levels of uncertainty. Depth data is used in this context to transform images captured by the right image capture unit 8R into a co-ordinate system that can be compared to the map data 59*b*. In general, the map data 59*b* encodes a 2D high definition (HD) road map and, in order to compare detected road structure with the road map, this needs to be projected geometrically into the plane of the road map. This provides a top-down view of detected road structure in the vicinity of the AV 40 which can be matched to corresponding road structure on the road map. The projected road structure has an uncertainty associated with it which comes from a combination of the uncertainty associated with the image segmentation process that is applied to detect the road structure but also the uncertainty associated with the depth data that is used to perform the geometric projection into the plane of the road map. These two uncertainty estimates are combined in order to provide an overall measure of uncertainty associated with the vision-based localisation. This in turn can be used to combine the vision-based localisation results with other localisation inputs such as GPS 59*a* in a way that respects their respective levels of uncertainty. This is described in further detail in the above-referenced document. The output of the ego vehicle localisation process also serves as an input on which planning decisions by the AV planner 46 are based, and this is therefore another way in which depth uncertainty can influence AV driving decisions.

Returning to FIG. 1, as noted above, the uncertainty estimate $U_i$ is determined based on one or more uncertainty estimation parameters $\sigma^*$. The one or more uncertainty estimation parameters $\sigma^*$ are predetermined in an offline training phase using a form of unsupervised machine learning. This is described in detail later.

Herein, $\sigma^*$ may be referred to as a set of uncertainty estimation parameters or similar (noting for the avoidance of doubt that a parameter set can contain multiple parameters or consist of a single parameter). The depth estimate $I_{d_i}$ for the stereo image pair 6 and the uncertainty estimate $U_i$ for that depth estimate $I_{d_i}$ are provided as associated outputs of the stereo image processing system 1.

As described in further detail below, the determination of the uncertainty estimate $U_i$ is dependent on a selected "perturbation model" (uncertainty model).

FIG. 1 shows the uncertainty estimator 4 coupled to the depth estimator 2 for receiving the depth estimate $I_{d_i}$, and for certain perturbation models the uncertainty $I_{U_i}$ is indeed computed based on a combination of the uncertainty estimation parameters $\sigma^*$ and the values of the disparity map $I_{d_i}$. However, for other perturbation models, the estimated uncertainty $U_i$ may be independent of the actual computed values of the disparity map $I_{d_i}$. In that case, the uncertainty estimation parameters directly provide the uncertainty estimate for every computed disparity map. Illustrative perturbation model examples are described later.

The stereo image processing system 1 process stereo image pairs in real-time—for example, at a rate of at least 10-30 image pairs per second, to produce that number of depth estimates per second. The rate can be different on different cameras, and it will be appreciated that frame rates of 10 Hz and 30 Hz are given merely by way of example.

Figure 4:
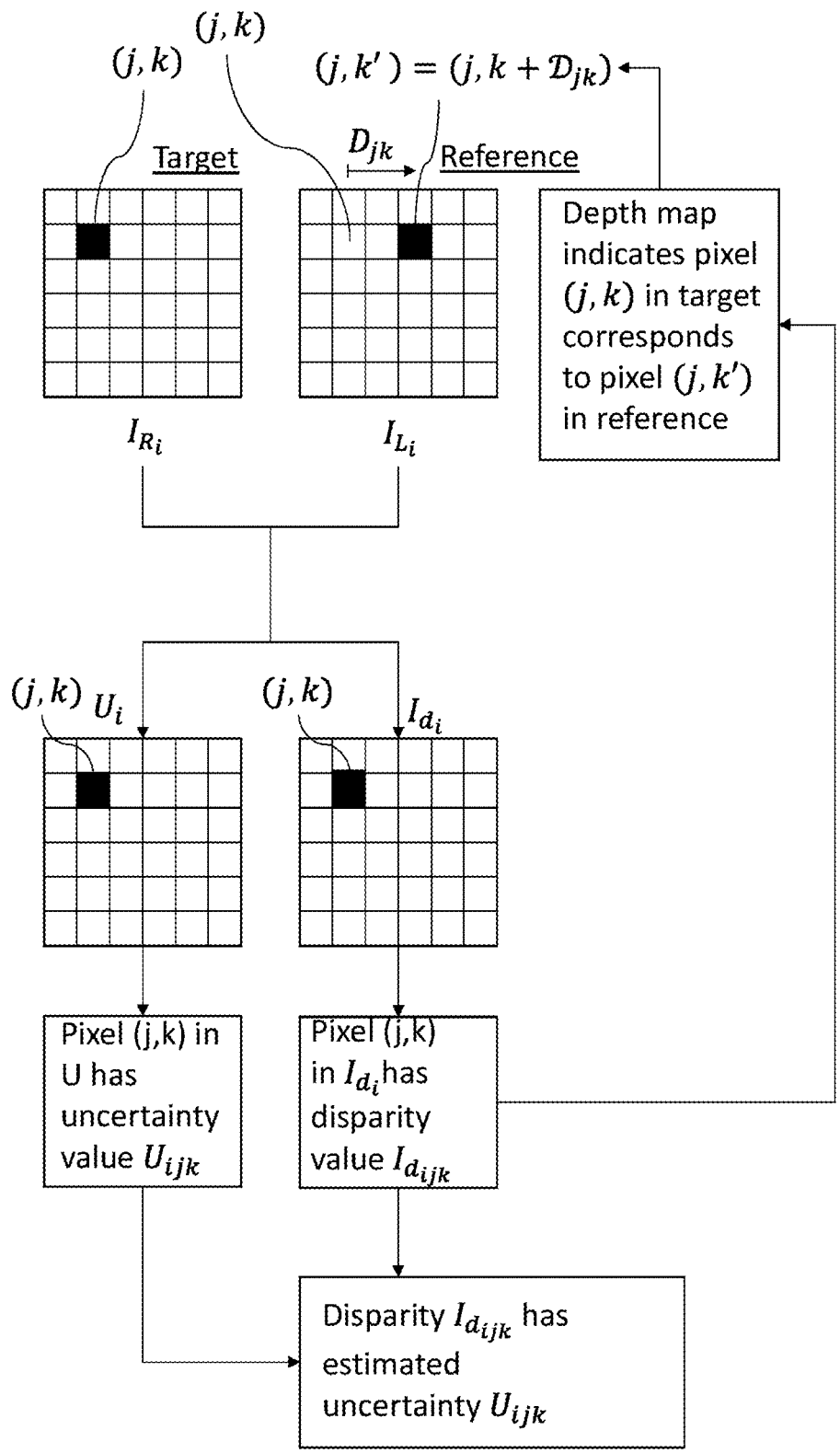
FIG. 4 illustrates the relationship between a stereo image pair, a disparity map estimated therefrom, and an uncertainty estimated for the depth map.

FIG. 4 is a schematic diagram which illustrates the relationship between a stereo pair of images $I_{L_i}$, $I_{R_i}$, the disparity map $I_{d_i}$ estimated for that image pair, and the uncertainty estimate $U_i$ for that depth estimate $I_{d_i}$.

Unless otherwise indicated, the subscript i herein is a frame index. A frame in this context means a stereo image pair, hence $I_{L_i}$, $I_{R_i}$ constitute frame i and $I_{d_i}$ is the depth estimate for frame i. The index i serves as a label for the tuple $I_{R_i}$, $I_{d_i}$).

The disparity map $I_{d_i}$ is a rank 2 tensor having dimensions J×K, where the value of each component (pixel) of $I_{d_i}$ is a disparity for pixel (j,k) in the target image of the stereo image pair 6:

$$I_{d_i} = (I_{d_{ijk}}) = \begin{pmatrix} I_{d_{i,0,0}} & \cdots & I_{d_{i,0,K}} \\ \cdots & \ddots & \cdots \\ I_{d_{i,J,0}} & \cdots & I_{d_{iJK}} \end{pmatrix} \quad \text{Equation 1}$$

Herein, "pixel (j,k)" means the pixel at location (j,k) in the relevant tensor; or, more precisely, the pixel of that tensor having index (j,k). In the above notation, the value of pixel (j,k) is $I_{d_{ijk}}$.

In the present example, the left image $I_{L_i}$ is used as the reference image, hence according to the estimated disparity map $I_{d_i}$, pixel (j,k) of the right image $I_{R_i}$ (the target image) corresponds to pixel (j,k') of the left image $I_{L_i}$ with:

$$k' = k + I_{d_{ijk}} \quad \text{Equation 2}$$

That is, pixel (j,k) in $I_{R_i}$ is estimated to correspond to the pixel in $I_{L_i}$ that is horizontally offset from location (j,k) by an amount $I_{d_{ijk}}$.

The principles of stereo (stereographic) image processing are well known and are therefore only described briefly in order to provide context to the above.

Figure 5:
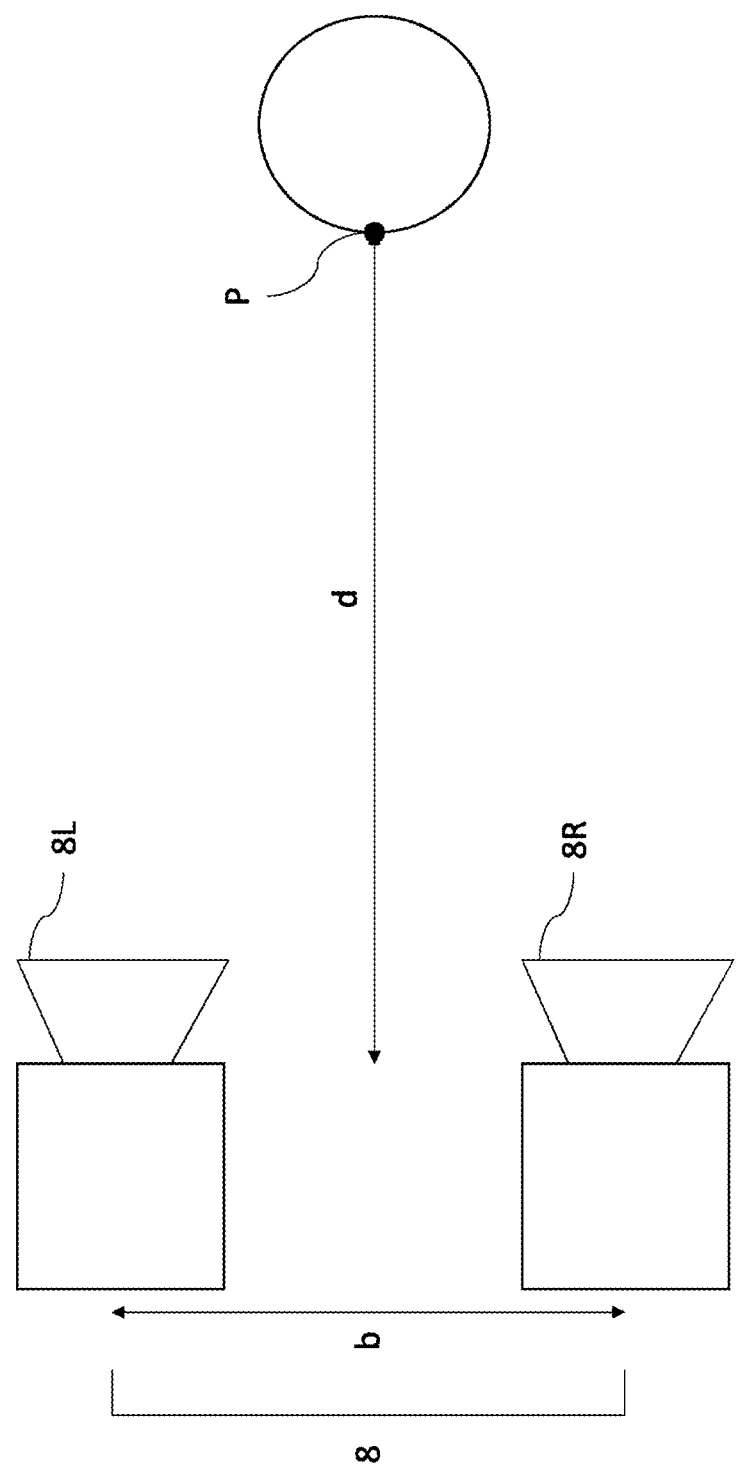
FIG. 5 shows a schematic plan view of a stereo image capture device.

FIG. 5 shows a highly schematic plan view of a stereo image capture device 8 comprising left and right image capture units (equivalently referred to herein as cameras or optical sensors). The left and right image capture units are denoted by reference numerals 8L and 8R respectively. The image capture units 8L, 8R have overlapping fields of view such that at least part of an object 10 is contained within both fields of view. The image capture units 8L, 8R simultaneously capture left and right images $I_{L_i}$ and $I_{R_i}$ respectively.

Those simultaneously captured left-right images $I_{L_i}$, $I_{R_i}$ constitute a stereo image pair. The object 10 (or at least part of it) appears in both of the images $I_{L_i}$ and $I_{R_i}$. However, the relative location of that object 10 in each of the images may be different and such differences are used to infer the depth of the object.

In the plan view of FIG. 5, it can be seen that the image capture units 8L and 8R are horizontally offset from each other by a distance b (the baseline). A point P on the object 10 (scene point) has a depth d relative to the image capture device 8, i.e. it is a distance d away from the image capture units 8L, 8R in a direction generally parallel to their optical axes.

Returning to the top-half of FIG. 4, assuming scene point P corresponds to pixel (j,k) in the right image $I_{R_i}$ (target image), then that scene point P will correspond to the pixel horizontally offset from that pixel by an amount bf/d where b is the baseline, $f$ is the focal length of the cameras, and d is the depth of point P. The aim of the depth estimation is to determine values for the disparity map such that:

$$I_{d_{ijk}} \approx \frac{bf}{d} \qquad \text{Equation 3}$$

The depth estimation does this by searching for matching pixels in the left and right images based on intensity/feature matching etc., in order to compute $I_{d_{ijk}}$.

This assumes that each of the cameras 8L, 8R has the same focal length, although this is not essential as techniques exist for dealing with cameras with unequal focal length.

Hence the depth d of pixel (j,k) in the right image $I_{R_i}$ can be estimated in units of distance from the computed disparity $I_{d_{ijk}}$ given sufficient knowledge about the relevant physical attributes $f$, b of the image capture units 8L, 8R.

Regarding terminology, it is noted for the avoidance of doubt, it that the disparity map $I_{d_i}$ may be referred to herein as a depth estimate. In general, a "depth estimate" can be any depth information extracted from a stereo image pair, such as a disparity map (which is considered to quantify depth in inverse units of distance and on a scale that depends on the camera geometry and optics).

As will be apparent, this assumes that the left and right images $I_{L_i}$, $I_{R_i}$ have been rectified such that, for every pixel in $I_{L_i}$, the corresponding pixel is only ever horizontally offset from the location of that pixel in the right image, i.e. the vertical offset between corresponding pixels in the left and right images is always zero. Rectification is the process of making the images $I_{L_i}$, $I_{R_i}$ co-planar. This ensures that epipolar lines in the images are horizontal, so that each scene point's projection in the images can only be offset horizontally and not vertically. This is a geometric transformation determined as part of a camera calibration process and applied to each stereo image pair 6 that is captured by the stereo image capture device 8 within the stereo image processing system 1 (by the image rectifier 7).

Returning to FIG. 4, the granularity of the uncertainty estimate $U_i$ depends on the perturbation model. It can be a single uncertainty value associated with the depth map $I_{d_i}$ as a whole (as in perturbation model 1 below), or it can be a set of uncertainty values associated either with respective regions (e.g. "superpixels") of the depth map $I_{d_i}$ (as in perturbation model 3 below) or with individual pixels (as in perturbation model 2 below).

In the example of FIG. 4, the uncertainty estimate $U_i$ is provided at pixel-level granularity: it is therefore a rank 2 tensor having dimensions matching those of the disparity map $I_{d_i}$, and the value of each pixel (j,k) of the uncertainty estimate $U_L$ indicates the level of uncertainty associated with the corresponding pixel (j,k) of the disparity map $I_{d_i}$. That is, in mathematical notation, $U_{ijk}$ is the estimated level of uncertainty in disparity $I_{d_{ijk}}$.

The uncertainty $U_i$ in the estimated disparity map $I_{d_i}$ is estimated herein according to the principles of Bayesian statistics.

Figure 6:
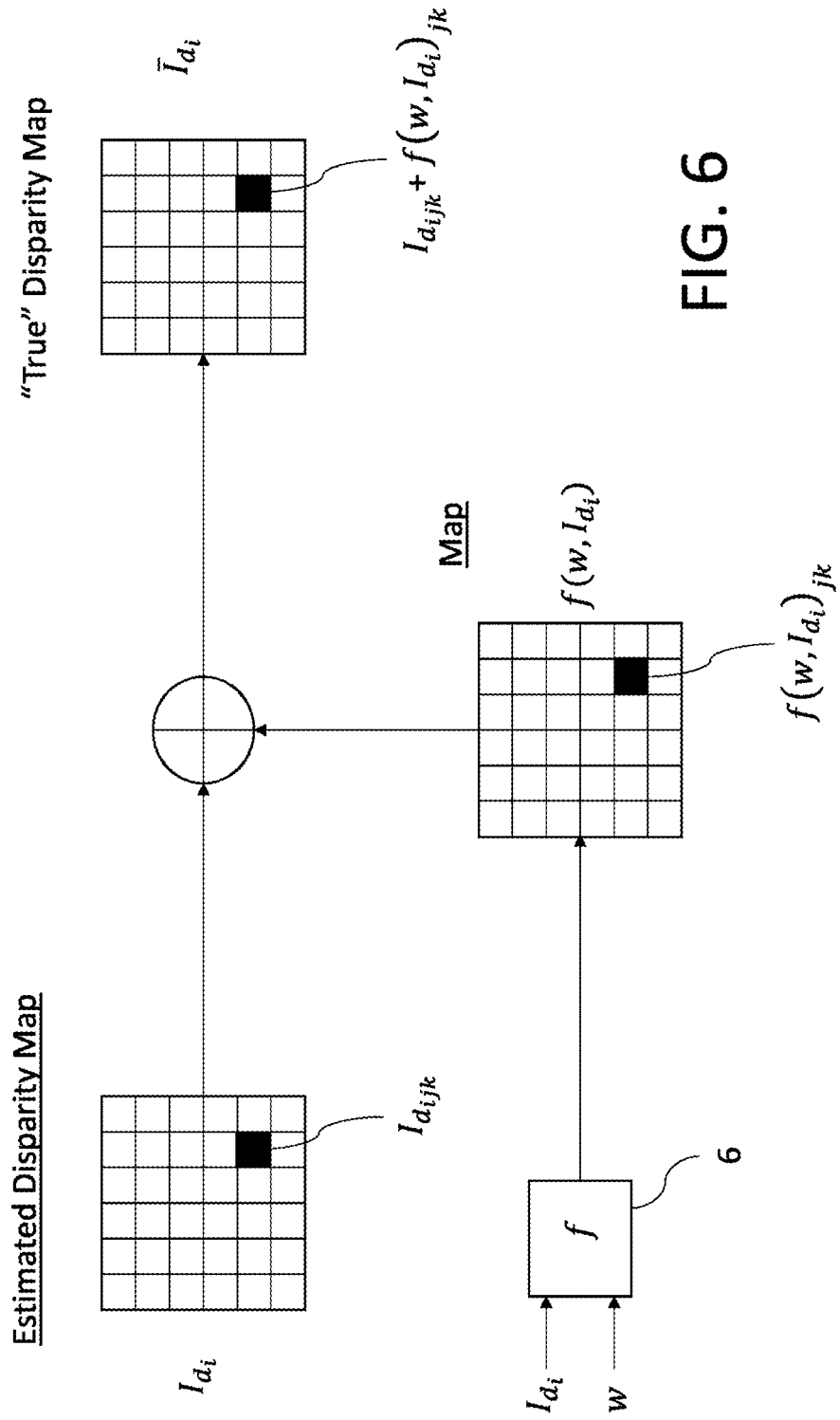
FIG. 6 shows a schematic function block diagram of a perturbation function.

With reference to FIG. 6, given any estimated disparity map $I_{d_i}$ computed by the depth estimator 2, it is notionally assumed there exists some "true" disparity map represented by $\bar{I}_{d_i}$, which may differ from the estimated disparity map $I_{d_i}$. The true disparity map $T_{d_i}$ is of course unknown. However, although the true disparity $\bar{I}_{d_i}$ cannot itself be determined, it is possible to estimate a probability distribution for the true disparity map $\bar{I}_{d_i}$ given the estimated probability distribution $I_{d_i}$. This is represented using Bayesian notation as:

$$P(\bar{I}_{d_i}|I_{d_i}). \qquad \text{Equation 4}$$

In other words, given any estimated disparity map $I_{d_i}$, the probability distribution indicates the probability that the true disparity map is actually $I_{d_i}$. In this context, the true disparity $T_{d_i}$ is treated as an unknown variable (specifically an unknown rank 2 tensor) and the probability that the true disparity $\bar{I}_{d_i}$ takes a given set of values can be estimated given the disparity estimate $I_{d_i}$ that has actually been computed.

The distribution $P(\bar{I}_{d_i}|I_{d_i})$ may be considered a "generative noise model"—where the true disparity map is treated an unknown "true" signal $\bar{I}_{d_i}$ and the estimated disparity map $I_{d_i}$ is a "noisy" signal that is actually observed.

The uncertainty estimate $U_i$ is, in turn, determined as a covariance of the distribution $P(\bar{I}_{d_i}|I_{d_i})$, as described later.

First Example Implementation:

In order to make the necessary computations tractable, a suitable perturbation model is selected. The perturbation model embodies a set of assumed restrictions on the relationship between the unknown true disparity map $\bar{I}_{d_i}$ and the given disparity estimate $I_{d_i}$. In other words, although the true disparity map $T_{d_i}$ is unknown, the perturbation model places some reasonable constraints on the possible values that $\bar{I}_{d_i}$ can take for any given estimated disparity map $I_{d_i}$.

A number of example perturbation models are described later. Underpinning each of the described perturbation models is an assumption that the difference between the true disparity $\bar{I}_{d_i}$ and the given disparity estimate $I_{d_i}$ is captured as a function that depends, at most, on the disparity estimate $I_{d_i}$ and a set of one or more unknown perturbation weights w whose value(s) are unknown. That is to say, an assumption that:

$$\bar{I}_{d_i} = I_{d_i} + f(w, I_{d_i}) \qquad \text{Equation 5}$$

where $f$ is one example of what is referred to herein as a "perturbation function" denoted by reference numeral 26 in FIG. 4. The perturbation function $f$ can take various functional forms, as described later. The output of the perturbation function, for a given estimated disparity map $I_{d_i}$ and a given set of perturbation weights w, is a "perturbation map" $f(w, I_{d_i})$. The perturbation map $f(w, I_{d_i})$ is a rank 2 tensor whose dimensions match $\bar{I}_{d_i}$ and $I_{d_i}$. Pixel (i,j) of the perturbation $f(w, I_{d_i})$ is denoted $f(w, I_{d_i})_{jk}$ (or, equivalently,) and represents the difference between the corresponding pixels of the true and estimated disparity maps.

As will be appreciated, w may be treated as a rank 0 tensor in the case of a single perturbation weight and higher rank tensor in the case of multiple perturbation weights.

It is assumed that:
- the (set of) perturbation weight(s) w is independent of the estimated disparity $I_{d_i}$ and the left and right images $I_{L_i}$, $I_{R_i}$ from which $I_{d_i}$ has been computed (any dependency of on the estimated disparity comes from the perturbation function $f$ itself); and
- if there are multiple perturbation weights, these are independent of each other.

Based on these assumptions, a "posterior" probability distribution over the perturbation weights w can be estimated given a suitable set of training data $\mathcal{D}_{train}$:

$$P(w|\mathcal{D}_{train}) \quad \text{Equation 6}$$

The motivation is that $P(\bar{I}_{d_i}|I_{d_i})$ can be derived from $P(w|\mathcal{D}_{train})$.

To construct a perturbation model, a parametric form for the perturbation map is selected which encodes the constraints on the relationship between the estimated and true disparity maps $I_{d_i}, \bar{I}_{d_i}$.

Note, the notation $f(w, I_{d_i})$ reflects the fact that the perturbation function depends at most on w and $I_{d_i}$. However, in some models, the perturbation function may be independent of $I_{d_i}$ and depend only on the one or more perturbation weights w.

Offline unsupervised learning is used to estimate the posterior distribution $P(w|\mathcal{D}_{train})$. As explained in detail below, $P(w|\mathcal{D}_{train})$ in the first example implementation, is assumed to be a normal (Gaussian) distribution represented as:

$$q(w|\sigma) = \mathcal{N}(w; 0, \sigma^2) \quad \text{Equation 7}$$

Note: $\mathcal{N}(w; 0, \sigma^2)$ may be written as $N(0, \sigma^2)$ for simplicity below.

With a single perturbation weight, this is a univariate Gaussian with scalar variance $\sigma^2$. With multiple perturbation weights, this is a multivariate Gaussian with covariance matrix $\sigma^2$. The covariance matrix is diagonal to encode the assumption that the weights are independent of each other.

The purpose of training is to find value(s) of $\sigma$ which provide the best fit of $q(w|\sigma)$ to the training data $\mathcal{D}_{train}$. The one or more uncertainty estimation parameters $\sigma^*$ referred to above and shown in FIG. 1 correspond to the value of a (scalar variance or diagonal matrix) which provides the best fit to the training data.

Figure 7:
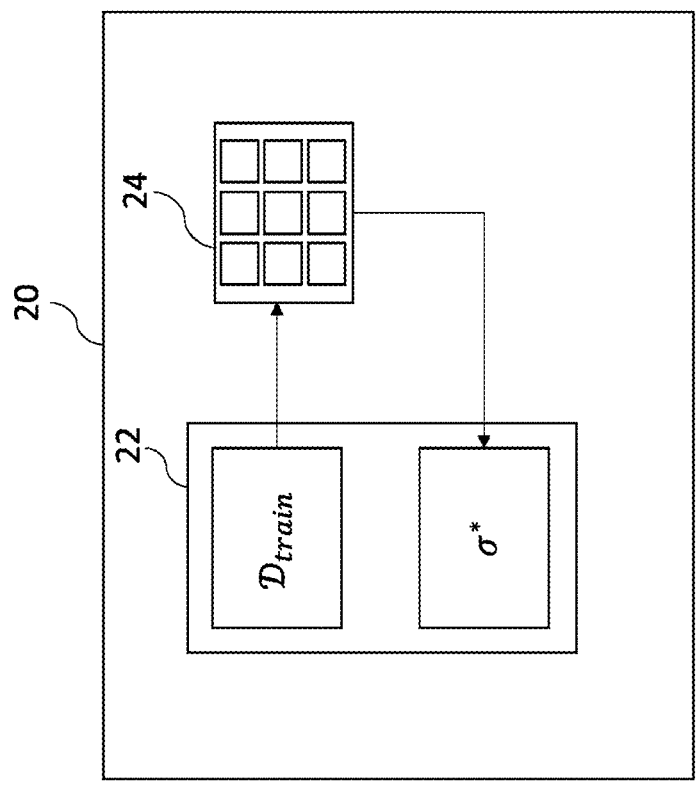
FIG. 7 shows a schematic block diagram of a training computer system.

FIG. 7 shows a schematic block diagram of a training computer system 20 in which the unsupervised training process is executed. The training computer system 20 is shown to comprise memory 22 in which the training data $\mathcal{D}_{train}$ is stored. The training process is executed on one or more processors of the training system 20. In FIG. 7, a plurality of processors 24 are shown in a parallel computing arrangement. Typically, this will include at least one CPU and one or more accelerators (such as GPUs) which operate under the control of the CPU to carry out the training process. The processors 24 are coupled to the memory 22. Each of the processors fetches instructions (not shown) from the memory 22 and executed those instructions (computer code) to perform operations of the training process. During the training process, the training data $\mathcal{D}_{train}$ is processed in order to ultimately obtain the one or more depth estimation parameters $\sigma^*$, which are determined in the training process to provide the best fit of $q(w|\sigma)$ to the training data $\mathcal{D}_{train}$.

The training process is described in the context of SGM depth estimation. However, no assumptions are made about the specifics of the depth estimation algorithm—this is treated as a "black box". Hence, the described techniques can be applied to any form of depth estimate.

An unsupervised strategy is used to train SGM uncertainty models using stereo image pairs collected from an optical camera pair and SGM disparity map estimates computed from those stereo image pairs. Each individual training example consists of one stereo image pair and the disparity map computed from it. For each training example, an expected right image is reconstructed from the left image and the disparity map and compared with the actual right image in a probabilistic Bayesian framework so that the uncertainty in the disparity map can be measured.

The depth estimator 2 of FIG. 1 is treated as a "quick-to-evaluate black box", which outputs a (best estimate) disparity image, $I_{d_i}$, given the left and right images, $I_{L_i}$ and $I_{R_i}$. The disparity image is aligned with the right image, such that it is a map from pixel coordinates in the right image to their horizontal offset in the left image.

The training data can be collected in road tests by a vehicle on which stereo image capture devices are mounted. This can for example be collected as the vehicle drives though urban settings. After collecting data from road tests, a dataset of images is obtained:

$$\mathcal{D} = (I_{R_i}, I_{L_i}, I_{d_i}) \quad \text{Equation 8}$$

where $(I_{R_i}, I_{L_i}, I_{d_i})$ constitutes an individual training example; $I_{R_i}$ and $I_{L_i}$ being right and left images of a stereo pair, and $I_{d_i}$ being the estimated disparity map computed from $I_{R_i}, I_{L_i}$ by the depth estimator 2.

In certain contexts, it may be appropriate to partition 7) into training and validation sets $\mathcal{D}_{train}, \mathcal{D}_{test}$. However, in contexts where validation is omitted, $D = \mathcal{D}_{train}$.

An unknown probability density over the disparity map is assumed to take the form:

$$P(\bar{I}_{d_i}|w, I_{d_i}) = \delta(\bar{I}_{d_i} - (f((w, I_{d_i}) + I_{d_i})) \quad \text{Equation 9}$$

with perturbation weights (parameters) w, that produces the "true" disparity map, $\bar{I}_{d_i}$, given the SGM estimated disparity map, $I_{d_i}$. Here, $\delta(x)$ is the Dirac delta function which has a singularity at $x=0$ and is zero for all other values of x. The above equation simply amount to an expression of the fact that, if the perturbation parameters w were known, then, given a disparity estimate $I_{d_i}$, the true disparity would be known to be $\bar{I}_{d_i} = f(w, I_{d_i}) + I_{d_i}$ (the value of $\bar{I}_{d_i}$ at which a singularity occurs in the delta function). This simply a way of encoding the definition of the perturbation function with a continuous variable w. Of course, the perturbation weights w are unknown—which is accounted for in the following by treating w as an unknown random variable.

Given the unknown probability density function over the disparity map, the posterior distribution over the perturbation parameters w, given training data, $P(w|\mathcal{D}_{train})$, is inferred in the manner described below.

As noted above, finding the covariance of the distribution representing the generative noise model, $P(\bar{I}_{d_i}|I_{d_i})$ is the primary main motivation for finding the posterior distribution over the weights, $P(w|\mathcal{D}_{train})$. Applying to the principles of Bayesian statistics, the generative noise model can be determined from the posterior distribution as follows:

$$P(\bar{I}_{d_i}|I_{d_i}) = \mathbb{E}_{P(w|\mathcal{D}_{train})}[P(\bar{I}_{d_i}|w, I_{d_i})] \quad \text{Equation 10}$$

The posterior distribution is estimated using variational inference, which is an optimization-based sampling method. Variational inference is known per se. For example [1], which is incorporated herein by reference in its entirety, sets out the principles of variational inference in another context.

Herein, those same general principles are applied to the problem of depth uncertainty training.

In order to determine a suitable likelihood function to be optimized by variational inference, first Bayes' law is applied to yield:

$$P(w|\mathcal{D}_{train}) = \frac{P(\mathcal{D}_{train}|w)P(w)}{P(\mathcal{D}_{train})} \quad \text{Equation 11}$$

Independence of training examples is assumed to yield:

$$P(w|\mathcal{D}_{train}) = P(w)\prod_i \frac{P(I_{R_i}, I_{L_i}, I_{d_i}|w)}{P(I_{R_i}, I_{L_i}, I_{d_i})} = \quad \text{Equation 12}$$

$$P(w)\prod_i \frac{P(I_{R_i}|w, I_{L_i}, I_{d_i})P(I_{L_i}, I_{d_i}|w)}{P(I_{R_i}|I_{L_i}, I_{d_i})P(I_{L_i}, I_{d_i})} =$$

$$P(w)\prod_i \frac{P(I_{R_i}|w, I_{L_i}, I_{d_i})}{P(I_{R_i}|I_{L_i}, I_{d_i})}$$

The second equality follows form the definition of conditional probability and the final equality follows from the independence of the perturbation weights w from the training examples (see above), i.e.:

$$P(I_{L_i}, I_{d_i}|w) = P(I_{L_i}, I_{d_i}) \quad \text{Equation 13}$$

Or, to put it another way, knowledge of the perturbation weights does not provide any additional knowledge about the probability of the occurrence of $I_{L_i}$ and $I_{d_i}$ (absent knowledge of the right image).

Independence between training images by ensuring that the training set is composed of frames collected suitably far apart so the scene is sufficiently different. In practice, care should also be taken to ensure that a variety of weather conditions are present in the training data set.

Here, $P(I_{R_i}|I_{L_i}, I_{d_i})$ is a marginal likelihood, which acts as a normalising constant in Equation 12, and $P(w)$ is a prior over w.

The likelihood function is obtained by reconstructing the right image from the left image, by resampling the left image using the disparity map. That is, for each training example, a reconstructed image is computed from the left image and the disparity map for comparison with the right image. The reconstructed image is denoted as:

$$\tilde{I}_{R_i}(I_{L_i}, I_{d_i}) \quad \text{Equation 14}$$

Note that this operation is differentiable (see [15]).

The reconstructed right image can then be compared to the true right image to yield the likelihood function (log likelihood—the numerator in Equation 11):

$$\log P(I_{R_i}|w, I_{L_i}, I_{d_i}) = \quad \text{Equation 15}$$

$$\frac{N_{pixels}}{N_{valid\ pixels}}\int \alpha\left(\left(\frac{SSIM(I_{R_i}, \tilde{I}_R(\tilde{I}_{d_i}, I_{L_i}))}{2} - \frac{1}{2}\right) - \right.$$

$$\left. \kappa\left|I_{R_i} - \tilde{I}_R(\tilde{I}_{d_i}, I_{L_i})\right|\right) P(\tilde{I}_{d_i}|w, I_{d_i}) d\tilde{I}_{d_i}$$

This is derived as follows. Applying the principles of Bayesian statistics:

$$P(I_{R_i}|w, I_{L_i}, I_{d_i}) = \mathbb{E}_{P(\tilde{I}_{d_i}|w, I_{d_i})}[P(I_{R_i}|w, I_{L_i}, I_{d_i}, \tilde{I}_{d_i})] = \quad \text{Equation 16}$$

$$\int d\tilde{I}_{d_i} P(\tilde{I}_{d_i}|w, I_{d_i})P(I_{R_i}|I_{L_i}, \tilde{I}_{d_i}) =$$

$$P(I_{R_i}|I_{L_i}, I_{d_i} + f(w, I_{d_i}))$$

In this context, the right image $I_{R_i}$ is treated as an unknown random variable for the purpose of the calculations. The simplification in the final line of Equation 16 is simply a reflection of the fact that, if the true disparity $I_{d_i}$ is known and the left image $I_{L_i}$ is also known, the perturbation weights w and the estimated disparity map $I_{d_i}$ provide no additional information that is relevant to the probability of the right image $I_{R_i}$, hence:

$$P(I_{R_i}|w, I_{L_i}, I_{d_i}, \tilde{I}_{d_i}) = P(I_{R_i}|I_{L_i}, \tilde{I}_{d_i}) \quad \text{Equation 17}$$

As assumption is then made that $\log P(I_{R_i}|I_{L_i}, \tilde{I}_{d_i})$ is proportional to (i) the structural similarity and (ii) the direct pixel similarity between $I_{R_i}$ and the reconstructed image $\tilde{I}_{R_i}(I_{L_i}, \tilde{I}_{d_i})$.

Here, SSIM represents the structural similarity operator between images, which is differentiable, and |•| represents the sum of absolute errors on an image (that image being formed of the pixel-wise difference values between the right image and the reconstructed image). The former captures the structural comparison of the images and the latter the direct pixel-wise comparison.

The term $N_{pixels}$ is the number of pixels in the image (e.g. 512×1120), $N_{valid\ pixels}$ is the number of valid, i.e. non-NaN pixels in the image (Not a Number pixels—which can occur in certain floating point systems and effectively represent "missing" pixels) and κ and α are arbitrary positive constants (since the log likelihood must be negative). Note that not all pixels might be valid depending on the disparity estimation method: e.g. SGM only converges for a sub-set of all pixels.

SSIM (the Structural Similarity Index) is a known function for making a structural comparison of images. It is computed by comparing defined window regions within the images, as is known in the art.

Returning to Equation 15, it follows by integrating-out the delta function in Equation 9 that the likelihood function is given by:

$$\log P(I_{R_i}|w, I_{L_i}, I_{d_i}) = \quad \text{Equation 18}$$

$$\frac{N_{pixels}}{N_{valid\ pixels}} \alpha\left(\left(\frac{SSIM(I_{R_i}, \tilde{I}_R(I_{d_i} + f(w, I_{d_i}), I_{L_i}))}{2} - \frac{1}{2}\right) - \right.$$

$$\left. \kappa\left|I_{R_i} - \tilde{I}_R(I_{d_i} + f(w, I_{d_i}), I_{L_i})\right|\right)$$

Hence, the likelihood function can be evaluated algorithmically for any given training example $(I_{R_i}, I_{L_i}, I_{d_i})$ and any given value(s) of the perturbation weight(s) w as follows:
1. Determine a reconstructed image by:
   a. modifying the estimated disparity map $I_{d_i}$ based on the given value(s) of the perturbation weight(s) w, as $I_{d_i} + f(w, I_{d_i})$—i.e. by applying the perturbation function $f$ defined by the given weight value(s) to the estimated disparity map, and transforming the depth estimate according to the resultant perturbation map $f(w, I_{d_i})$;

b. transforming the left image $I_{L_i}$ based on the modified disparity map to obtain the reconstructed image $\tilde{I}_R(I_{d_i} + f(w, I_{d_i}), I_{L_i})$.

2. Comparing the actual right image $I_{R_i}$ and the reconstructed image based on a combination of:
   a. a Direct pixel comparison; and
   b. a structural similarity comparison (e.g. SSIM).

Figure 8:
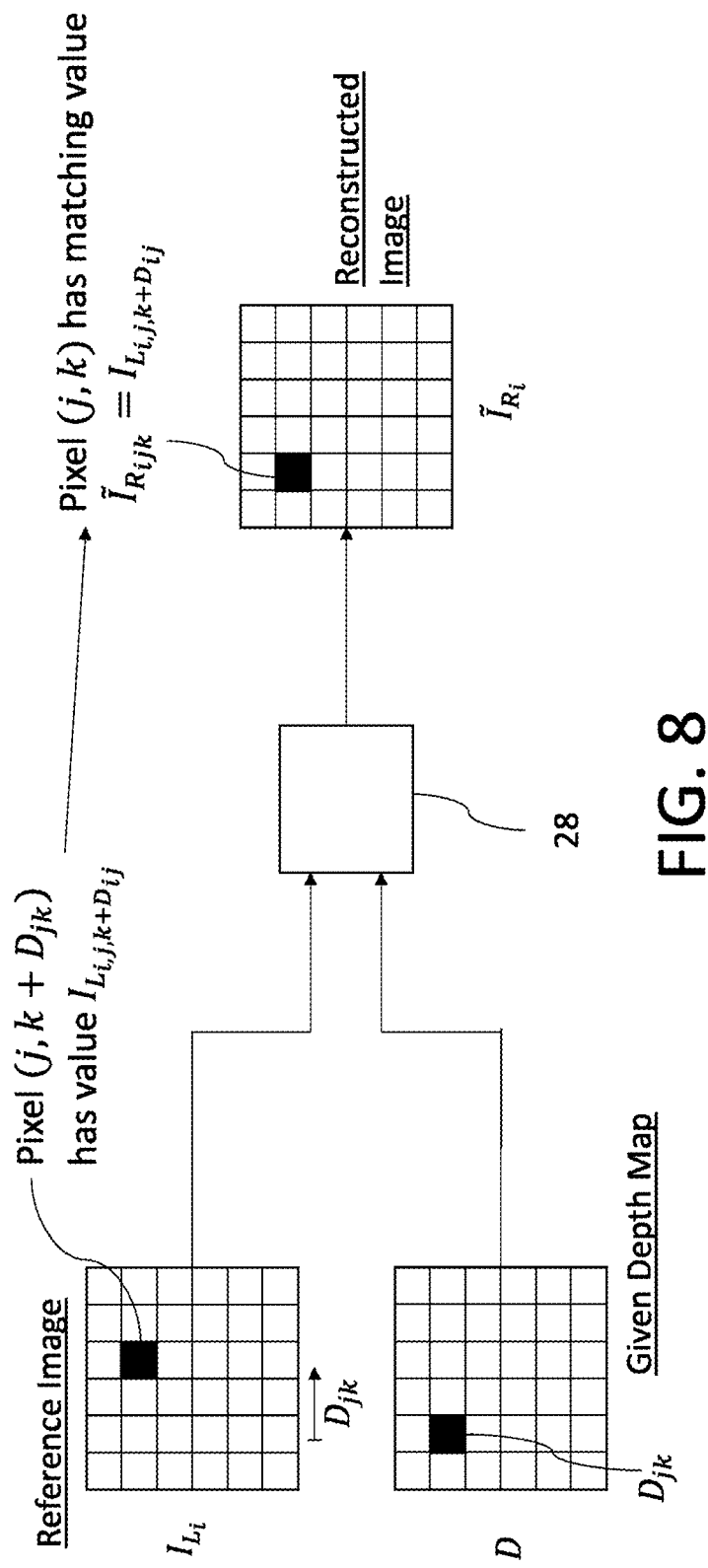
FIG. 8 shows a schematic function block diagram of an image reconstruction function.

FIG. 8 illustrates the operation an image reconstruction function 28 which transform the left image $I_{L_i}$ based on a given disparity map D (which will be the modified disparity map at 1.b. above). Recall that the left image is taken as the reference image for the purpose of stereo depth extraction. Hence, according to a given disparity map D, pixel (j,k) in the right image $I_{R_i}$ corresponds to pixel (j,k+$D_m$) in the left image $I_{L_i}$. To generate the reconstructed image, the image reconstruction function 28 simply sets the value of each pixel (j,k) in the reconstructed image $\tilde{I}_{R_i}$ to match the value of pixel (j,k+$D_{jk}$) in the left image $I_{L_i}$ where $D_{jk}$ is the value of pixel (j,k) in the given disparity map D, i.e.

$$\tilde{I}_{R_{ijk}} = I_{L_i, j, k+D_{jk}}.$$

Perturbation Model Selection

In order to allow the above to serve as a basis for computations, a perturbation model is selected. The perturbation model is a parametric form for the disparity perturbation map, $f(w, I_{d_i})$. The following four models are considered by way of example.

Models 1 to 4 are described with reference to FIGS. 9A-D respectively. Additional details each model are shown in these Figures, and the description returns to those details later.

Model 1—"UM-Constant" (FIG. 9A):

The simplest model: the same perturbation is applied to each pixel. This results in P(w I $\mathcal{D}_{train}$) being a probability distribution over the rank 0 tensor w, the value of which is added to each pixel of the disparity map to obtain the true disparity map, i.e.:

$$f(w, I_{d_i}) = w$$

where w is a scalar. In this case, the perturbation function depends only on the weights and the perturbation map is thus denoted $f(w)$. In practice, this can be implemented as a lookup table, to be used at run time, which has a single entry independent of pixel position and disparity.

Model 2—"UM-Disparity" (FIG. 9B):

The perturbation applied to each pixel in the disparity map is a piecewise constant function of the disparity of the pixel, i.e.

$$f(w, I_{d_i})_{jk} = w_{I_{d_{ijk}}}.$$

This is achieved by letting the rank 1 tensor w parameterise a lookup table 70, such each pixel in the disparity map may be assigned to a bin which is associated with a constant perturbation. In other words, in practice, this means the lookup table used at run time has an entry for each disparity level (e.g. 256 entries for a disparity range of 256).

A coarser version of this model could also be implemented with each perturbation weight associated with a subrange of the possible disparity values.

Model 3—"UM-Superpixel" (FIG. 9C):

Here, w parameterises a superpixel model where local regions of the image are assigned different perturbations, so that the variance of the generative noise model, $P(\tilde{I}_{d_i} | I_{d_i})$, can be increased in certain sections of the image. This may be helpful if there is typically less contextual information available in certain sections of the image. This is similar to model 1, in that the perturbation function is independent of the actual disparity values, but allows different perturbation weight values to be applied to pixels in different superpixels. The perturbation function is $$f(w)_{jk} = w_{g(j,k)}$$

where g(j,k) is a map from pixel (j,k) to its superpixel. At runtime, the lookup table will have an entry for each superpixel.

Each superpixel may for example be 32×32 pixels in size. This is just an example, and superpixel regions can be any size, including 1×1 (i.e. the model could assign a perturbation weight to each individual pixel).

Model 4 (FIG. 9D):

A combination of models 2 and 3. In this case, the perturbation applied to each pixels depends both on its disparity value and which superpixels it is contained within. In this case, a look-up table 70-$p$ is defined for each superpixel p over all possible disparity values. There is still a simplifying constraint, namely that the same perturbation is applied to pixels in the same superpixel having the same disparity value.

All optimisable parameters are normalized by the maximum disparity value. If the pipeline for which uncertainty quantification is being performed has low confidence pixels removed, then these pixels are ignored when the image reconstruction is performed ($I_R$ ($\tilde{I}_{d_i}, I_{L_i}$)).

It is noted that other forms of perturbation function dependency may be incorporated to account for other sources of uncertainty. For example, the perturbation function may alternatively or additionally depend on one or more of the following factors:

image content; for example, the value of the perturbation function at pixel (j,k) may depend on a type of class of structure detected at that pixel, or some other object/structure recognition output associated with that pixel. As a simple example, edge detection may be applied to determine if the pixel is part of an edge of a detected object. Introducing a dependency on edge classification allows the model to account for a possible higher level of uncertainty associated with edge pixels. More generally, this could depend on object or structure types/classes such as vehicle, pedestrian, road etc. Structure classes can be determined, for example, by applying structure/object recognition to some or all of the image.

lighting conditions, weather conditions or other environmental conditions as measured or otherwise determined at the time the relevant frame i was captured.

motion conditions—for example, the value of the perturbation function at pixel (j,k) may depend on a detected conditions associated with that pixel (e.g. whether the pixel belongs to a moving or static object, the speed/acceleration of the object etc.).

To facilitate this, different perturbation weights may be associated with different image/structure detection outputs, different environmental conditions, different motion detection outputs (just as, in models 2-4, different perturbation weights are associated with different depth values and/or different (super)pixel locations). In an online context, this translates into a dependence of estimated uncertainty on one or more of the above factors. To accommodate this, the lookup table is extended so that entries are provided for every possible combination of factors (e.g. as a simple example, model 2 or 3 could be extended to incorporate a dependence on a number of possible environmental conditions or structure classes, by providing a lookup table for each weather environmental or structure class in accordance with that model).

Prior

A spike and slab prior is used to parameterise an approximation of P(w), i.e. a mixture of two normal distributions where one has low variance and the other has high variance. This is justified by noting that although prior experience suggests that disparity matches for SGM are usually within a few pixels of the truth it is not impossible that the error could be larger, for example in the case of camera calibration issues. Specifically, the following is used:

$$P(w) = \frac{\mathcal{N}(0, \sigma_1^2) + \mathcal{N}(0, \sigma_2^2)}{2} \quad \text{Equation 19}$$

For models with low-dimensional w, it is feasible to sample the posterior distribution in Equation 12, with an MCMC sampler or similar (direct sampling). As hardware performance improves, direct sampling may also become viable for higher dimensionality w. Techniques based on MCMC sampling exist for likelihood functions where the gradient is not known, or where a simple proposal distribution will not suffice [16], which can also be applied in the present context.

Alternatively, in order to make inference tractable for higher-dimensionality models (at least given current hardware constraints), variational inference may be applied, which allows the gradient of the likelihood function to be used to speed up inference.

Variational Inference

As noted above, the posterior distribution $P(w|\mathcal{D}_{train})$ is approximated as a normal distribution given by Equation 7:

$$q(w|\sigma) = \mathcal{N}(w; 0, \sigma^2)$$

noting that w and σ need not be scalars, in which case a normal distribution with diagonal covariance matrix $\sigma^2$ is used.

Note: $\mathcal{N}(w; 0, \sigma^2)$ may be written as $\mathcal{N}(0, \sigma^2)$ for simplicity below.

The training process attempts to minimise the Kullback-Leibler (KL) divergence between the approximation q(w|σ) and the $P(w|\mathcal{D}_{train})$ to find σ*—i.e. the uncertainty estimation parameter(s) that provide the best fit to the training data $\mathcal{D}_{train}$. This is equivalent to minimising the evidence lower bound (ELBO):

$$\sigma^* = \arg\min_\sigma \quad KL[q(w|\sigma)\|P(w)] - \mathbb{E}_{q(w|\sigma)}$$
$$[\log P(\mathcal{D}_{train}|w)] \quad \text{Equation 20}$$

where KL represents the Kullback-Leibler divergence. The KL divergence, also referred to as relative entropy, is a known function that quantifies the extent of difference between two distributions. $KL[q(w|\sigma)\|P(w)]$ can be approximated as the difference between the cross entropy and entropy:

$$\log q(w|\alpha) - \log P(w).$$

The likelihood term $\log P(\mathcal{D}_{train}|w)$ is still expensive to evaluate, as the entire training dataset must be considered in each evaluation. Therefore, minibatch gradient descent is applied to Equation 20, to instead minimise the cost $$F_m = \frac{1}{M} KL[q(w|\sigma)\|P(w)] - \mathbb{E}_{q(w|\sigma)}[\log P(\mathcal{D}_m|w)]$$

where the training dataset $\mathcal{D}_{train}$ has been split into M equally sized minibatches, $\mathcal{D}_m$.

Equation 21

The expectation of the log likelihood on the proposal density, i.e.:

$$\mathbb{E}_{q(w|\sigma)}[\log P(\mathcal{D}_M|w)]$$

is computed using Monte Carlo simulation (sampling) using the methodology disclosed in [1].

Within the simulation, $\log P(\mathcal{D}_M|w)$ is evaluated for different combinations of perturbation weight values. Recalling the assumption of independent training examples:

$$\log P(\mathcal{D}_m|w) = \log \prod_i P(I_{R_i}, I_{L_i}, I_{d_i}|w) = \quad \text{Equation 22}$$
$$\sum_i \log P(I_{R_i}, I_{L_i}, I_{d_i}|w)$$

By definition:

$$P(I_{R_i}, I_{L_i}, I_{d_i}|w) = P(I_{R_i}|w, I_{L_i}, I_{d_i}) \quad \text{Equation 23}$$
$$P(I_{L_i}, I_{d_i}|w) = P(I_{R_i}|w, I_{L_i}, I_{d_i}) P(I_{L_i}, I_{d_i})$$

The final equality follows from Equation 13. Hence, Equation 22 becomes:

$$\log P(\mathcal{D}_m|w) = \sum_i \log P(I_{R_i}|w, I_{L_i}, I_{d_i}) + \text{const.}$$

with the likelihood function $\log P(I_{R_i}|w, I_{L_i}, I_{d_i})$ being evaluated according to Equation 18. The constant term can be ignored in this optimization context as it has no effect on the optimization. Therefore, in order to perform the simulation, the likelihood function of Equation 18 is simply sampled (i.e. evaluated) for each of the training samples $(I_{R_i}, I_{L_i}, I_{d_i})$ using different perturbation weight values (and different combinations of perturbation weight values in the case of multiple perturbation weights). The value of the likelihood function for a given training example and a given perturbation weight value (scalar w)/combination of perturbation weight values (non-scalar w) is referred to herein as a "sampled value". By repeatedly sampling the likelihood function for different training examples and different (combinations of) weight values, a set of sampled values is obtained. And once a sufficiently large number of sampled values has been obtained, it can be used to estimate the expectation of the log likelihood on the proposal density, $\mathbb{E}_{q(w|\sigma)}[\log P(\mathcal{D}_i|w)]$, for the σ under consideration in the current iteration gradient descent iteration.

Determining Generative Noise Model

Having determined the uncertainty estimation parameter value(s) $\sigma^*$, the generative nose model can be determined based on Equation 9 and Equation 10:

$$P(\bar{I}_{d_i}|I_{d_i}) = \mathbb{E}_{P(w|\mathcal{D}_{train})}[P(\bar{I}_{d_i}|w, I_{d_i})] = \quad \text{Equation 24}$$

$$\int dw\, P(w|\mathcal{D}_{train}) P(\bar{I}_{d_i}|w, I_{d_i}) =$$

$$\int dw\, P(w|\mathcal{D}_{train}) \delta(\bar{I}_{d_i} - (f(w, I_{d_i}) + I_{d_i}))$$

In each of the perturbation models described above, it can be seen that the perturbation map satisfies:

$$f(w, I_{d_i})_{jk} \in w \quad \forall j, k, I_{d_i} \quad \text{Equation 25}$$

That is, each pixel of the perturbation map $f(w, I_d)$ is equal to a single weight for each pixel $(j,k)$ for any given disparity estimate $I_{d_i}$. Which of the weights it is equal to (if there are multiple weights) depends on the specifics of the perturbation model and, in some models, the disparity estimate $I_{d_i}$ itself.

This makes the evaluation of the integral of Equation 24 trivial because the delta function can simply be integrated-out. Hence, the covariance for each pixel is always one of the $\sigma^2$ from the approximating variational posterior, and the perturbation function $f$ defines which sigma is used for which pixel.

This significantly reduces the amount of computation that needs to be performed by the uncertainty estimator 4 at inference, because it means the covariance of the generative noise model $P(\bar{I}_{d_i}|I_{d_i})$ for pixel $(j,k)$ is simply the covariance associated with the corresponding weight $f(w, I_{d_i})_{jk}$. In other words, the uncertainty associated with pixel $(j,k)$ is simply the covariance associated with the weight corresponding to that pixel.

Whilst the condition of Equation 25 makes the integral of Equation 24 trivial to evaluate, it is not an essential requirement, and more complex perturbation functions can be chosen, with the desired covariance being obtained by evaluating the integral in the final line of Equation 25.

Considering the four models detailed above, and referring again to FIGS. 9A-D:

Model 1 (FIG. 9A):

the perturbation map associates every pixel with the same scalar weight $w$, hence the uncertainty associated with every weight is simply the determined scalar variance $(\sigma^*)^2$.

Model 2 (FIG. 9B):

pixel $(j,k)$ is associated with weight $$w_{I_{d_{ijk}}},$$

i.e. the weight having index $I_{d_{ijk}}$ in the lookup table. Hence the uncertainty associated with that pixel is the covariance of weight $$w_{I_{d_{ijk}}}$$

(i.e. the component of the diagonal covariance matrix $(\sigma^*)^2$ corresponding to weight $$w_{I_{d_{ijk}}}).$$

Model 3 (FIG. 9C):

the uncertainty associated with each pixel is simply the covariance of the weight associated with the superpixel in which is contained.

Model 4 (FIG. 9D): for pixel $(j,k)$ in super pixel $p$, the associated uncertainty is the covariance of weight $$w_{p, I_{d_{ijk}}};$$

that is, the weight having index $I_{d_{ijk}}$ in the lookup table associated with superpixel $p$.

Hyperparameters

The constants $\kappa$ and $\alpha$ in Equation 18 and $\sigma_1$ and $\sigma_2$ in Equation 19 are hyperparameters of the training process. Additional hyperparameters are given in Table 1. Some non-exhaustive example hyperparameter values are also given in Table 1 for perturbation models 1 to 3. Training and validation experiments have been conducted for these choices of hyperparameter for both stereo and mono depth extraction, as set out in further detail below.

TABLE 1

Hyperparameters of the learning model.

| | Stereo SGM | | | Mono CNN | | |
|---|---|---|---|---|---|---|
| | Const | Disp | Super | Const | Disp | Super |
| Initial Learning Rate | 0.05 | 0.001 | 0.01 | 0.05 | 0.001 | 0.01 |
| Learning Rate Decay | 0.96 | 1 | 0.96 | 0.96 | 1 | 0.00 |
| Batch Size | 15 | 15 | 15 | 15 | 15 | 15 |
| $N_{mc}$ | 1 | 7 | 1 | 1 | 7 | 1 |
| $\alpha$ | $5 \times 10^{-8}$ | 1 | $10^{-4}$ | $5 \times 10^{-8}$ | 1 | $10^{-4}$ |
| $\kappa$ | 0.05 | 0.05 | 0.05 | 0.05 | 0.05 | 0.05 |
| $\sigma_1$ | 10 | 3 | 50 | 10 | 3 | 50 |
| $\sigma_2$ | 50 | 25 | 50 | 50 | 25 | 50 |
| $N_{epochs}$ | 15 | 25 | 1 | 15 | 40 | 15 |

$N_{mc}$ represents the number of Monte Carlo samples made from the variational approximation of the posterior to compute the log likelihood. Const, Disp and Super denote models 1, 2 and 3 respectively.

Table 1:

Hyperparameters of the learning model. $N_{mc}$ represents the number of Monte Carlo samples made from the variational approximation of the posterior to compute the log likelihood. Const, Disp and Super denote models 1, 2 and 3 respectively.

In general, suitable values of the hyperparameter values may be found by manual experimentation, or through a full hyperparameter search. A full hyperparameter search could be conducted and may improve performance. The values used for the prior and likelihood hyperparameters may be scaled based on the validation data (both the held out stereo images, and LiDAR data). Adjusting hyperparameters in Bayesian methods is known as Empirical Bayes.

Validation with LiDAR

A validation dataset $\mathcal{D}_v = (I_{L_i}, I_{R_i}, I_{d_i}, L_i)$ where $I_{L_i}, I_{R_i}$ are images captured by a vehicle from an instant in time when the vehicle is stationary, and which are captured almost simultaneously with a LiDAR scan $L_i$ (typically the time difference is approximately 0.05 seconds, which can be ignored). Using knowledge of the camera intrinsics from the camera calibration process, the LiDAR scan $L_i$ can be transformed and projected onto the right camera image plane to produce a ground truth for the right image aligned disparity map, which is denoted $I_{d_i^t}$. Note that since the LiDAR scans $L_i$ are sparse, the ground truth disparity map, $I_{d_i^t}$, will also be sparse.

The validation process comprises the following checks on the model.

The log likelihood of the models on the LiDAR data are computed and compared with the log likelihoods of the models on the held out training data (by computing the likelihood of the ground truth, given an inferred uncertainty model). In this case the data likelihood is simply the trained generative noise model $P(D|M)=P(\tilde{I}_{d_i}|I_{d_i})$, with the projected lidar images playing the role of ground truth, $\tilde{I}_{d_i}=I_{d_i^t}$. Note that since there is no prior information on which model is correct, comparing the model likelihoods is equivalent to comparing the posterior model probabilities or computing Bayes factors for model comparison.

The squared normalised Euclidian distance is also evaluated at different disparities for the trained uncertainty model on the ground truth data, which effectively indicates where the uncertainty is overestimated, or under-estimated. If the uncertainty model is correctly calibrated then the mean standardised Squared Euclidian Distance should be approximately equal to 1, because the sum of squares of n is independent an identically distributed (i.i.d). $\mathcal{N}(0,1)$ random variables is distributed according to the $\chi^2$ distribution with mean n. Therefore, once the average is taken, it is expected to observe a mean standardised Squared Euclidian Distance equal to 1, provided the uncertainties are correctly calibrated.

Note that, in all checks, NaN pixels (resulting from sparsity) in the disparity maps being compared are ignored.

For the present purposes, the LiDAR should be well registered with the cameras. That is to say, the LiDAR and depth data need to be encoded in a common frame of reference, in order to allow a meaningful comparison. The raw data will generally not satisfy this condition, however bundle adjustment can be applied for this end. For example, the camera to Lidar registration process as set out in the following document can be applied for this purpose: Geiger et. al. "Automatic Camera and Range Sensor Calibration using a single Shot" http://citeseerx.ist.psu.edu/viewdoc/download?doi=10.1.1.471.130&rep=rep1&type=pdf.

Experiments
Outline

Experiments are performed on the KITTI depth evaluation benchmark [11, 40]. The depth has been turned into a disparity using the provided camera calibration. Results from the three methods set out above (i.e. uncertainty models 1-3) are compared with results obtained from using variational drop out [8]. Two disparity estimation are compared models as a first stage: a modified SGM pipeline described and a monocular CNN described, both described below. This also details how the uncertainty models are trained. Finally, the results from the trained models on the KITTI depth prediction evaluation [40] data set are compared.

The UMs detailed above were trained in TensorFlow Probability (formerly Edward), using the Adam Optimiser with exponential decay on the learning rate. Experiments were performed on a NVIDIA GeForce RTX 2080 Ti and all hyperparameters were optimised using 20% of the training data as validation set. The number of epochs ($N_{epochs}$), learning rate, learning rate decay constant and batch size were systematically optimised to improve the model performance. The UM Model hyperparameters $\sigma_1, \sigma_2$ were fitted based on physically understanding of the magnitude of typical errors. Searching around the chosen values showed the uncertainty models had low sensitivity to changes in these values. It was assumed that the validation metric changed monotonically in the hyper-parameters $\alpha$, $\kappa$, a range was then searched to determine the optimum values. Due to memory constraints, the maximum number of Monte Carlo samples $N_{mc}$ was 7. The lower the number of samples, the greater variance in the gradient, hence smaller numbers of samples require a smaller learning rate. Indeed, convergence may in some instances be successfully achieved with $N_{mc}=1$. The used hyper parameter values are shown in Table 1.

Stereo Disparity Estimation

For the first sert of results, disparity images are produced using a modified version of the Semi-Global Matching (SGM) algorithm. A census transform [18] is used to determine local matching costs rather than mutual information. Using a census transform gives a local cost that is more robust to radiometric error than using mutual information. The output of the stereo pipeline is a semi-dense disparity image.

Monocular Disparity Estimation

For the second set of results, disparity is predicted from monocular RGB images using the DeepLabv3+ [2] with MobileNetV2 [32] backend architecture. The softmax layer has been removed, in or-der to obtain a regression output. The disparity ground-truth was obtained by projecting the lidar depth according the KITTI camera calibration files into the sensor frame. Then the CNN was trained using the Adam optimiser [23] with the mean absolute error (MAE) as loss. The loss is only suffered on parts of the image where the sparse lidar ground-truth is available. In order to obtain the predictive uncertainty, Variational Dropout [8] was applied, following a similar approach as the disparity prediction in [22]. 50 dropout samples per image were obtained, and the predicted disparity mean and standard deviation statistics per pixel were calculated. The dropout rate was adjusted using a grid search on the KITTI validation set, in the interval [0.0, 0.9] with a step size of 0.1.

Results

Table 2 shows the disparity uncertainty prediction results, comparing the three models set out in Sec. 3.1 UM-Constant, UM-Disparity and UM-Superpixel, as well as Variational Dropout (VD) using various measures. The mean absolute error (MAE), the root mean squared error (RMSE), the negative log predictive density (NLPD), the mean predicted standard deviation (MSTD) and the run-time per frame in milliseconds (ms) are reported. MAE and RMSE are reported for completeness only and do not measure the uncertainty. The NLPD is a standard measure for predictive uncertainty [30] and is calculated as the negative log predicted density of a Gaussian $-\log \mathcal{N}(t;\mu,\sigma^2)$ per pixel, where t is the ground-truth disparity, $\mu$ is the predicted mean and a is the predicted standard deviation. Thus lower is better. It measures how well the predicted Gaussian fits the empirical errors. The MSTD is not a comparison metric, but shows the average magnitude of the predicted uncertain-ties. Each measure mean is calculated over the valid pixels in the disparity prediction method and the corresponding pixels in the ground-truth image.

As expected, the MAE and RMSE varies only for different disparity methods, since it does not take the uncertainty into account. The only exception is for VD, since the mean of the dropout samples can vary slightly from the point pre-diction without dropout. SGM performs better than CNN according the MAE, but worse regarding the RMSE. This indicates that SGM is more accurate in most cases, except for some outliers with larger magnitude. Of the SGM disparity uncertainties, the UM-Constant does best, but results are close. The UM-Disparity is a bit overconfident, as it predicts lower standard deviations on average. The UM-Disparity has the best results for all CNN predicted disparities, while VD is the worst. This is because VD underestimates the uncertainty, as shown by the lower MSTD.

Figure 10:
FIG. 10 shows an urban scene training example used for depth uncertainty training.
Figure 10:
Figure 10:
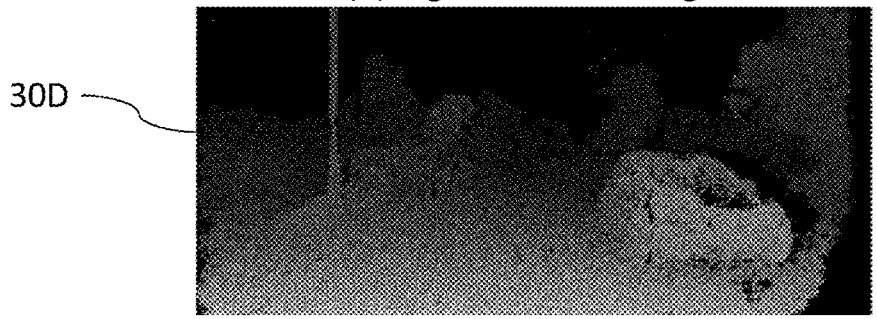
Figure 12:
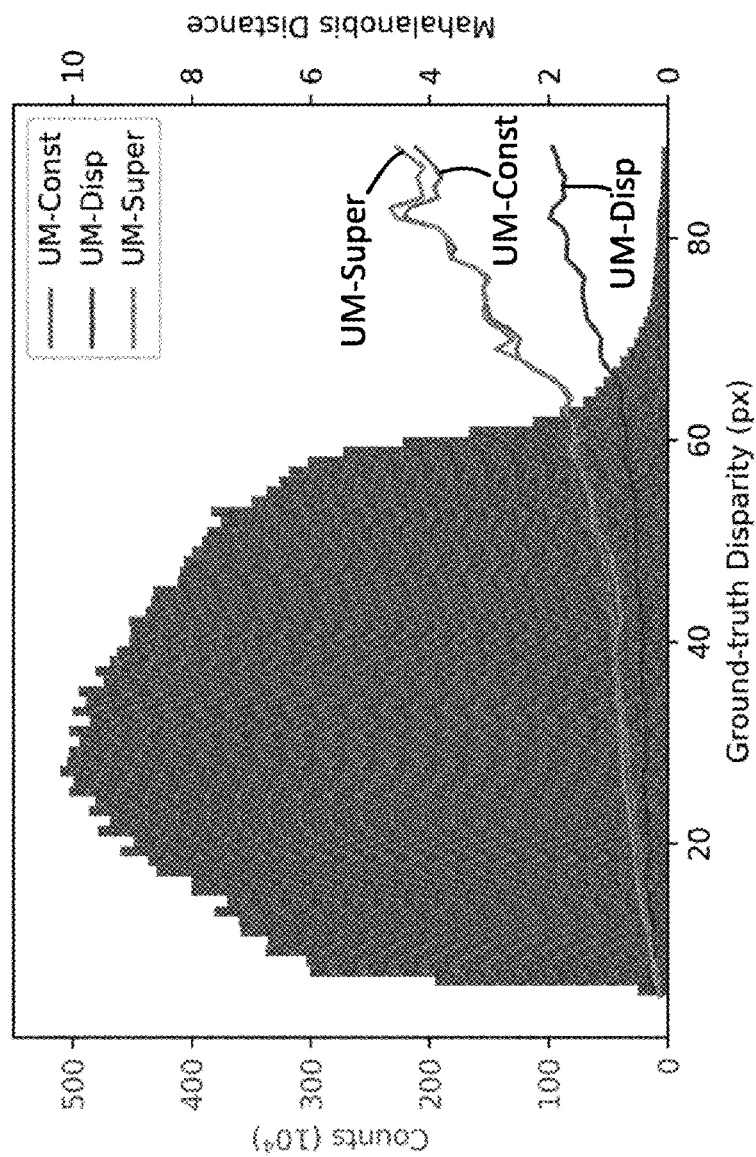
FIG. 12 shows experimental results for a disparity-based depth uncertainty model (model 2 below)
Figure 14:
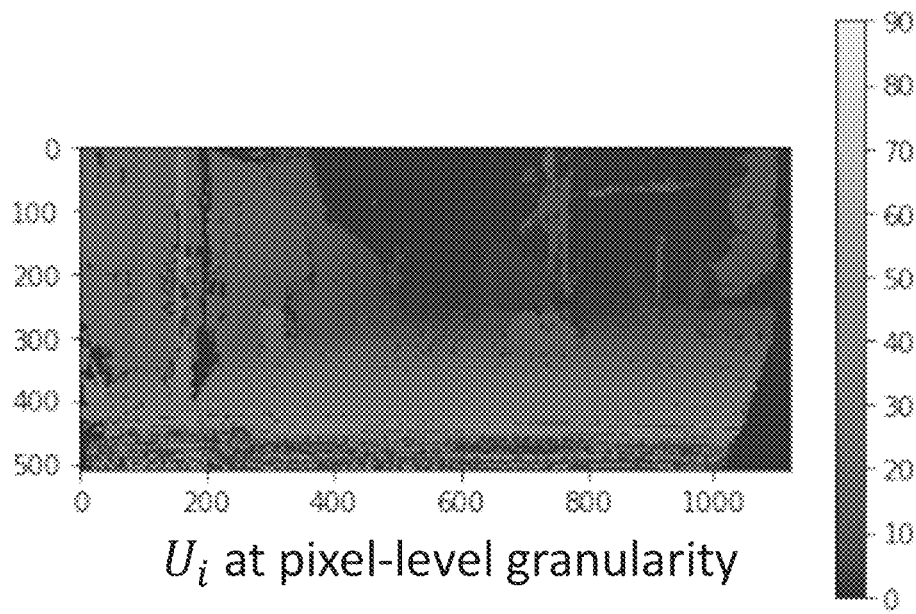
FIG. 14 shows standard deviation maps obtained for different perturbation models.
Figure 14:
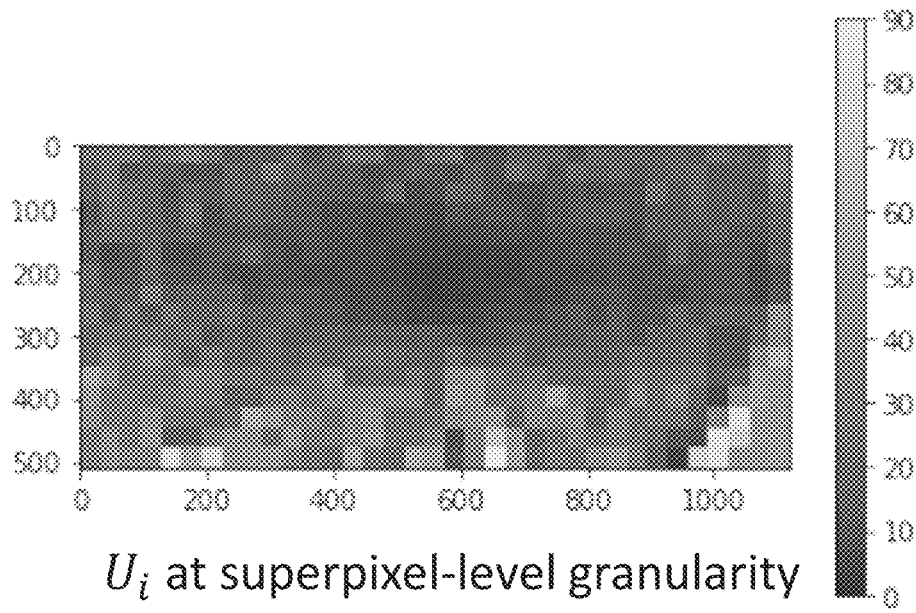

An example of the uncertainty map for models 2 and 3 is shown in FIG. 14, as applied to an urban scene shown in FIG. 10. Note that both models encode roughly the same information at a coarse level—that higher uncertainty should be assigned to larger disparities. However the UM-Superpixel possesses the ability to assign higher uncertainty for localized distortions, e.g. the unusually large variance in the lower right hand corner, which is due to the search space in this area of the image being artificially restricted, as pixels with low depths and consequently high disparities in the right image will fall outside of the field of view for the left image. Note that both maps seem to assign higher uncertainty to higher disparities, i.e. the foreground of the scene, which is in the bottom half of the map. However, the super-pixel map is far less detailed as it is effectively an average uncertainty over all scenes.

background bin counts (left y-axis) are shown. FIG. 12 shows the results for stereo SGM and FIG. 13 shows the results for Mono CNN.

Figure 13:
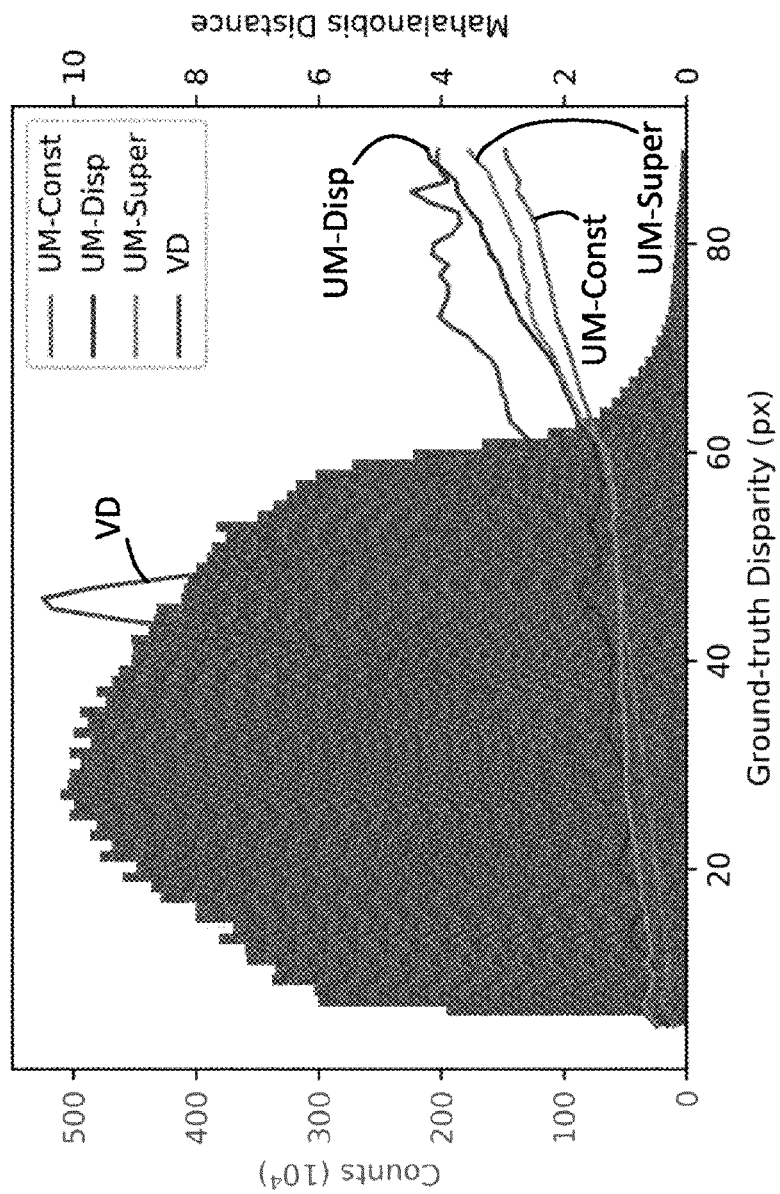
FIG. 13 shows experimental results for a superpixel-based depth uncertainty model (model 3 below)

FIGS. 12 and 13 plot a histogram of mean Mahalanobis distances (MD) per ground-truth disparity. The background shows the number of pixels in each disparity bin. Note that the MD is a relative measure of the error in relation to the standard deviation, i.e. a value of $x$ means the error magnitude was $x$ times the standard deviation. Thus an ideal uncertainty model would always have an MD error of 1, which means that the ground-truth is exactly 1 standard deviations away from the point prediction.

It is observed that the disparity distribution is skewed, with the majority lying in the range 5-50. The model is over-confident where less data is available and thus predicts a lower uncertainty despite larger errors, as indicated by the MD larger than 1. The UM-Constant model predicts a constant standard deviation, thus the MS histogram is equivalent to the normalized RMSE. As expected, the errors grow larger for increased disparity.

Second Example Implementation:

In the first implementation above, as per Equation 9, the probability density over the true disparity map has the form of a Dirac delta function. In the second implementation, this constraint is relaxed, and the probability density function over the true disparity map (the true disparity distribution) instead has a normal (Gaussian). Both implementations operate on similar core principles, however some further

TABLE 2

Evaluation results on the KITTI selected set, comparing various disparity (stage-1) and uncertainty (stage-2) prediction methods.

| Stage-1 Disparity | Stage-2 Uncertainty | MAE | RMSE | NLPD | MSTD | Stage-1 Runtime | Stage-2 Runtime |
|---|---|---|---|---|---|---|---|
| Stereo SGM | UM-Constant | 2.28 | 8.16 | 3.62 | 8.66 | 36.57 | 0.20 |
| Stereo SGM | UM-Disparity | 2.28 | 8.16 | 3.11 | 9.99 | 36.57 | 7.65 |
| Stereo SGM | UM-Superpixel | 2.28 | 8.16 | 3.93 | 13.35 | 36.57 | 6.92 |
| Mono CNN | UM-Constant | 7.83 | 9.27 | 3.67 | 10.37 | 35.87 | 0.41 |
| Mono CNN | UM-Disparity | 7.83 | 9.27 | 3.84 | 8.96 | 35.87 | 7.52 |
| Mono CNN | UM-Superpixel | 7.83 | 9.27 | 3.74 | 10.41 | 35.87 | 6.97 |
| Mono CNN | VD | 7.84 | 9.28 | 10.63 | 5.40 | 35.87 | 2,629.94 |

The mean absolute error (MAE), the root mean squared error (RMSE), the negative log predictive density (NLPD), the mean predicted standard deviation (MSTD) and the runtime per frame in milliseconds (ms) are measured.

Table 2: Evaluation results on the KITTI selected set, comparing various disparity (stage-1) and uncertainty (stage-2) prediction methods. The mean absolute error (MAE), the root mean squared error (RMSE), the negative log predictive density (NLPD), the mean predicted standard deviation (MSTD) and the runtime per frame in milliseconds (ms) are measured.

FIG. 10 shows a particular training example for the purpose of illustration. This shows the left and right images and estimated disparity maps of a single training example, denoted by reference numerals 30L, 30R and 30D respectively.

Figure 11:
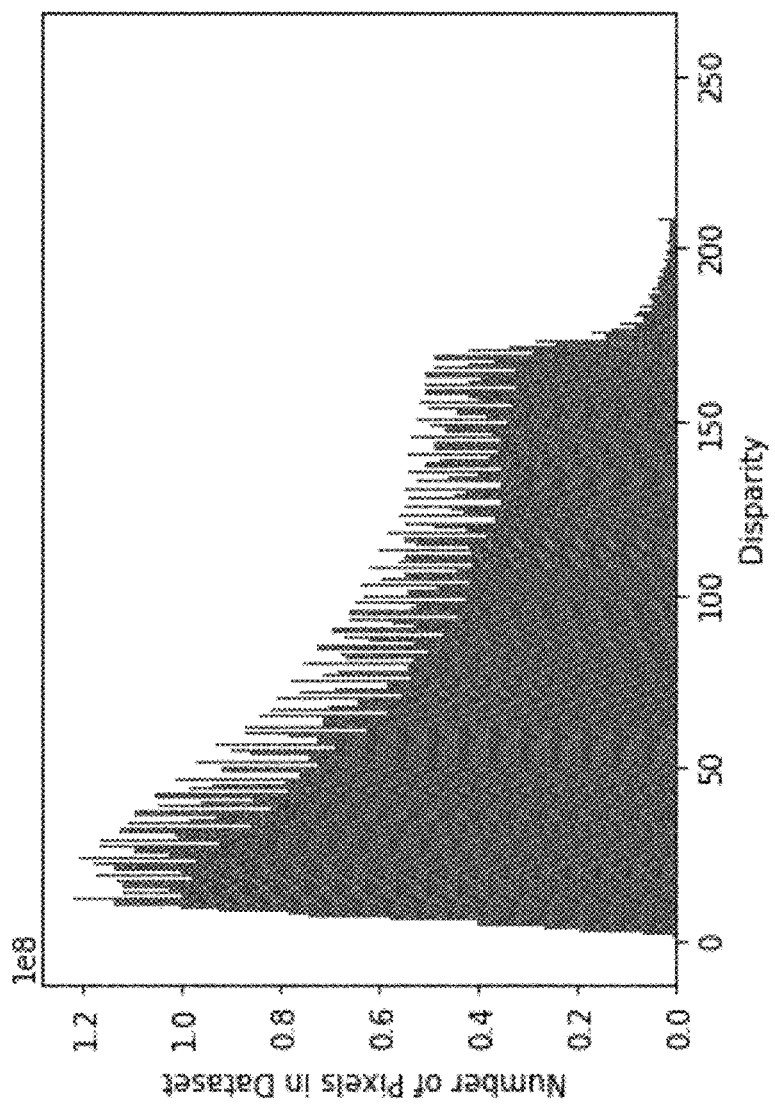
FIG. 11 shows a plot of total pixels per disparity in a training set.

A histogram of the reference stereo method pixel disparities across the whole training data set is shown in FIG. 11. That is, FIG. 11 shows, for each possible disparity value on the horizontal axis, the total number of pixels assigned that disparity across the whole training set (vertical axis). It can be seen that lower disparities are generally more common.

FIGS. 12 and 13 show mean Mahalanobis distances (right y-axis) per ground-truth disparity bin for the different uncertainty models, evaluated on the KITTI validation set. In the modification are made in the second implementation to accommodate the less-constrained form of the probability density—the other main change being that Expectation Maximization (EM) replaces the variational inference of the first implementation, with sampling based on the true disparity distribution directly (rather than the posterior distribution over the weights as in the first implementation).

The details of the second implementation will now be described. Aside from the differences set out below, all other description above applies equally to the second implementation.

The following section uses bracketed equation numbering, i.e. Equation (1) below is distinct from Equation 1 above etc.

The following section also mostly omits the subscript for conciseness; so a training example is written as $(I_l, I_r, I_d)$ using this simpler notation. Lowercase subscripts 1, r are used interchangeably with the corresponding uppercase subscripts L, R.

This section describes a self-supervised strategy to train a disparity uncertainty model (UM) using data collected from stereo image pairs and disparity map estimates.

Model

As in the first implementation, a first of the images (e.g. the right image) is reconstructed in the stereo pair from the second (e.g. left) image and the disparity map, and compared with the true right image in a probabilistic Bayesian framework so that the uncertainty in the disparity map can be measured.

A probability density is learned over the true disparity map $\bar{I}_d$ (a latent variable), that is conditioned on the estimated disparity map $I_{d_i}$ and a scalar or higher-order tensor random variable w (referred to as the perturbation weights below, noting that the possibility of a single perturbation weight is not excluded):

$$P(\bar{I}_d|w,I_d,I_l) = \mathcal{N}(I_d,f(w,I_d,I_l)^2) \quad (1)$$

In contrast to Equation 9 of the first implementation, the probability density of Equation (1) (the true disparity distribution) can be seen to take the form of a normal distribution $\mathcal{N}$. Specifically, $\mathcal{N}$ is a pixelwise univariate normal distribution and $f$ is a perturbation function of w representing disparity uncertainty.

The definition of Equation (1) ensures the variance of $P(\bar{I}_d|w,I_d,I_l), f(w,I_d,I_l)^2$, is always positive. As will be appreciated, defining the variance as the square of the perturbation function is merely one way to ensure this. More generally, the probability density of the true disparity image may be defined as:

$$P(\bar{I}_d|w,I_d,I_l) = \mathcal{N}(I_d,\text{var}(f(w,I_d,I_l))) \quad (1')$$

where $\text{var}(f(w,I_d,I_l))$ is the variance of $\mathcal{N}$ and $\text{var}(\cdot)$ is some function (the variance function) that always returns a positive output (which could be the identity function if is already guaranteed to be positive). The following description adopts the definition of Equation (1), but the description applies equally to any such variance function.

A pixelwise univariate distribution means that each pixel is associated with a univariate Gaussian distribution with:
 mean $I_{d_i}(x,y)$, i.e. the value of the estimated depth map $I_{d_i}$ at pixel (x,y) (which is the estimated depth of that pixel in the left image $I_l$), and
 variance $\text{var}(f(w,I_d,I_l)(x,y))$, where $f(w,I_d,I_l)(x,y)$ is a pixel perturbation assigned to pixel (x,y) in $f(w,I_d,I_l)$—this variance is the measure of uncertainty associated with that pixel of the estimated depth map in this implementation.

The manner in which this pixel perturbation is assigned depends on the Uncertainty Model that is used (see below for examples of different Uncertainty Models in this context).

The examples of Equations (1) and (1') assume unbiased depth extraction, such that the mean of the distribution is equal to the estimated disparity map $I_d$. To account for bias, the mean could include a bias term that is either predetermined or defined by one or more additional perturbation weights that are learned in the same way.

In the example of Equation (1), $(f(w,I_d,I_l))^2$, i.e. the uncertainty associated with the depth estimate for pixel (x,y) is given as the square of its pixel perturbation.

In this case, the possibility of the perturbation function being dependent on the content of the left image $I_l$ (or, more generally, the content of one or both of the images) and/or the content of the estimated depth map $I_d$, is explicitly reflected in the notation. In this example, $f(w,I_d,I_l)$ is shown to be dependent on the perturbation weights w, the estimated disparity map $I_{d_i}$ and the left image $I_l$ (more generally, the second image from which the first image is reconstructed).

Note, as before, $f$ is not required to necessarily be dependent on all of these; rather, the notation represents possible dependencies.

In the first implementation described above, the perturbation function describes a (deterministic) mapping between the true and estimated disparity maps; that is, in the first implementation, if the value(s) of the perturbation weights were known, the true disparity map would be known given an estimated disparity map. The first implementation is based on the principle that, under that definition of the perturbation function, the perturbation weights are not known (i.e. they are also latent), and the first implementation instead seeks to learn a distribution over the perturbation weights. The second implementation formulates this in a different way; as can be seen in Equations (1) and (1'), the perturbation function is no longer a deterministic mapping between the estimated and true display maps, but is a function that assigns each pixel a particular variance (the measure of depth uncertainty in this context); hence, in the second implementation, knowing the perturbation weight(s) and the estimated depth image does not mean the true depth map $\bar{I}_d$ is know; it simply means the uncertainty associated with each pixel is known. Fundamentally, both implementations work on the basis that the true depth map $\bar{I}_d$ is an unknown latent variable; the difference comes in the way that this lack of knowledge is built into the model: the first implementation also treats w as a latent variable that defines the (unknown) mapping between estimated and true disparity maps, and the method seeks to learn covariances of the weights w. In the second implementation, the perturbation function defines the variance associated with each pixel, and learning the weights w amounts to learning the function that assigns uncertainty to depth map pixels. Hence, in the second implementation, the uncertainty map associated with a given estimated depth map $I_{d_i}$ is now simply given by $U = \text{var}(f(w,I_d,I_l))$.

Specific functional forms of are described at the end of this section. Some of these mirror those described above in the context of the first implementation, but an additional functional form is set out that can be used to introduce a dependence on image features.

The training goal is now to infer the function parameters, w, given training data. Then the distribution for $\bar{I}_d$, $P(\bar{I}_d|w,I_d,I_l)$, has a standard deviation per pixel of $\sqrt{f(w,I_d,I_l)^2}$ for the distribution of Equation (1), and $\sqrt{\text{var}(f(w,I_d,I_l))}$ more generally.

As before, applying Bayes' law, and assuming independence of training examples, yields $$P(w|\mathcal{D}_{train}) = \frac{P(\mathcal{D}_{train}|w)P(w)}{P(\mathcal{D}_{train})} = P(w) \prod_i \frac{P(I_r^{(i)}|w, I_l^{(i)}, I_d^{(i)})}{P(I_r^{(i)}|I_l^{(i)}, I_d^{(i)})}, \quad (2)$$

where the marginal likelihood, $P(I_r|I_l,I_d)$, acts as a normalizing constant, and $P(w)$ is a prior over w.

Similar to before, a combined appearance matching loss L is defined over two images $I_1, I_2$ as $$L(I_1, I_2) = \frac{1}{N_{valid}} \sum_{valid\ x,y} \alpha \frac{1 - SSIM(I_1(x,y), I_2(x,y))}{2} + \quad (3)$$

$$(1-\alpha)\|I_1(x,y) - I_2(x,y)\|$$

As before, SSIM represents the structural similarity between images, α is a hyperparameter that balances the SSIM and absolute difference losses, (x,y) is the pixel position within the image and $N_{valid}$ is the number of valid pixels per image. Note that not all pixels might be valid depending on the disparity estimation method: e.g. SGM only converges for a sub-set of all pixels. The image loss L is differentiable, and is used to define the likelihood of the right image given the left image and the true disparity as $$P(I_r|I_l,\bar{I}_d,I_d)=P(I_r|I_l,\bar{I}_d)\sim\exp(-\kappa L(I_r,\tilde{I}_r(\bar{I}_d,I_l))) \quad (4)$$

where κ is a scale hyperparameter and $\tilde{I}_r(I_l,I_d)$ is the reconstructed right image from resampling the left image $I_l$ shifted by the true disparity map $\bar{I}_d$. The likelihood—the numerator in Equation (2)—can be obtained by applying the definition of the expectation to give $$P(I_r|w,I_l,I_d)=\mathbb{E}_{P(\bar{I}_d|w,I_d,I_l)}[P(I_r|w,I_l,I_d,\bar{I}_d)]$$

This has some parallels with Equation 16 in the first implementation, but because Equation (1) is no longer a Dirac delta function, $P(I_r|w,I_l,I_d,\bar{I}_d)$ does not integrate out in the same way. The second implementation does not attempt to parameterise the posterior distribution, but instead parameterizes the true disparity distribution directly as a Gaussian, as per Equations (1) and (1').

The following are examples of different possible UMs, i.e. different parametric forms of the disparity perturbation map $f(w,I_d,I_l)$:

1. UM-Constant.

The same pixel perturbation is applied to each pixel, i.e. $f(w,I_d,I_l)$ where w is a scalar. In practice, this means the lookup table used at run time has a single entry independent of pixel position and disparity.

2. UM-Disparity.

The pixel perturbation applied to each pixel in the disparity map is a piecewise constant function of the disparity of the pixel, i.e.

$$f(w,I_d,I_l)(x,y)=w_{[I_d(x,y)]}$$

where w is an array of any suitable length (e.g. 256). In practice, this means the lookup table used at run time has e.g. 256 entries, one for each disparity level.

3. UM-Superpixel.

The vector w parameterises a super-pixel model where individual pixel locations or suitably-sized local pixel regions (superpixels) of the image (e.g. 32×32 pixel regions) are assigned different perturbations. The uncertainty function is $$f(w)(x,y)=w_{g(x,y)}$$

where g(x,y) is a map from pixel (x,y) to its superpixel (would be the identity function for single-pixel regions). The variance of the generative noise model, $P(\bar{I}_d|I_d)$, can be increased in certain sections of the image, and this may be helpful if there is typically less contextual information available in certain sections of the image. In practice, $f(w)$ can be implemented as a lookup table with one bin per (super)pixel.

4. UM-Disparity-Superpixel.

Figure 9A:
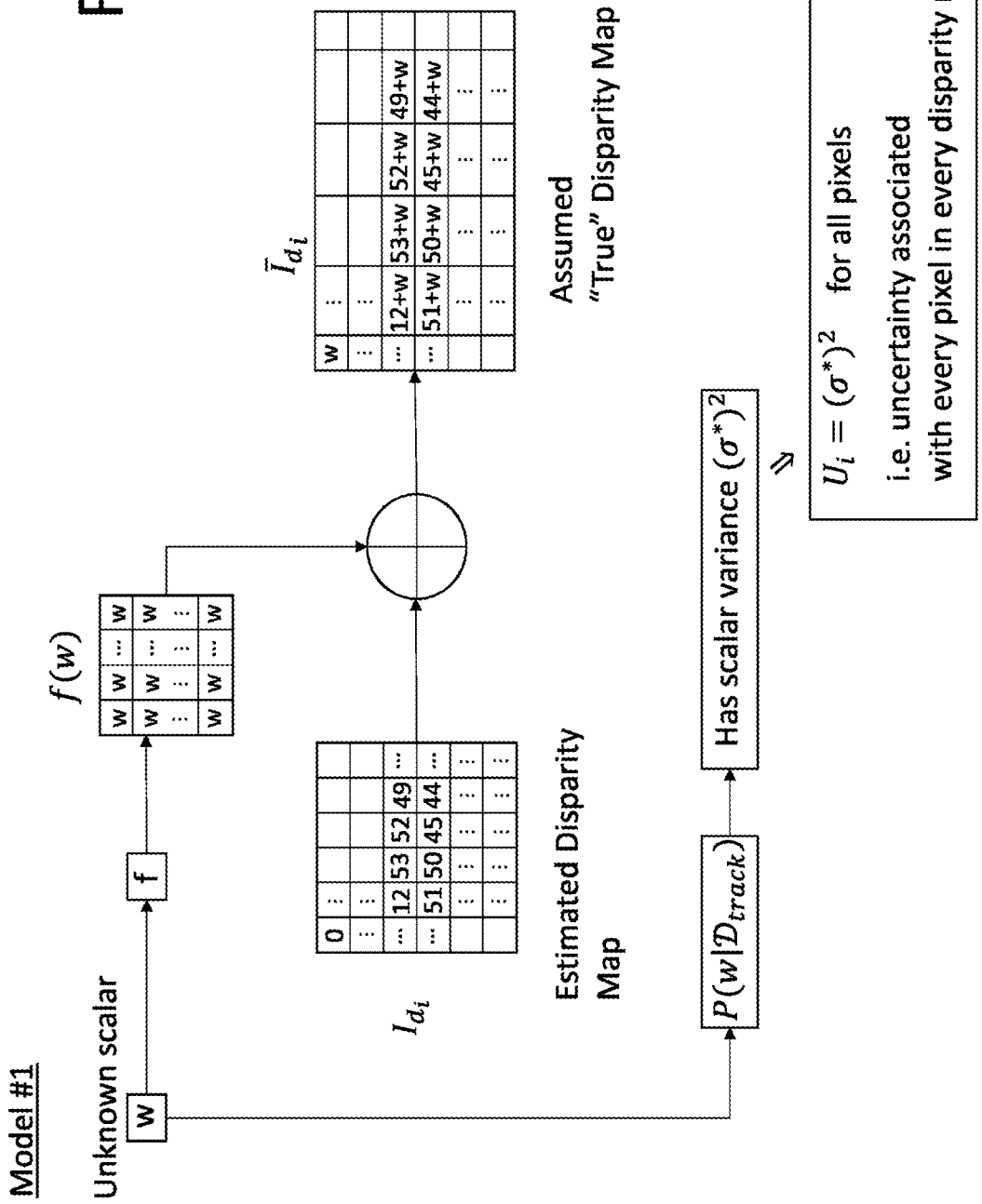
FIGS. 9A-E schematically illustrate the principles of different perturbation models (models 1 to 5 respectively)
Figure 9B:
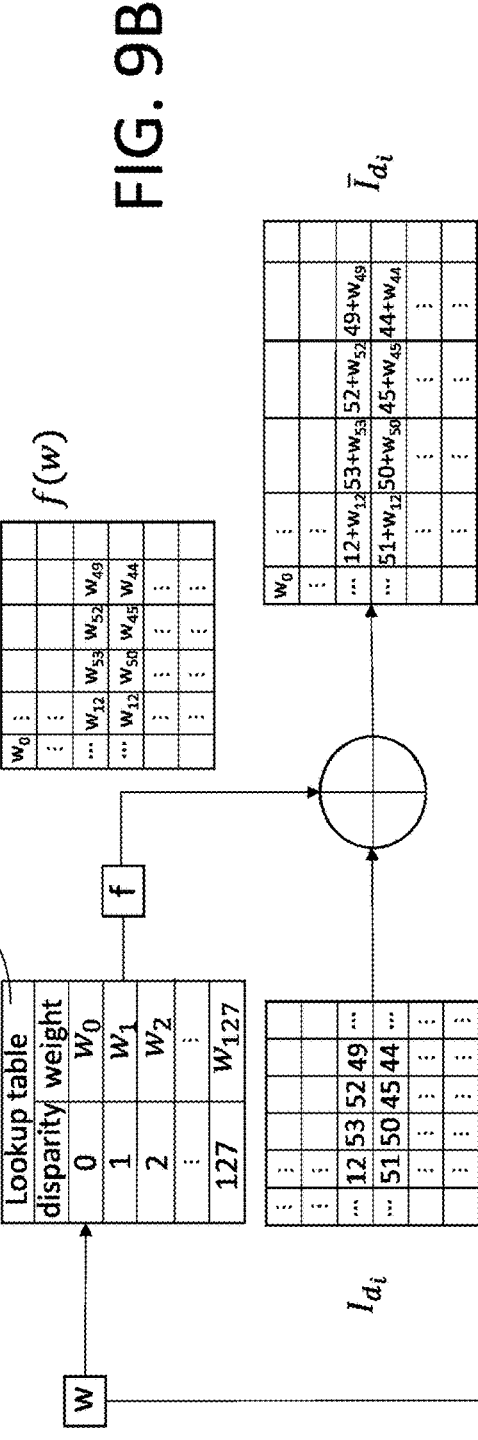
Figure 9C:
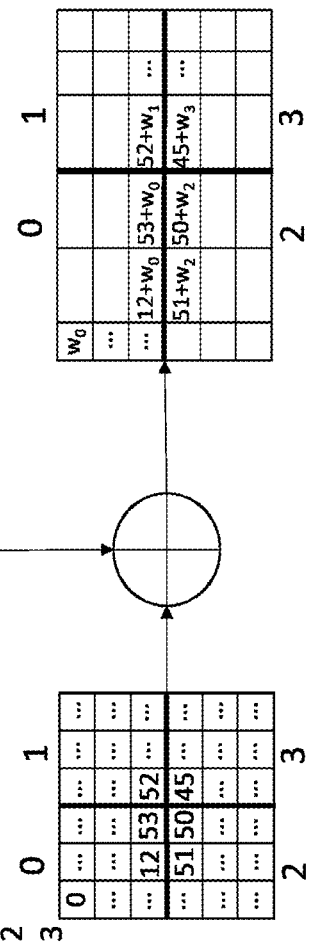
Figure 9D:
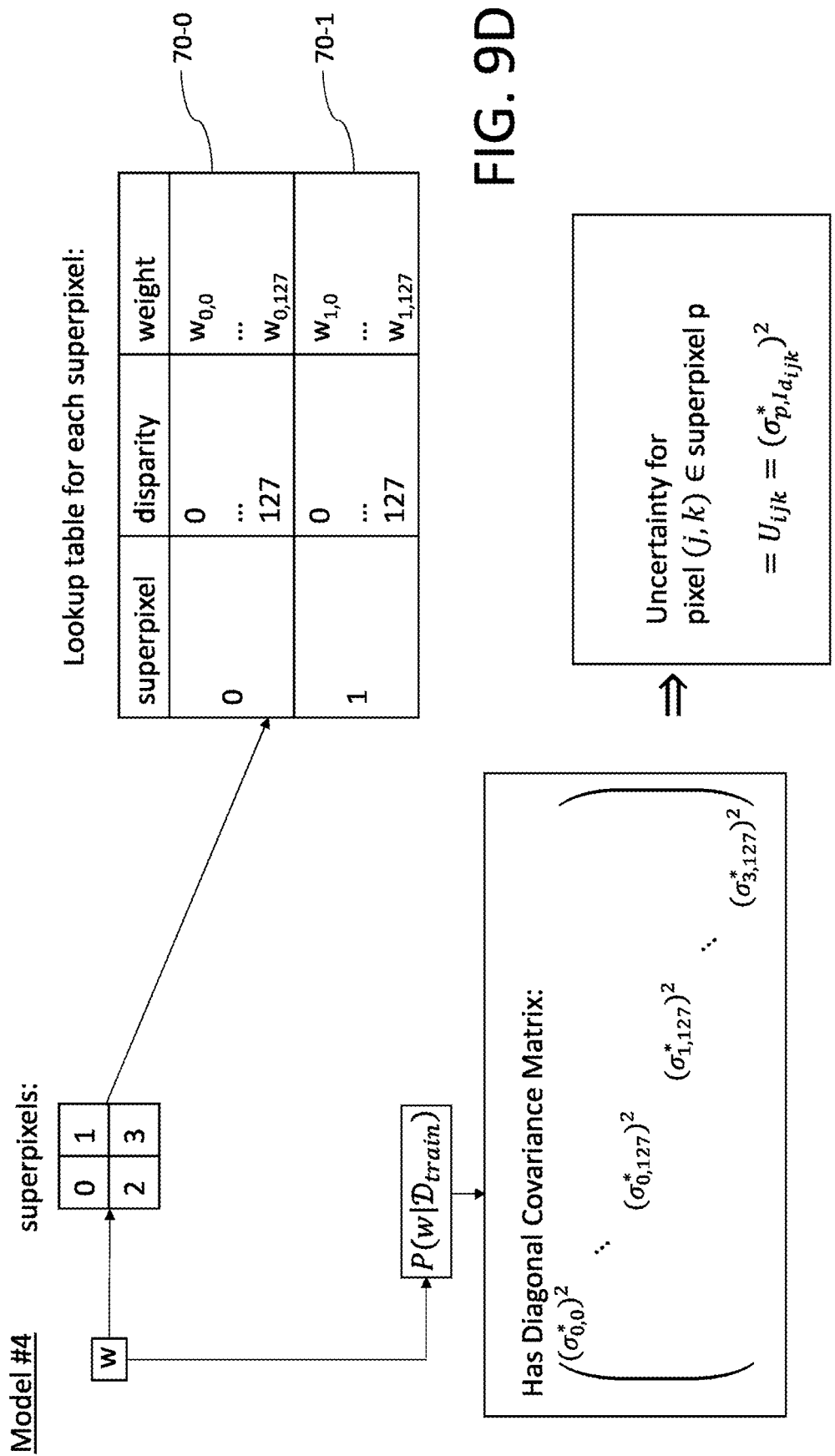

The hybrid model (model 4), equivalent to model 4 of the first implementation depicted in FIG. 9D, can also be used in the present context.

These models are equivalent to models 1-4 of the first implementation, depicted in FIGS. 9A-D—but note the difference in the definition of the perturbation function in the second implementation: now, the weights are no longer latent variables, rather, the values of the weights define the pixelwise variances. FIGS. 9A to 9C are still applicable, but $\sigma_k$ is no longer the covariance of a given latent weight $w_k$, but is now simply $\sigma_k^2=w_k^2$, and consequently the uncertainty map $U_i$ is now $U_i=f(w,I_{l_i},I_{d_i})^2$.

As noted, a benefit of this second implementation is that it can incorporate feature-based UMs, whilst retaining the benefits of efficient training. An example of such a feature-based UM is the following:

5. UM-Net.

In this case, the function $f$ is a shallow Convolutional Neural Network operating on the left image $I_l$ and the disparity image $I_d$. Any "stereo" CNN architecture can be used. That is, any CNN or, more generally, any trainable stereo image processing component which is capable of taking two images of the same resolution and outputting another image of the same resolution. One example of a suitable stereo CNN architecture is DispNet [24].

Figure 9E:
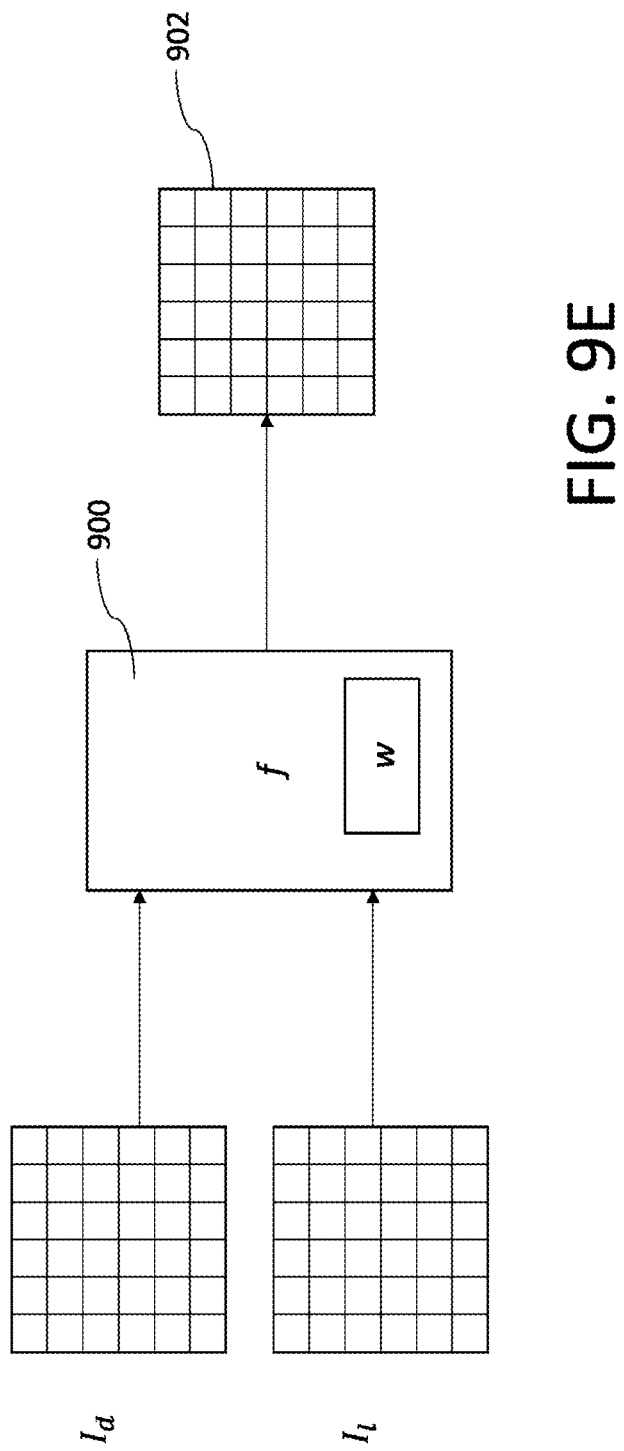

FIG. 9E shows a schematic block diagram for the UM-Net model, where $f$ takes the form of a stereo image processing component—a stereo CNN 900 in this example—having two image inputs for receiving the estimated depth image $I_{d_i}$ and the left image $I_l$. The perturbation weights w are trainable weights (parameters) of the stereo image processing component 900. For example, in a CNN architecture, the perturbation weights w may comprise filter weights, applied at one or more convolutional layers of the CNN. The general principles of CNNs per se are well known and therefore not described in any further detail unless directly relevant in the present context. The output of the stereo image processing component 900, $f(w,I_{l_i},I_{d_i})$, is denoted by reference numeral 902—this is a (single) output image—obtained by processing the input images $I_l,I_{d_i}$ based on the weights w—whose dimensions match that of each of the images $I_l,I_d$.

As per Equation (1') above, the value of $var(f(w,I_{l_i},I_{d_i}))$ at pixel location (x,y), $var(f(w,I_{l_i},I_{d_i})(x,y))$, provides the variance for pixel (x,y) in the estimated depth map $I_d$, which is the per-pixel measure of uncertainty in this implementation.

Note, whereas for models 1-4 (FIGS. 9A to 9D), the pixel perturbation of any given pixel is always equal to (one of) the perturbation weight(s), UM-Net is not constrained in the same way. Although the pixel perturbation associated with any given pixel depends on the weights w of the CNN 900 in UM-Net, it will also depend on the content of both images $I_l,I_{d_i}$, and can take any value the CNN 900 is capable of outputting. In the training process described below, the CNN 900 will autonomously learn to recognize and utilize image features (of the stereo images and/or the estimated disparity maps) that are relevant to the task of depth uncertainty estimation. Initial layer(s) of the CNN 900 operate as a feature extractor(s), and learn which features to recognize and extract during training. At least some of the perturbation weights are weights of the feature extractor layer(s), and features are learned by learning those weights.

In contrast to regular CNN training, the CNN 900 does not require ground truth. Rather the CNN 900 would be trained as described in the next section—in the same way as models 1 to 4—based on a loss function that incorporates the appearance matching loss L of Equation (3) between the right image and the reconstructed right image.

If the first stage disparity estimate removes low confidence pixels then these pixels are ignored when the image reconstruction is performed.

Moreover, whilst the architecture of FIG. 9A assumes two image inputs, for a simpler model (e.g. dependent on only one of the estimated depth and the left image $I_l$, $I_d$), a single-input image architecture could be used. More generally, the architecture is adapted to the input(s) on which the perturbation function depends.

As another example, the UM can be straightforwardly extended to incorporate other factors, such as environmental or motion factors. For example, such factors could be additional (or alternative) inputs to a neural network uncertainty model, such as the CNN 900 of FIG. 9E.

Prior

Experience suggests that disparity matches for stereo are usually within a few pixels of the truth, but large errors can be introduced through incorrect camera calibration. For UM-Constant, UM-Disparity, and UM-Superpixel, a normal prior with mean equal to a physically plausible value for the disparity variance and a large standard deviation has been found to be suitable, with the intention that the prior is fairly uninformative (and therefore does not artificially constrain the model).

The physically plausible value could either be set from expert knowledge of an engineer—and hence be associated with fairly large standard deviation—or chosen based on physical assumptions, such as a flat road surface and the pinhole camera model, which may result in a somewhat more informative prior.

For UM-Net the prior distributions no longer have a physical interpretation, and an appropriate choice of prior is a normal distribution with mean zero (for example).

Expectation Maximum

As mentioned above, the second implementation uses Expectation Maximization in place of variational inference.

Figure 16:
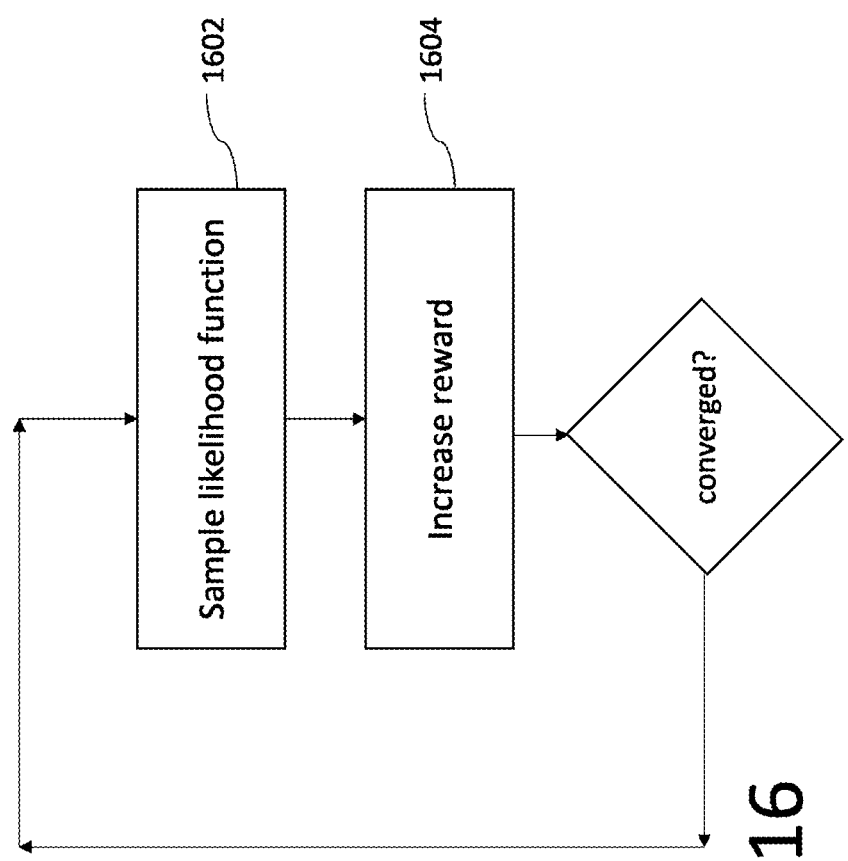
FIG. 16 shows a flowchart for an Expectation Maximization training process.

A flowchart for the EM training process is shown in FIG. 16.

The following example applies the maximum a-posteriori expectation maximisation algorithm (MAP-EM), to learn the uncertainty model parameters w [25, 41].

The first step (1602) of the MAP-EM algorithm is to evaluate $$Q(I_r,w,I_l,I_d) = \mathbb{E}_{P(\bar{I}_d|w,I_d,I_l)}[\log P(I_r|w,I_l,I_d,\bar{I}_d)],$$

using a Monte Carlo estimator.

Then, in a maximisation step (1004), the estimate of w is updated by calculating $$w = \underset{w}{\operatorname{argmax}}(Q(I_r, w, I_l, I_d) + \log P(w)). \quad (5)$$

The operand in the left-hand side of Equation (5) may be referred to as an objective function:

$$\mathcal{O}(I_r,w,I_l,I_d) = Q(I_r,w,I_l,I_d) + \log P(w).$$

In the maximisation step 1604, it is not strictly necessary to completely maximise the objective function, and merely increasing the objective function will suffice. This is known as the generalised expectation maximisation algorithm. Therefore, at every maximisation step, it is sufficient to take a single gradient ascent step to maximise the objective function $\mathcal{O}(I_r,w,I_l,I_d)$.

Considering the term $P(I_r|w,I_l,I_d,\bar{I}_d)$, as in the first implementation, the right image $I_r$ is treated as a random variable in this context and, given a true disparity map $\bar{I}_d$ and a left image 4, no additional information is provided by the weights w. Hence:

$$P(I_r|w,I_l,I_d,\bar{I}_d) = P(I_r|I_l,\bar{I}_d)$$

The term $Q(I_r,w,I_l,I_d)$ can thus be computed based on Equation (4), which in turn incorporates the appearance matching loss L of Equation (3) into the objective function.

Typically, steps 1602 and 1604 are alternated, in an iterative fashion, until the estimate for w has converged, i.e. the value(s) of the weights satisfy a convergence condition.

In the first iteration of step 1602, the perturbation weights w are initialized e.g. with random value(s). These value(s), in turn, define the density function $P(\bar{I}_d|w,I_d,I_l)$ for each training sample $(I_l,I_r,I_d)$ as per Equation (1)/(1'), which in turn means the likelihood function $P(I_r|I_l,\bar{I}_d)$ of Equation (4) can now be sampled based on $P(\bar{I}_d|w,I_d,I_l)$.

As before, the result would be a set of sampled values, only now the likelihood function is sampled based on the density function of Equation (1)/(1') rather than a posterior distribution defined over the perturbation weights. This involves sampling one or more possible true depths maps from the distribution $P(\bar{I}_d|w,I_d,I_l)$, for the current weight value(s) and each of (at least some of) the training examples, and evaluating the likelihood function for each sampled possible true depth map. The terms possible true disparity map and modified true disparity map are used interchangeably herein.

So, whereas in the first implementation, a particular set of weight values defined a possible true disparity map (because the perturbation function deterministically mapped the estimated depth map to the true depth map), now a particular set of weight values defines a particular probability distribution over the true disparity map for a given estimated disparity map, and one or multiple possible true depth maps can be sampled from the probability distribution defined by a particular set of weight value(s) for a given training sample.

The sampled values are used to estimate Q for the current value(s) of the weights. This, in turn, means the objective function $\mathcal{O}$ can be determined for the purpose of step 1604 in the same iteration. In step 1604, gradient ascent is then used to update the value(s) of w.

The function Q is determined as the average (expectation) of the sampled values of the likelihood function (or, more precisely, the expectation of the log-likelihood), over the training examples, as a function of the weights w. In each iteration, the function Q need only be determined or estimated to the extent needed to implement a single gradient ascent in the second step of that iteration and update the weights w for the next iteration or verify that convergence of the value(s) of the weights w has been reached. The expectation is taken with respect to the latent variable (true disparity) and the training examples.

The next iteration of the method commences, returning to step 1602, with the new value(s) of the weights w, as determined at step 1604 of (what is now) the previous iteration of the method. This has the effect of defining new true disparity distributions for each training example (because the weight value(s) have changed), and thus modifying the objective function to be optimized in the next step of that iteration. This continues until some convergence condition (or other terminating condition) is met.

Expectation maximization is known per se and the details are therefore not described in any further detail.

Evaluating the Monte Carlo estimator using the entire training dataset in each evaluation would be expensive, but can be avoided by applying minibatch gradient ascent to $\mathcal{O}$. The same principles of the method of FIG. 16 apply, but with the processing separated into batches.

In keeping with the terminology of the first implementation, the objective function $\mathcal{O}$ may be referred to as a loss function (although the term reward function may be more descriptive, as the aim is to maximize the objective function in this particular instance).

REFERENCES

Reference is made to the following, each of which is incorporated herein by reference in its entirety:
[1] C. Blundell, J. Cornebise, K. Kavukcuoglu, and D. Wierstra. Weight uncertainty in neural networks. arXiv preprint arXiv:1505.05424, 2015. 4, 5
[2] L.-C. Chen, Y. Zhu. G. Papandreou, F. Schroff, tnd H. Adam. Encoder-decoder with nitrous separable convolution for semantic image segmentation. In *ECCV*, 2018,
[8] Y. Gal and Z. Ghahramani. Dropout as a hayesi illation: Representing model uncertainty in deep learning. In *international conference on machine learning*, pages 1050-1059, 2016. 2, 3:5
[11] A. Geiger, P. Lenz, C. Stiller, and R. Urtasun. Vision meets robotics: The kitti dataset. *International Journal of Robotics Research (IJRR)*, 2013. 2, 5
[15] C. Godard, O. Mac Aodha, and G. J. Brostow. Unsupervised monocular depth estimation with left-right consistency. CVPR, 2(6):7, 2017. 1, 2, 3, 4
[16] P. Green and S. Maskell. Estimating the parameters of dynamical systems from big data using sequential montecarlo samplers. Mechanical Systems and Signal Processing, 93:379-396, 2017. 5
[17] R. Haeusler, R. Nair, and D. Kondermann. Ensemble learn-ing for confidence measures in stereo vision. In *Proceed-ings of the IEEE Conference on Computer Vision and Pattern Recognition*, pages 305-312, 2013. 2, 3
[18] H. Hirschmuller. Stereo processing by semiglobal matching and mutual information. *IEEE transactions on pattern analysis and machine intelligence*, 30(2):328-341, 2008. 2, 5
[22] A. Kendall and Y. Gal. What Uncertainties Do We Need in Bayesian Deep Learning for Computer Vision? In *NIPS*. pages 5574-558, 7. 0.1,
[23] D. P. Kingma and Adam: A niethocl for stochastic optimization. arXiv preprint arXiv:1412.6980, 2014. 5
[24] N. Mayer, E, Ilg, P. Hauser, P. Fischer, D. Cremers, A. Dosovitskiy, and T. Brox. A dataset to train convolutional networks for disparity, optical flow, and scene flow estimation. In *Proceedings of the IEEE Conference on Computer Vision and Pattern Recognition*, pages 4040-4048, 2016.
[25] G. J. McLachlan and T. Krishnan. The EM algorithm and extensions, volume 382. John Wiley & Sons, 2007.
[30] J. Quinonero-Candela, C. E Rasmussen, E Sinz, O. Bousquet, and B. Schölkopf. Evaluating predictive uncertainty challenge. In *Machine Learning Challenges. Evaluating Predictive Uncertainty, Visual Object Claysification, and Recognising Tectual Entailment*, pages 1-27. Springer, 2006.
[32] M. Sandler. A. Howard, M. Zhu, A. Zhmoginov, and L.-C. Chen. Mobilenetv2: Inverted residuals and linear bottle-necks. In *CVPR*, 2018. 5
[40] J. Uhrig, N. Schneider, L. Schneider, U. Franke, T. Brox, and A. Geiger. Sparsity invariant runs, In *International Conference on 3D Vision (3DV)*, 2017.
[41] G. C. Wei and M. A. Tanner. A monte carlo implementation of the em algorithm and the poor man's data augmentation algorithms. Journal of the American statistical Association, 85(411):699-704, 1990.

The invention claimed is:

1. A computer-implemented method of training a depth uncertainty estimator, the method comprising:
receiving, at a training computer system, a set of training examples, each training example comprising (i) a stereo image pair and (ii) an estimated disparity map computed from at least one image of the stereo image pair by a depth estimator;
wherein the training computer system executes a training process to learn one or more uncertainty estimation parameters of a perturbation function, the uncertainty estimation parameters for estimating uncertainty in disparity maps computed by the depth estimator;
wherein the training process is performed by sampling a likelihood function based on the training examples and the perturbation function, thereby obtaining a set of sampled values for learning the one or more uncertainty estimation parameters;
wherein the likelihood function measures similarity between one image of each training example and a reconstructed image computed by transforming the other image of that training example based on a possible true disparity map derived from the estimated disparity map of that training example and the perturbation function.

2. The method of claim 1, wherein the likelihood function measures structural similarity between said one image and the reconstructed image.

3. The method of claim 2, wherein the structural similarity is quantified using the structural similarity index (SSIM).

4. The method of claim 2, wherein the likelihood function measures both the structural similarity and pixel-level similarity by directly comparing pixels of the images.

5. The method of claim 1, wherein a true disparity distribution is determined based on the perturbation function and the estimated disparity map for each training example, wherein the sampling of the likelihood function comprises sampling the possible true disparity map from the true disparity distribution and evaluating the likelihood function for the sampled possible true disparity map.

6. The method of claim 5, wherein the one or more uncertainty estimation parameters are one or more perturbation weights that at least partially define the perturbation function, wherein:
initial value(s) are assigned to the one or more perturbation weights, and
in each of multiple training iterations, the likelihood function is initially sampled using value(s) of the weights determined in the previous iteration or, in the case of the first iteration, the initial value(s), the value(s) of the perturbation weights being determined in each iteration based on an objective function determined by the sampling of the likelihood function in that iteration, the iterations continuing until a termination condition is satisfied.

7. The method of claim 6, wherein the one or more perturbation weights are multiple perturbation weights, wherein each pixel of the reconstructed image is computed based a corresponding pixel of the estimated disparity map and one of the perturbation weights which is associated with that pixel of the disparity map.

8. The method of claim 7, wherein said one of the perturbation weights is associated with the location and/or the value of the corresponding pixel of the disparity map.

9. The method of claim 5, wherein the perturbation function defines a variance of the true disparity distribution for each pixel of the estimated disparity map and the value of the pixel of the estimated display map defines a mean of the true disparity function for that pixel, and wherein the true disparity function is a pixelwise univariate normal distribution.

10. The method of claim 9, wherein said one of the perturbation weights is associated with at least one of: a structure recognition output pertaining to at least that pixel of the disparity map, an environmental condition pertaining to at least that pixel of the disparity map and a motion detection output pertaining to at least that pixel of the disparity map.

11. The method of claim 5, wherein the perturbation function is at least partially defined by the perturbation weights and:
at least one of the images of training example, or the estimated disparity map of the training example.

12. The method of claim 1, wherein the perturbation function is at least partially defined by one or more perturbation weights, and the perturbation function transforms the estimated disparity map to obtain the possible true disparity map;
wherein the training process learns one or more parameters of a posterior distribution defined over one or more perturbation weights, the one or more uncertainty estimation parameters comprising or being derived from the one or more parameters of the posterior distribution;
wherein the training process is performed by sampling the likelihood function based on the training examples for different values of the perturbation weights, thereby obtaining a set of sampled values for learning the one or more parameters of the posterior distribution.

13. The method of claim 12, wherein the one or more parameters of the posterior distribution are one or more parameters which at least approximately optimize a loss function, the loss function indicating a difference between the posterior distribution and the set of sampled values, wherein the loss function indicates a measure of difference between a divergence term and the set of sampled values, the divergence term denoting a Kullback-Leibler (KL) divergence between the posterior distribution and a prior distribution defined with respect to the perturbation weights.

14. The method of claim 13, wherein
the loss function is defined as:

$$KL[q(w|\sigma)\|P(w)] - \mathbb{E}_{q(w|\sigma)}[\log P(\mathcal{D}_{train}|w)],$$

P(w) being the prior distribution, wherein $$\sigma^* = \mathrm{argmin}_\sigma \quad KL[q(w|\sigma)\|P(w)] - \mathbb{E}_{q(w|\sigma)}[\log P(\mathcal{D}_{train}|w)].$$

15. The method of claim 12, wherein the sampled values are obtained by directly sampling a distribution of the form:

$$P(w) \prod_i \frac{P(I_{R_i}, I_{L_i}, I_{d_i}|w)}{P(I_{R_i}, I_{L_i}, I_{d_i})},$$

the likelihood function $P(I_{R_i}, I_{L_i}, I_{d_i}|w)$ being sampled in sampling that distribution.

16. The method of claim 1, wherein the depth estimator is a stereo depth estimator, the disparity maps having been computed from the stereo image pairs by the stereo depth estimator.

17. The method of claim 1, wherein the depth uncertainty estimator is implemented as a lookup table in which the one or more uncertainty estimation parameters are stored for obtaining real-time uncertainty estimates for estimates computed in an online processing phase.

18. A processing system comprising:
electronic storage configured to store one or more uncertainty estimation parameters as determined in accordance with claim 1; and
one or more processors coupled to the electronic storage and configured to process at least one captured image to determine a depth or disparity estimate therefrom, and use the one or more uncertainty parameters to provide a depth or disparity uncertainty estimate for the depth or disparity estimate.

19. A training computer system comprising:
an input configured to receive a set of training examples, each training example comprising (i) a stereo image pair and (ii) an estimated disparity map computed from at least one image of the stereo image pair by a depth estimator;
one or more processors; and
memory configured to hold executable instructions which cause the one or more processors, when executed thereon, to:
execute a training process to learn one or more uncertainty estimation parameters of a perturbation function, the uncertainty estimation parameters for estimating uncertainty in disparity maps computed by the depth estimator;
wherein the training process is performed by sampling a likelihood function based on the training examples and the perturbation function, thereby obtaining a set of sampled values for learning the one or more uncertainty estimation parameters;
wherein the likelihood function measures similarity between one image of each training example and a reconstructed image computed by transforming the other image of that training example based on a possible true disparity map derived from the estimated disparity map of that training example and the perturbation function.

20. A computer program product comprising executable code embodied in a non-transitory computer-readable storage medium which is configured, when executed on one or more processors, to implement operations comprising:
receiving a set of training examples, each training example comprising (i) a stereo image pair and (ii) an estimated disparity map computed from at least one image of the stereo image pair by a depth estimator; and
executing a training process to learn one or more uncertainty estimation parameters of a perturbation function, the uncertainty estimation parameters for estimating uncertainty in disparity maps computed by the depth estimator;
wherein the training process is performed by sampling a likelihood function based on the training examples and the perturbation function, thereby obtaining a set of sampled values for learning the one or more uncertainty estimation parameters; and
wherein the likelihood function measures similarity between one image of each training example and a reconstructed image computed by transforming the other image of that training example based on a possible true disparity map derived from the estimated disparity map of that training example and the perturbation function.

* * * * *